US010699271B2

United States Patent
Shea

(10) Patent No.: US 10,699,271 B2
(45) Date of Patent: Jun. 30, 2020

(54) METHOD AND APPARATUS FOR ADVANCING THROUGH A DECK OF DIGITAL FLASHCARDS

(71) Applicant: USA LIFE NUTRITION LLC, San Marcos, CA (US)

(72) Inventor: Ronald Raymond Shea, Evansville, IN (US)

(*) Notice: Subject to any disclaimer, the term of this patent is extended or adjusted under 35 U.S.C. 154(b) by 549 days.

(21) Appl. No.: 14/939,553

(22) Filed: Nov. 12, 2015

(65) Prior Publication Data

US 2016/0225272 A1 Aug. 4, 2016

Related U.S. Application Data

(60) Provisional application No. 62/110,464, filed on Jan. 31, 2015.

(51) Int. Cl.
*G06Q 20/40* (2012.01)
*G06Q 10/06* (2012.01)
(Continued)

(52) U.S. Cl.
CPC ......... *G06Q 20/40* (2013.01); *G06Q 10/0639* (2013.01); *G06Q 20/10* (2013.01);
(Continued)

(58) Field of Classification Search
CPC ... G09B 7/00; G09B 7/02; G09B 7/04; G09B 7/06; G09B 19/22; G09B 5/06;
(Continued)

(56) References Cited

U.S. PATENT DOCUMENTS 5,743,746 A 4/1998 Ho ................................. 434/332
6,144,838 A * 11/2000 Sheehan .................. G09B 7/02
434/118

(Continued)

OTHER PUBLICATIONS

Office Action dated Oct. 3, 2019, re: U.S. Appl. No. 14/939,483 to Leddy, filed Nov. 12, 2015.

(Continued)

*Primary Examiner* — Jack Yip
(74) *Attorney, Agent, or Firm* — Ronald R. Shea

(57) ABSTRACT

Parents and entities incentivize students to learn using pledges of cash, goods, and services. Students earn incentivized rewards by interacting with lessons on a digital computing device, such as a desktop computer, notebook, tablet, or "smart phone." The lessons may include digital flash cards, text, pictures, figures, audio and video recordings ranging from classroom lectures, to classical music, to animation of scientific principles. In flashcard embodiments, the accuracy of each answer is recorded on a histogram corresponding to a particular flashcard, or the principles taught therein. The application generates performance metrics from histogram data. The performance metrics are used to generate control parameters that control the frequency and order flashcard presentation. Statistical analysis, adaptive learning and/or artificial intelligence programs refine the control parameters governing flashcard review, thereby optimizing the functionality. As a student satisfies various performance metrics and/or courseware requirements, incentives are released to the student.

28 Claims, 54 Drawing Sheets

(51) Int. Cl.
  *G09B 7/06* (2006.01)
  *G06Q 30/02* (2012.01)
  *G09B 7/02* (2006.01)
  *G06Q 50/20* (2012.01)
  *G06Q 20/10* (2012.01)
  *G09B 5/06* (2006.01)
  *G09B 19/00* (2006.01)

(52) U.S. Cl.
  CPC ......... *G06Q 30/0207* (2013.01); *G06Q 50/20* (2013.01); *G09B 5/06* (2013.01); *G09B 7/02* (2013.01); *G09B 7/06* (2013.01); *G09B 19/00* (2013.01)

(58) Field of Classification Search
  CPC .... G09B 19/00; G06Q 20/40; G06Q 10/0639; G06Q 30/0207; G06Q 50/20; G06Q 20/10
  See application file for complete search history.

(56) References Cited

U.S. PATENT DOCUMENTS

| | | | |
|---|---|---|---|
| 7,779,268 B2 | 8/2010 | Draper et al. | 713/186 |
| 2003/0059759 A1* | 3/2003 | Calhoun | A61B 5/16 434/322 |
| 2003/0129574 A1* | 7/2003 | Ferriol | G09B 5/00 434/362 |
| 2003/0170598 A1* | 9/2003 | Boggs | G09B 5/00 434/236 |
| 2003/0170600 A1* | 9/2003 | Boggs | G09B 5/00 434/258 |
| 2003/0232314 A1* | 12/2003 | Stout | G09B 7/00 434/322 |
| 2004/0073488 A1 | 4/2004 | Etuk | 434/350 |
| 2005/0100875 A1* | 5/2005 | Best | G09B 7/02 434/362 |
| 2005/0256663 A1* | 11/2005 | Fujimori | G09B 7/00 702/121 |
| 2006/0216685 A1* | 9/2006 | Brodie | G09B 7/02 434/323 |
| 2006/0252014 A1* | 11/2006 | Simon | G09B 19/00 434/236 |
| 2007/0020604 A1 | 1/2007 | Chulet | 434/350 |
| 2007/0174633 A1 | 7/2007 | Draper et al. | 713/186 |
| 2009/0077479 A1 | 3/2009 | Tucci | 715/764 |
| 2009/0155755 A1* | 6/2009 | Kracke | G09B 19/00 434/236 |
| 2009/0186328 A1* | 7/2009 | Robinson | G09B 5/14 434/350 |
| 2011/0091859 A1* | 4/2011 | Hall | G09B 7/08 434/350 |
| 2011/0318723 A1* | 12/2011 | Jeong | G09B 7/08 434/350 |
| 2012/0231441 A1* | 9/2012 | Parthasarathy | G09B 7/02 434/362 |
| 2012/0322043 A1* | 12/2012 | Edge | G09B 7/04 434/322 |
| 2013/0288222 A1* | 10/2013 | Stacy | G09B 5/00 434/362 |
| 2013/0342470 A1* | 12/2013 | Acar | G09B 5/062 345/173 |
| 2014/0100844 A1* | 4/2014 | Stieglitz | G09B 19/06 704/3 |
| 2014/0134576 A1* | 5/2014 | Edge | G09B 19/04 434/157 |
| 2014/0257954 A1 | 9/2014 | Tan | 705/14.17 |
| 2014/0279727 A1* | 9/2014 | Baraniuk | G06N 20/00 706/11 |
| 2015/0186346 A1* | 7/2015 | Mesguich Havilio | G06F 3/04842 715/256 |
| 2015/0325138 A1* | 11/2015 | Selinger | G09B 7/00 434/322 |
| 2016/0343272 A1* | 11/2016 | Roche | G06F 3/0481 |

OTHER PUBLICATIONS

Office Action dated Jun. 15, 2018, re: U.S. Appl. No. 14/939,483 to Leddy, filed Nov. 12, 2015.
Office Action dated Jan. 24, 2019, re: U.S. Appl. No. 14/939,483 to Leddy, filed Nov. 12, 2015.

* cited by examiner

FIG. 2
203        205         207                              200
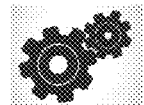    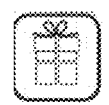
Configure   Strength    Incentives
            Of
            Learning
201
with whom FIG. 3
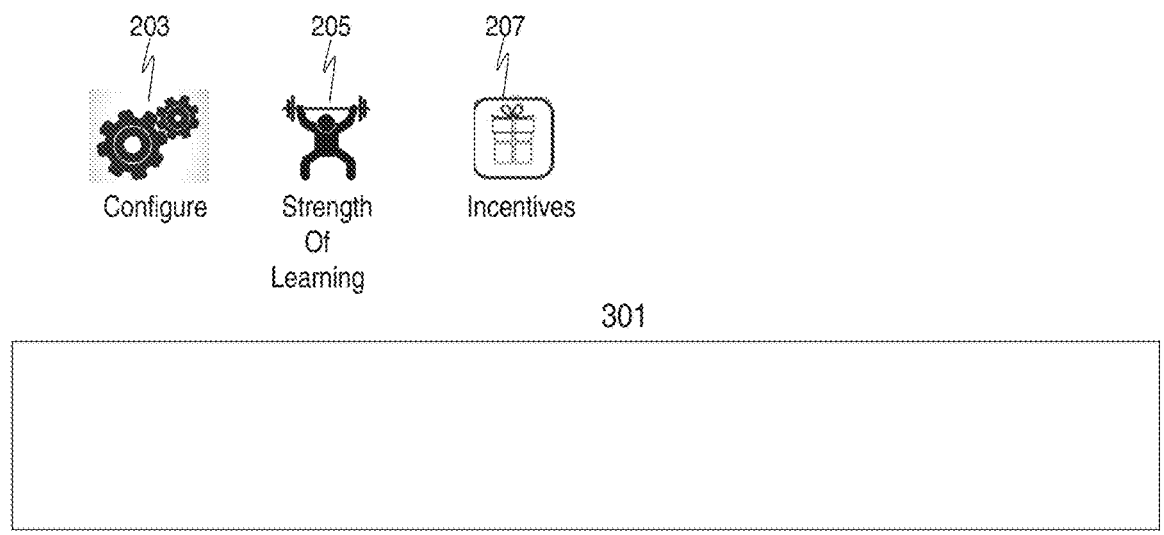
Keystroke Answer in Text Box and hit "Enter"
Click to View Russian Keyboard
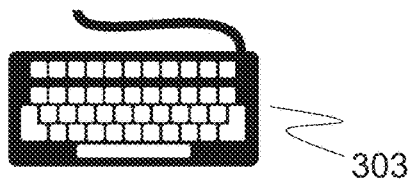
303
\*\*\*\*     \*\*\*\*     \*\*\*\*
☐ True     305
☐ False    Click on your answer and hit "Enter"
\*\*\*\*     \*\*\*\*     \*\*\*\*
☐ A.     307
☐ B.
☐ C.
☐ D.    Click on your answer and hit "Enter"

FIG. 4
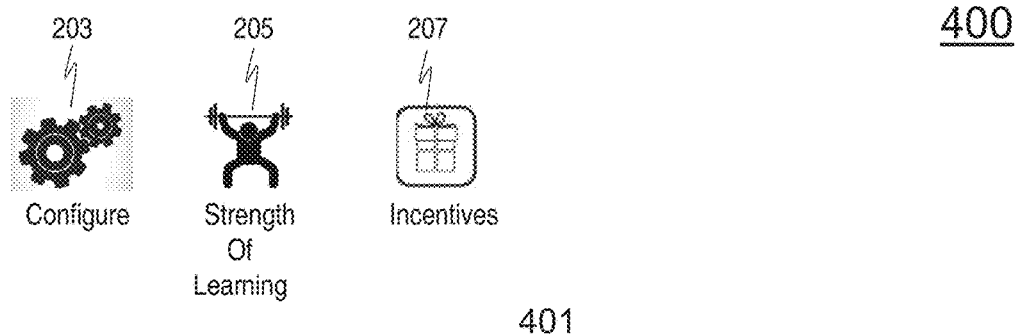
401
с кем
403
Rate your answer: On a scale of 1-5, enter your self-assigned grade to your answer in the field above, and hit "enter" to go to the next flashcard.
| 405 | 407 | 409 | 411 | 413 | 415 | 417 | 419 |
|---|---|---|---|---|---|---|---|
|  |  |  |  |  | 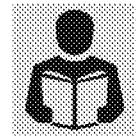 |  | |
| Decline Or Parse | Charts & Graphs | Pronounce | Audio | Video | Video | Text/ Written Lesson | Memory Aid |

FIG. 5 500

| | |
|---|---|
| 501 — | Name: Joe Black |
| 503 — | Public PIN: My_Cat_is_Black |
| | (the public PIN is a method for ensuring that, if multiple "Joe Blacks" are enrolled in the program, that the incentivizer can identify the proper "Joe Black." As a safeguard against incentivizing the wrong person, the Pubic Pin is not case sensitive. |
| 505 — | Age: [Drop Down Menu, or fillable field] |
| 507 — | Sex: [Drop Down Menu, or fillable field] |
| 509 — | Birthday: [Drop Down Menu, or fillable field] |
| 511 — | Race: [Drop Down Menu, or fillable field] |
| 513 — | Education: [Drop Down Menu, etc.] |
| 515 — | Other demographic statistics: [Drop Down Menus, fillable fields, etc.] |
| 517 — | Available Courses: [Drop Down Menu] |
| 519 — | Course Configuration: |
| | One example of configuration is the method of delivering an answer. One user may prefer to answer recite an answer "to themselves" while another prefers to write the answer in a fillable field. One student may prefer "event driven advancement" (such as hitting the "enter" key, while another may prefer time driven advancement. There is no limit to the number of configurable features. |
| 521 — | Record of Performance Metrics |
| 532 — | Record of Incentives Earned |

FIG. 6          600

| | |
|---|---|
| 601 | Name: Joe Black |
| 603 | Public PIN: My_Cat_is_Black |
| 605 | Your Name: [Drop Down Menu, or fillable field] |
| 607 | Your Credit Card No. [Drop Down Menu, or fillable field] |
| 609 | Select a Course You are Incentivizing: [Drop Down Menu] |
| 611 | Amount of Incentives : [Drop Down Menu, or fillable field. E.g. "weekly," "monthly," "one-time" etc. Amount of each, etc.] |
| 613 | Course Configuration: <br> One example of configuration is the method of delivering an answer. The incentivizer may allow the student to grade their own answer, while another will require the student to accept the "default" grades for each flashcard as determined by the automated process. There is no limit to the number of configurable features. |
| 615 | Incentivization Vehicle: [Drop Down Menu, Credit Card, Debit Card, Gift Card, etc.] |
| 617 | Restrictions: [Drop Down Menu, No alcohol, no tobacco, etc.] |
| 619 | Validation: [Drop Down Menu, Finger print, incentivizer present for final exam, etc.] |

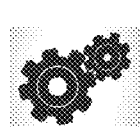 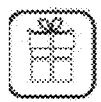        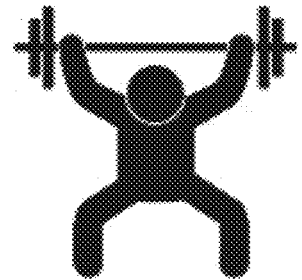

Configure   Incentives              Strength
                                       Of
                                    Learning Flashcard: "with whom" (с кем)

Flashcard Status:        Introductory
Accuracy of Flashcard:   92%
Freshness:               99%
Durability:              4%
Density:                 7%

Instant Strength of Learning: 91.22%
(Probability of getting it correct if asked right now).

One-Hour Projection:        90.64
(Probability of getting it correct in 24 hours with no interim review).

Twenty-Four Hour Projection:    88.13%
(Probability of getting it correct in 24 hours with no interim review).

One Month Projection: 11.224%
(Probability of getting it correct in 2 months with no interim review).

Course: Introduction to Russian
Overall Course strength:        2.8%

Interrogative Pronoun Chart

Кто, что, сколько

The interrogative pronouns кто (who), что (what), сколько (how many/much) according to case.

| Case | "кто" | "что" | "сколько" |
|---|---|---|---|
| Nominative | кто | что | сколько |
| Genitive | кого | чего | скольких |
| Dative | кому | чему | скольким |
| Accusative | кого | что | сколько |
| Instrumental | кем | чем | сколькими |
| Prepositional | о ком | о чём | о скольких |

FIG. 9

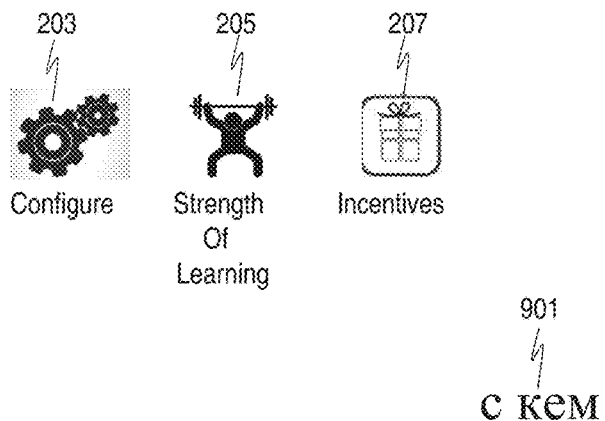

с кем

TIP: The English listener may initially hear the word pronounced as "skim," like the milk. But the Russian vowel technically comprises a "ye" sound, much like the word "yes." If you cannot hear this distinction after listening to the audio recording at normal speed, recite the words "skim" and "skyem" aloud several times, alternating between the two. Can you hear the difference in your pronunciation? Then play back the audio. Now can you hear this distinction in the Russian speaker?

Ideal Gas Law

FIG. 11
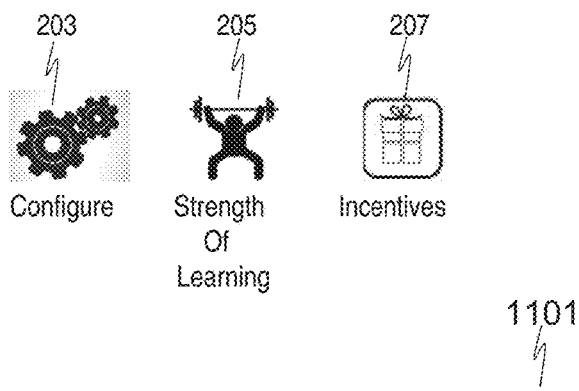
$$PV = nRT$$
Where:
P = pressure
V = Volume
n = moles (number of molecules)
R = a gas law constant
T = temperature
Rate your answer: On a scale of 1-5, enter your self-assigned grade to your answer in the field above, and hit "enter" to go to the next flashcard.
    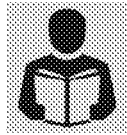  
Charts & Graphs | Audio | Video | Video | Text/Written Lesson | Memory Aids | Equations

FIG. 12

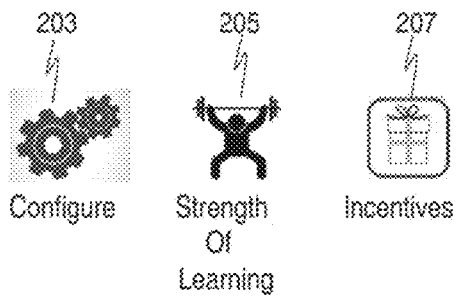

Ideal Gas Law Illustrator:

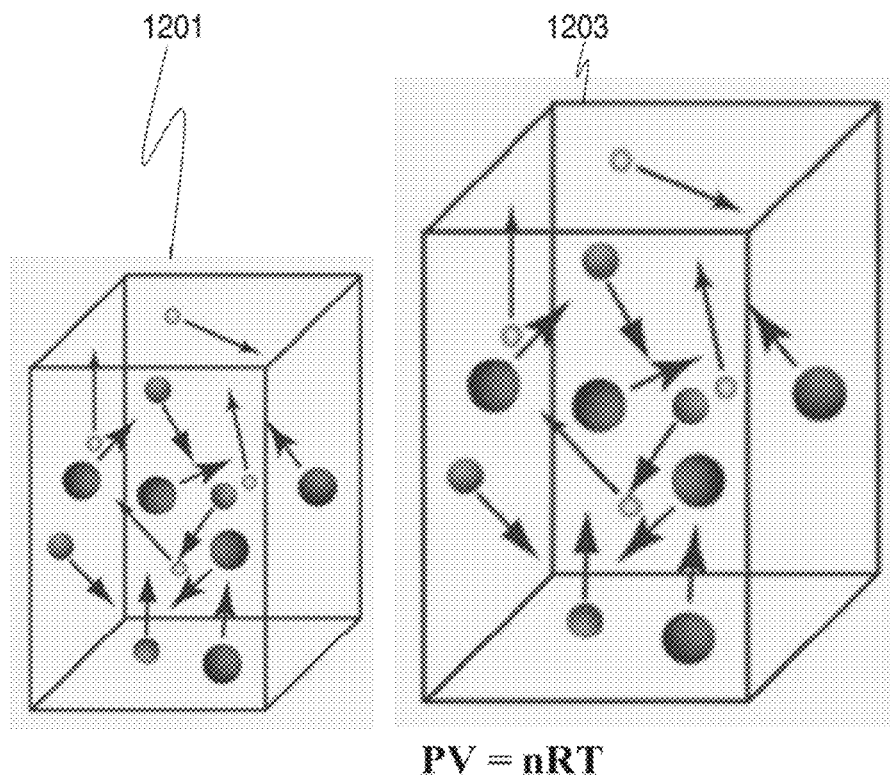

PV = nRT

(Pressure) x (Volume) = (n, the number of molecules) x R (a constant) x Temperature R is simply an adjustment to make the numbers come out correctly. It "adjusts" the equation based on the dimensions of the other values. For example, R will be different if volume is measured in cubic inches than in cubic centimeters.

Right Click on a variable in the equation. Choose "constant," "dependent variable," or "independent variable." A slide bar will appear with the value you select as the independent variable. Move the slide bar, and observe what happens to the dependent variable.

FIG. 13

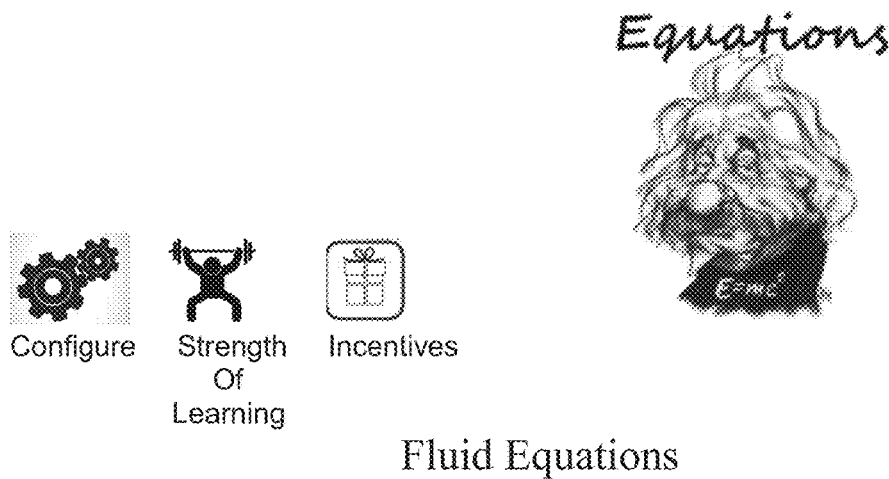

Configure   Strength   Incentives
            Of
            Learning

Fluid Equations

Boyle's Law  $P_1V_1 = P_2V_2$

Ideal Gas Law  $PV = nRT$

Bernoulli's Principle

$P + \frac{1}{2} \rho V^2 + \rho gh = \text{constant}$

Where P is pressure, ρ is the density, V is velocity, h is elevation, and g is the gravitational acceleration.

Kelvin-Stokes Theorem:

$$\iint_\Sigma \left\{ \left(\frac{\partial R}{\partial y} - \frac{\partial Q}{\partial z}\right) dydz + \left(\frac{\partial P}{\partial z} - \frac{\partial R}{\partial x}\right) dzdx + \left(\frac{\partial Q}{\partial x} - \frac{\partial P}{\partial y}\right) dxdy \right\}$$
$$= \oint_{\partial \Sigma} \{Pdx + Qdy + Rdz\}.$$

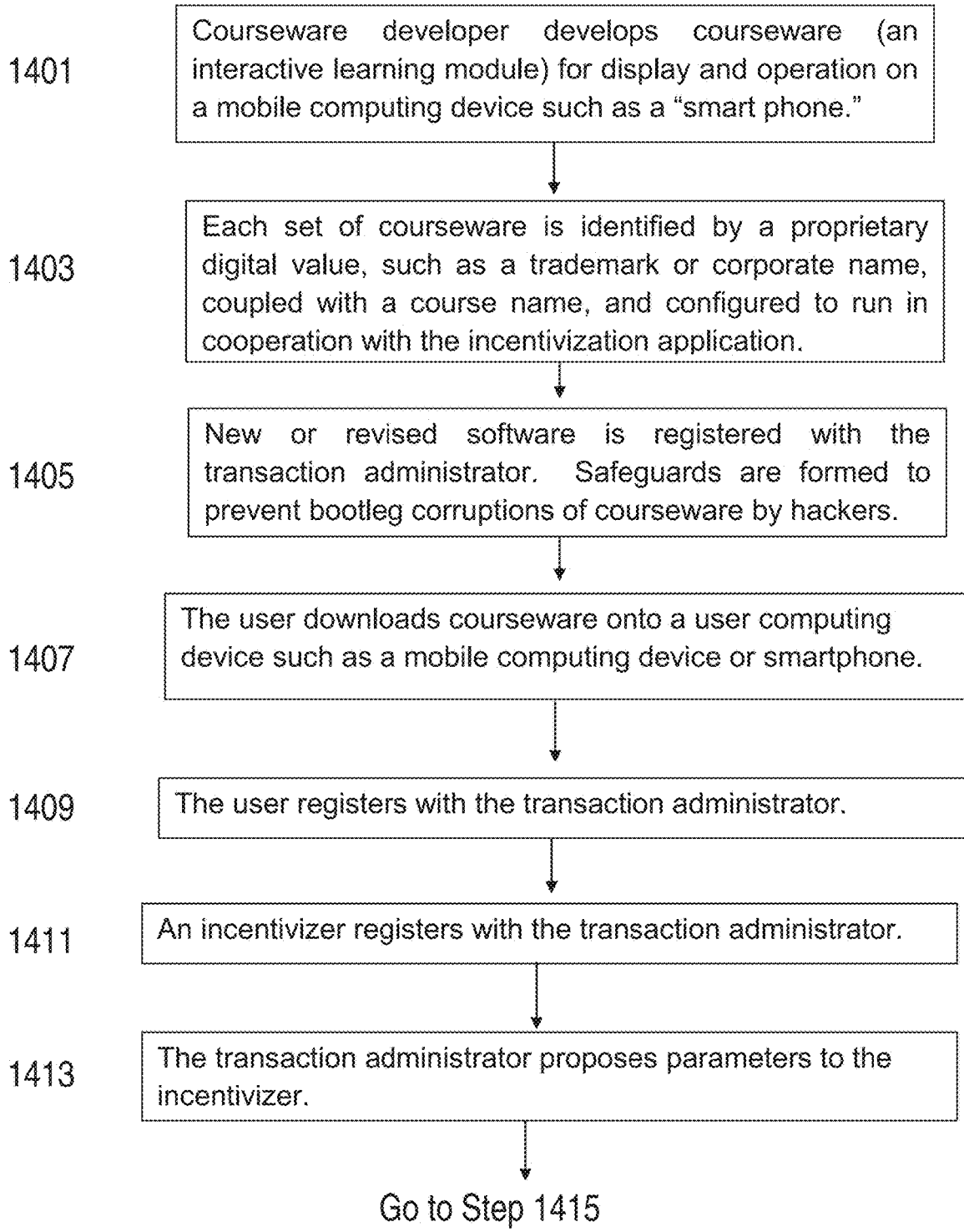

FIG. 15

General Principles in Algebra

1500

| Algebraic Principle | Principle Number |
|---|---|
| Meaning of Operation Symbols | AP-0015 |
| Grouping of Symbols | AP-0016 |
| Order of Operation | AP-0017 |
| Communitive Principle | AP-0018 |
| Associative Principle | AP-0019 |
| Distributive Principle | AP-0020 |
| Prime Factoring | AP-0021 |
| Multiplying and Dividing by -1 | AP-0022 |
| Absolute Value | AP-0023 |
| Fractions | AP-0024 |
| Decimals | AP-0025 |
| Meaning of Constants | AP-0026 |
| Meaning of Variables | AP-0027 |
| Solving for "x," (Isolating "x") | AP-0028 |
| o o o | |
| Etc. | AP-0029 |

Algebra Flashcard Generator Table:

AP-0021 — 1601
(From field 1513 of FIG. 15)

1603 — Prime Factor the value displayed below  = — 1605

1600    1607    1609    1611    1613

| Flashcard Number | "Question" on First page of Flashcard | Answer Page Prime Factoring | Strength of Learning |
|---|---|---|---|
| F-0315 | 1 | 1 | |
| F-0316 | 2 | 2 | |
| F-0317 | 3 | 3 | |
| F-0318 | 4 | 2 · 2 | |
| F-0319 | 5 | 5 | |
| F-0320 | 6 | 2 · 3 | |
| F-0321 | 7 | 7 | |
| F-0322 | 8 | 2 · 2 · 2 | |
| F-0323 | 9 | 3 · 3 | |
| F-0324 | 10 | 2 · 5 | |
| F-0325 | 11 | 11 | |
| F-0326 | 12 | 2 · 2 · 3 | |
| F-0327 | 13 | 13 | |
| F-0328 | 14 | 2 · 7 | |
| F-0329 | 15 | 3 · 5 | |
| F-0330 | 16 | 2 · 2 · 2 · 2 | |
| F-0331 | 17 | 17 | |
| F-0332 | 18 | 2 · 3 · 3 | |
| F-0333 | 19 | 19 | |
| F-0334 | 20 | 2 · 2 · 5 | |
| F-0335 | 21 | 3 · 7 | |
| F-0336 | 22 | 2 · 11 | |
| F-0337 | 23 | 23 | |

1615    1617    1619

1621 — Generate Flashcards

FIG. 17

Drop Down Menu for Building Tables and Features of Courseware

1700

| | | | |
|---|---|---|---|
| 1703 | Edit Existing Table | Select Table | 1703-a |
| 1705 | New Table from Template | Noun | 1705-a |
| | | Verb | 1705-b |
| | | Pronoun | 1705-c |
| 1709 | Create New Table | Flashcard Numbers | 1709-a |
| | | Principle Numbers | 1709-b |
| | | No Preassigned Numbers | 1709-c |
| 1711 | Edit Existing Flashcard | Flashcard Selector | 1711-a |
| 1713 | Create New Flashcard | | |

FIG. 19

Flashcard

| F-0332 |

1900
(Data file, in part)

── 1901
(From field 1609 of Fig. 16)

Principle(s)

| AP-0021 |

── 1903
(From field 1602 of Fig. 16)

1905     1907   1909   1911

| Prime Factor the value displayed below | 18 | = | 2·3·3 |

1913   1915   1917   1919   1921

| Status | Count of Last Review | Current Count | Count since last displayed | Strength of Learning |
|---|---|---|---|---|
| Stale | 12,419 | 12,604 | 185 | 86.21% |

Histogram ── 1923

1925    1927

| Time Stamp | Accuracy |
|---|---|
| 2015-07-04, 1322 hrs. | Correct |
| 2015-07-03, 1309 hrs. | Correct |
| 2015-07-02, 1302 hrs. | Incorrect |
| 2015-07-02, 1300 hrs. | Incorrect |
| 2015-07-01, 1200 hrs. | Incorrect |

FIG. 20

<u>2000</u>
(Data file, in part)

Principle(s)

AP-0021 — 2001
(From field 1601 of Fig. 16)

| Status | Count of Last Review | Current Count | Count since last displayed | Strength of Learning |
|---|---|---|---|---|
| Active | 12,419 | 12,604 | 185 | 86.21% |

2003 — 2005 — 2007 — 2009 — 2011

Histogram — <u>2013</u>

| Time Stamp | Accuracy | Flashcard | Strength of Learning |
|---|---|---|---|
| 2015-07-04, 1322 hrs. | Correct | F-0323 | 83.11% |
| 2015-07-03, 1309 hrs. | Correct | F-0324 | 93.53% |
| 2015-07-02, 1302 hrs. | Incorrect | F-0325 | 76.29% |
| 2015-07-02, 1300 hrs. | Incorrect | F-0326 | 87.00% |
| 2015-07-01, 1200 hrs. | Incorrect | F-0327 | 92.51% |

2015 — 2017 — 2019 — 2021

2100

2101
(From 1601 of Fig. 16)

Prime Factor the value displayed below

2103
(From 1611 of Fig. 16)

18

Flashcard F-0332 — 2105
(From 1609 of Fig. 16)

FIG. 22
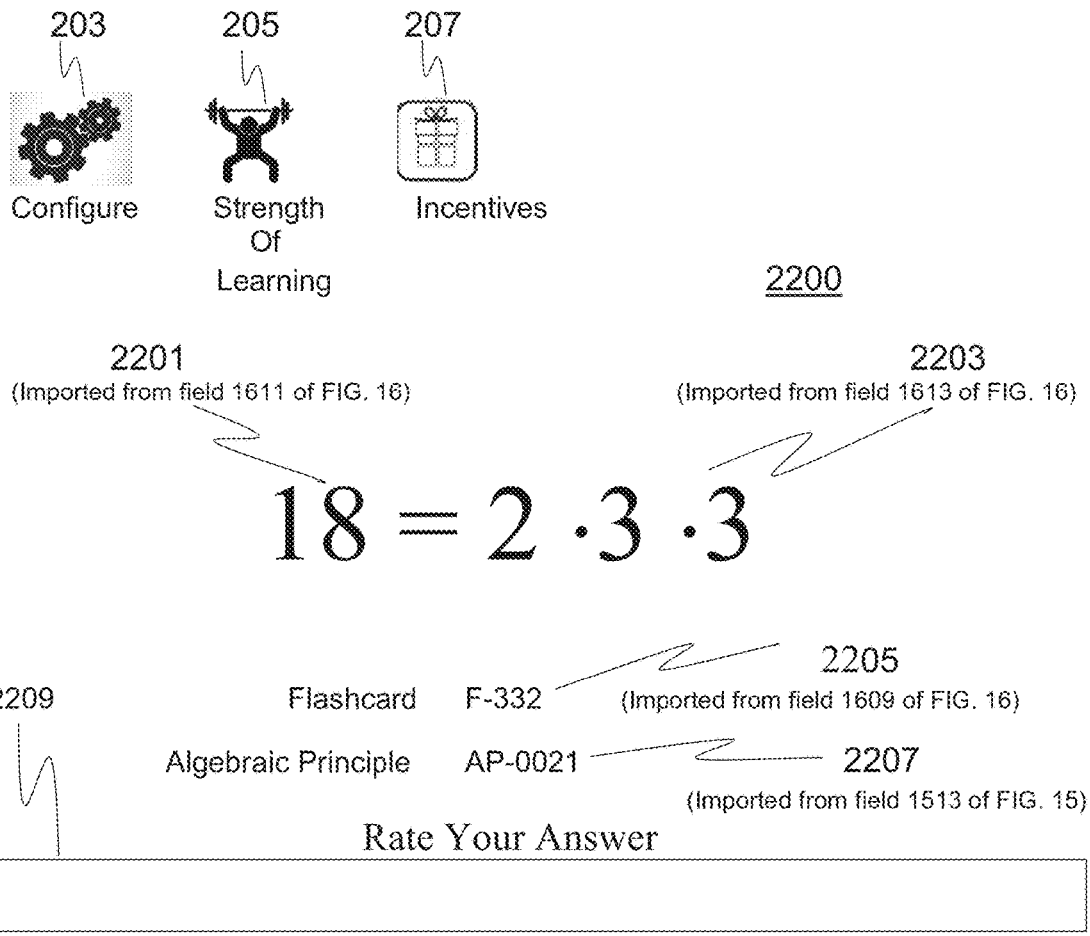
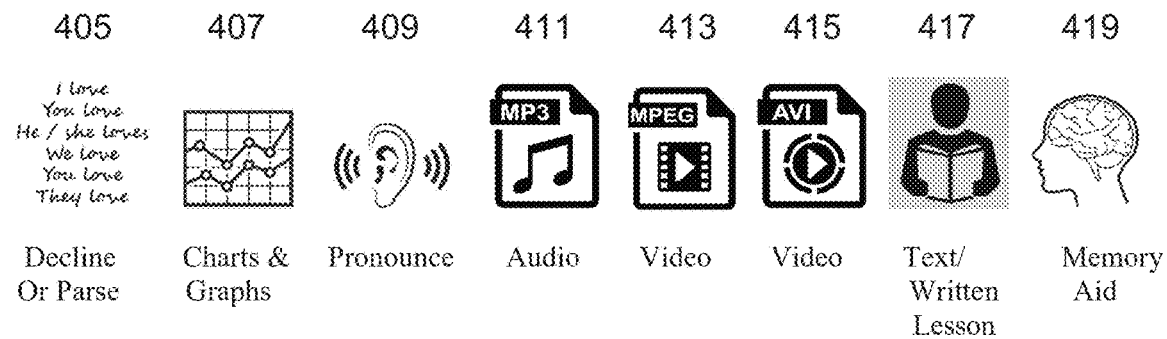
Rate your answer: On a scale of 1-5, enter your self-assigned grade to your answer in the field above, and hit "enter" to go to the next flashcard.

FIG. 23

General Linguistic Principles in Russian

2300

| Principle of Speech | Principle Number | |
|---|---|---|
| Nouns, Masculine ending in a consonant | GP 0015 | — 2301 |
| Nouns, Masculine, ending in ь | GP 0016 | — 2303 |
| Nouns, Masculine, ending in й | GP 0017 | — 2305 |
| Nouns, Feminine, ending in ь | GP 0018 | — 2307 |
| Nouns, Feminine, ending in а | GP 0019 | — 2309 |
| Nouns, Feminine, ending in я | GP 0020 | — 2311 |
| Nouns, Feminine, ending in ия | GP 0021 | — 2313 |
| Nouns, Neuter, ending in о | GP 0022 | — 2315 |
| Nouns, Neuter, ending in е | GP 0023 | — 2317 |
| Nouns, Neuter, ending in ие | GP 0024 | — 2319 |
| Nouns, Neuter, ending in мя | GP 0025 | — 2321 |
| | | |
| Verbs, ending in _____ать, regular | GP-0030 | — 2323 |
| Verbs, ending in _____ать, Stem ending г | GP-0031 | — 2325 |
| A different "general principle" is assigned for every ать verb with the thirteen other "stem endings": д, з, т, ст, ск, с, х, к, т, б, в, м, п, for every ать ending. Fifteen different General principles are likewise assigned for every other verb form below, a principle for regular stems, and a different principle for each of the fourteen stem endings. | | — 2327 |
| Verbs, ending in _____ять | GP-0045 | — 2329 |
| Verbs, ending in _____еть | GP-0060 | — 2331 |
| Verbs, ending in _____овать | GP-0075 | — 2333 |
| Verbs, ending in _____нуть | GP-0090 | — 2335 |
| Verbs, ending in _____ить | GP-0105 | — 2337 |
| | | |
| Pronouns | GP-0131 | — 2339 |
| Etc. | GP-0133 | — 2341 |
| | | |

FIG. 24

2401 — GP-0015  (Paradigm for Masculine Nouns ending in a consonant) 2400

| Case | Singular | Strength Metric | Plural Standard | Strength Metric | Plural (2-4) | Strength Metric | Plural (5 & more) | Strength Metric |
|---|---|---|---|---|---|---|---|---|
| Nominative | P-0076 | 99.7 % | P-0084 | 99.7 % | P-0092 | 99.7 % | P-0100 | 96.7 % |
| Accusative, Animate | P-0077 | 99.6 % | P-0085 | 99.6 % | P-0093 | 99.6 % | P-0101 | 95.8 % |
| Accusative, Inanimate | P-0078 | 99.4 % | P-0086 | 99.4 % | P-0094 | 99.4 % | P-0102 | 93.2 % |
| Genitive | P-0079 | 99.1 % | P-0087 | 99.1 % | P-0095 | 99.1 % | P-0103 | 90.6 % |
| Dative | P-0080 | 98.6 % | P-0088 | 98.6 % | P-0096 | 98.6 % | P-0104 | 99.4 % |
| Prepositional (1st form) | P-0081 | 0.989 % | P-0089 | 0.989 % | P-0097 | 0.989 % | P-0105 | 91.0 % |
| Prepositional (2nd form) | P-0082 | 93.1 % | P-0090 | 93.1 % | P-0098 | 93.1 % | P-0106 | 86.7 % |
| Instrumental | P-0083 | 79.44 % | P-0091 | 79.44 % | P-0099 | 79.44 % | P-0107 | 55.5 % |

2403, 2405, 2407, 2409, 2411, 2413, 2415, 2417, 2419
2421, 2423, 2425

2427 — Begin Generation of Paradigm

FIG. 25

2500 Paradigm Generation Module

| Derived from General Principle | Word | Russian Spelling | Pronunciation | Translation |
|---|---|---|---|---|
| GP-0015 | W-3475 | глаз | Glaz | eye |

2501     2503     2505     2507     2509

Variable Parameters:
- ☐ Include second prepositional form
- ☒ Omit Second Prepositional form

2511

- ☐ Include Accusative Animate
- ☒ Include Accusative Inanimate

2513

- ☐ Include Plural 2-4 and Plural 5 or more
- ☒ Generate only one form of plural

| Identify Links to appear at bottom of Answer page of Flashcard |
|---|

| Create Table |
|---|

<u>2700</u>
(Data File for Glaz)

<u>2701</u>
(Basic Identifiers for Data File)

| General Principle | Word | Russian Spelling | Pronunciation | Translation |
|---|---|---|---|---|
| GP-0015 | W-3475 | Глаз | Glaz | eye |

2703   2705   2707   2709   2711

Paradigm of Case Endings   2713

2715  2717  2719  2721  2723  2725  2727

| Case | Singular | | | Plural | | |
|---|---|---|---|---|---|---|
| | Flashcard | Word | Principle | Flashcard | Word | Principle |
| Nominative | F-3476 | глаз | P-0076 | F-3484 | глазá | P-0084 |
| Accusative, Inanimate | F-3478 | Глаз | P-0078 | F-3486 | глазá | P-0086 |
| Genitive | F-3479 | глáза | P-0079 | F-3487 | глаз | P-0087 |
| Dative | F-0080 | глáзу | P-0080 | F-3488 | глазáм | P-0088 |
| Prepositional (1st form) | F-3481 | глáзе | P-0081 | F-3489 | глазáх | P-0089 |
| Instrumental | F-3483 | глáзом | P-0083 | F-3491 | глазáми | P-0091 |

2729   2731   2733

2735

Generate Flashcards / Data Files

FIG. 27-b (continued)

<u>2700</u>
(Data File for Glaz)

<u>2737</u>
(Control Fields for Word W-3475, glaz)

2739  2741  2743  2745  2747

| Strength of Learning | Status | Count of Last Review | Current Count | Count since last displayed |
|---|---|---|---|---|
| 90.02% | Active | 12,439 | 12,523 | 104 |

Histogram <u>2749</u>

2751  2753  2755  2757

| Time Stamp | Accuracy Correct / Incorrect | Flashcard | Strength of learning of Flashcard |
|---|---|---|---|
| 2015-07-04, 1322 hrs. | Correct | F-3483 | 92.7% |
| 2015-07-03, 1309 hrs. | Correct | F-3497 | 96.4% |
| 2015-07-02, 1302 hrs. | Correct | F-3492 | 90.22% |
| 2015-07-02, 1300 hrs. | Correct | F-3476 | 98.44% |
| 2015-07-01, 1200 hrs. | Correct | F-3499 | 88.32% |
| 2015-07-01, 1252 hrs. | Correct | F-3483 | 89.01% |

FIG. 28

2800
(Data file, in part)

| Flashcard | Word | Grammatical Principle |
|---|---|---|
| F-3483 | W-3475 | P-0083 |

2807 — 2801 — 2803 — 2805 — 2809 — 2810

| Eye | Instrumental Case, Singular |
| | as in "signaled with an eye" |
| с глáзом | "сигнализировал с глáзом" |

2811 — 2813

| Strength of Learning Status | Status | Count of Last Review | Current Count | Count since last displayed |
|---|---|---|---|---|
| 94.21% | Active | 12,419 | 12,604 | 185 |

2815 — 2817 — 2819 — 2821 — 2823

Histogram of Flashcard F-3483 — 2825

| Time Stamp | Accuracy |
|---|---|
| 2015-07-04, 1322 hrs. | Correct |
| 2015-07-03, 1309 hrs. | Correct |
| 2015-07-02, 1302 hrs. | Incorrect |
| 2015-07-02, 1300 hrs. | Incorrect |
| 2015-07-01, 1200 hrs. | Incorrect |
| 2015-07-01, 1252 hrs. | Correct |

2827 — 2829

[ Generate Flashcards ] — 2831

FIG. 29
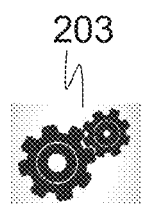
Configure
Strength
Of
Learning
Incentives
2900
Eye   2901      2903
In the Instrumental case, Singular
as in "signaled with an eye"

FIG. 30a
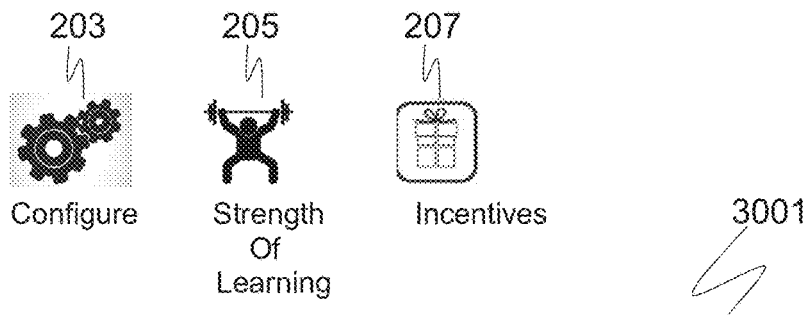
For example, he "signaled with an eye" "сигнализировал с глазом"
Click on the buttons that most accurately grade your accuracy. If you used a different word in your translation which may be correct, answer "N/A." If the word you chose was clearly wrong, select "incorrect."
⊙ correct    ○ incorrect    ○ N/A      — 3007
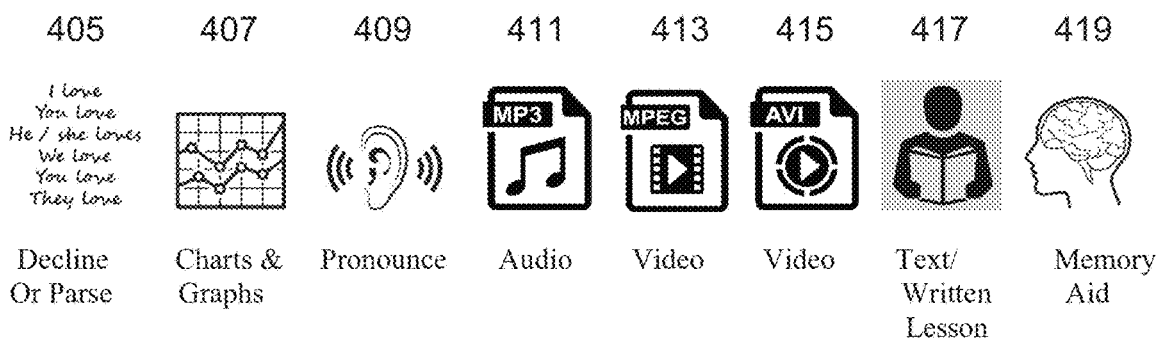

FIG. 30b

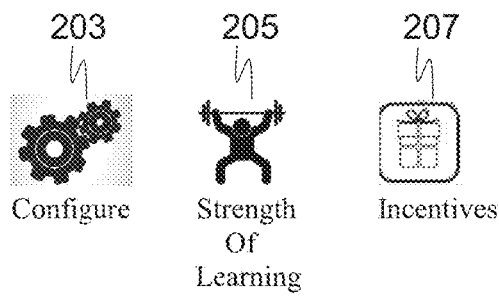

с глáзом    3001

3005

"with an eye," "with the eye"    3003

For example, he "signaled with an eye" "сигнализировал с глáзом"

Click on the buttons that most accurately grade your accuracy. If you used a different word in your translation which may be correct, answer "N/A." If the word you chose was clearly wrong, select "incorrect."

○ correct   ⊙ incorrect   ○ N/A    3007

****            **            ****

3009

глаз     (root word)     ⊙ correct  ○ incorrect  ○ N/A

__ом   (singular instrumental)  ○ correct  ⊙ incorrect  ○ N/A 3011                                       3013

ENTER

FIG. 31

3100
(Data file)

Principle

P-0083 — 3101
(Singular Instrumental form for masculine nouns ending in a consonant) (Generated from any flashcard using this

Cross reference to General Principle

GP-0015 — 3103
(Cross reference to Paradigm for masculine nouns ending in a consonant) (From field 2401 of Fig. 24)

| Strength of Learning (3105) | Status (3107) | Count of Last Review (3109) | Current Count (3111) | Count since last displayed (3113) |
|---|---|---|---|---|
| 77.44% | Active | 12,419 | 12,523 | 104 |

Histogram — 3115

| Time Stamp (3117) | Accuracy (3119) | Flashcard (3121) | Strength of Learning (3123) | Word or Phrase (3125) |
|---|---|---|---|---|
| 2015-07-04, 1322 hrs. | Correct | F-3483 | (94.33%) | с Глазом ("with an eye") |
| 2015-07-03, 1309 hrs. | Correct | F-3497 | (91.29%) | с карандашом ("with a pencil") |
| 2015-07-02, 1302 hrs. | Incorrect | F-3492 | (84.00%) | с огнем ("with fire") |
| 2015-07-02, 1300 hrs. | Incorrect | F-3476 | (97.36%) | с автомобилем ("with a car") |
| 2015-07-01, 1200 hrs. | Incorrect | F-3499 | (99.61%) | со словарем ("with a dictionary") |
| 2015-07-01, 1252 hrs. | Correct | F-3488 | (90.03%) | со стаканом ("with a glass") |

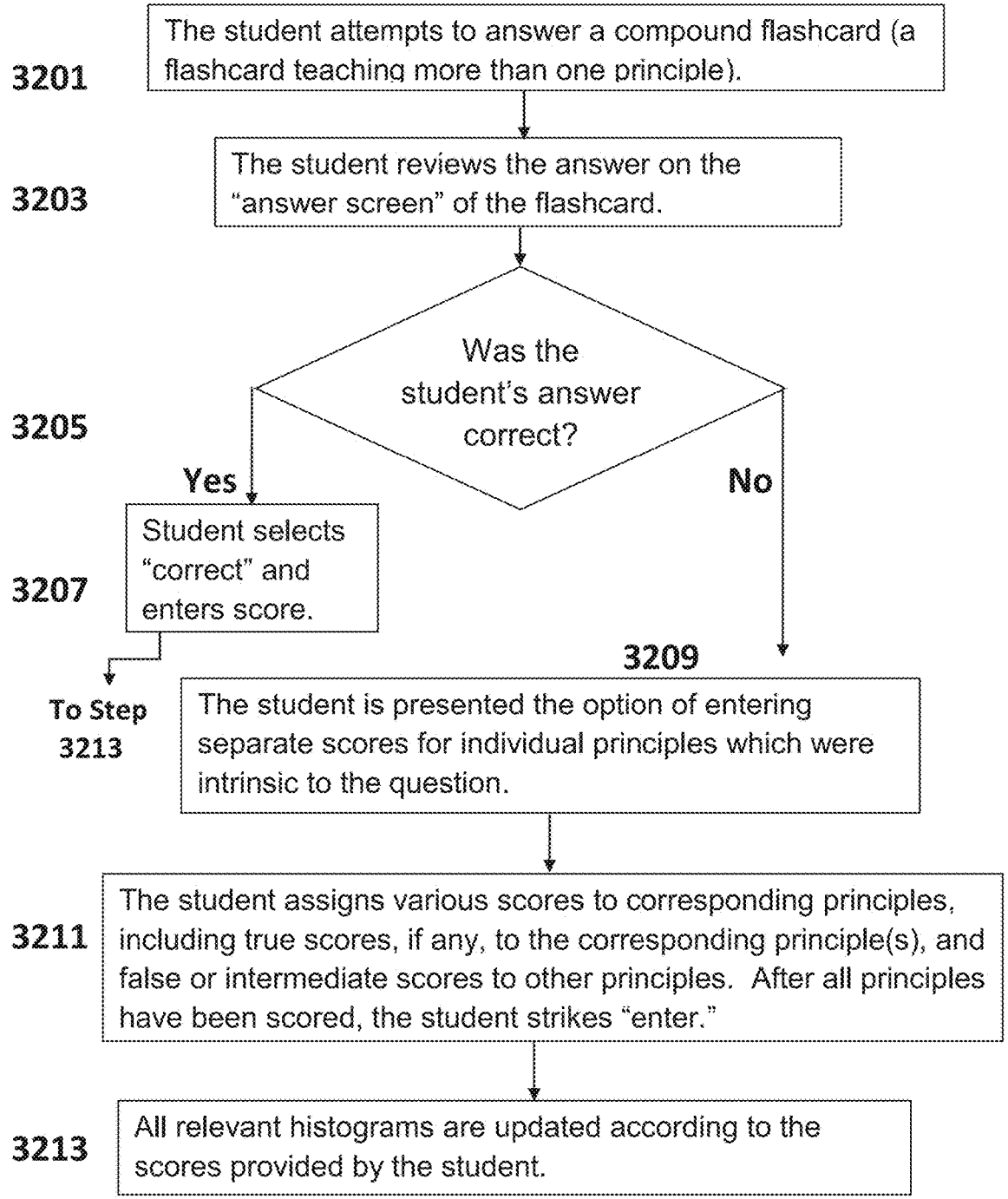

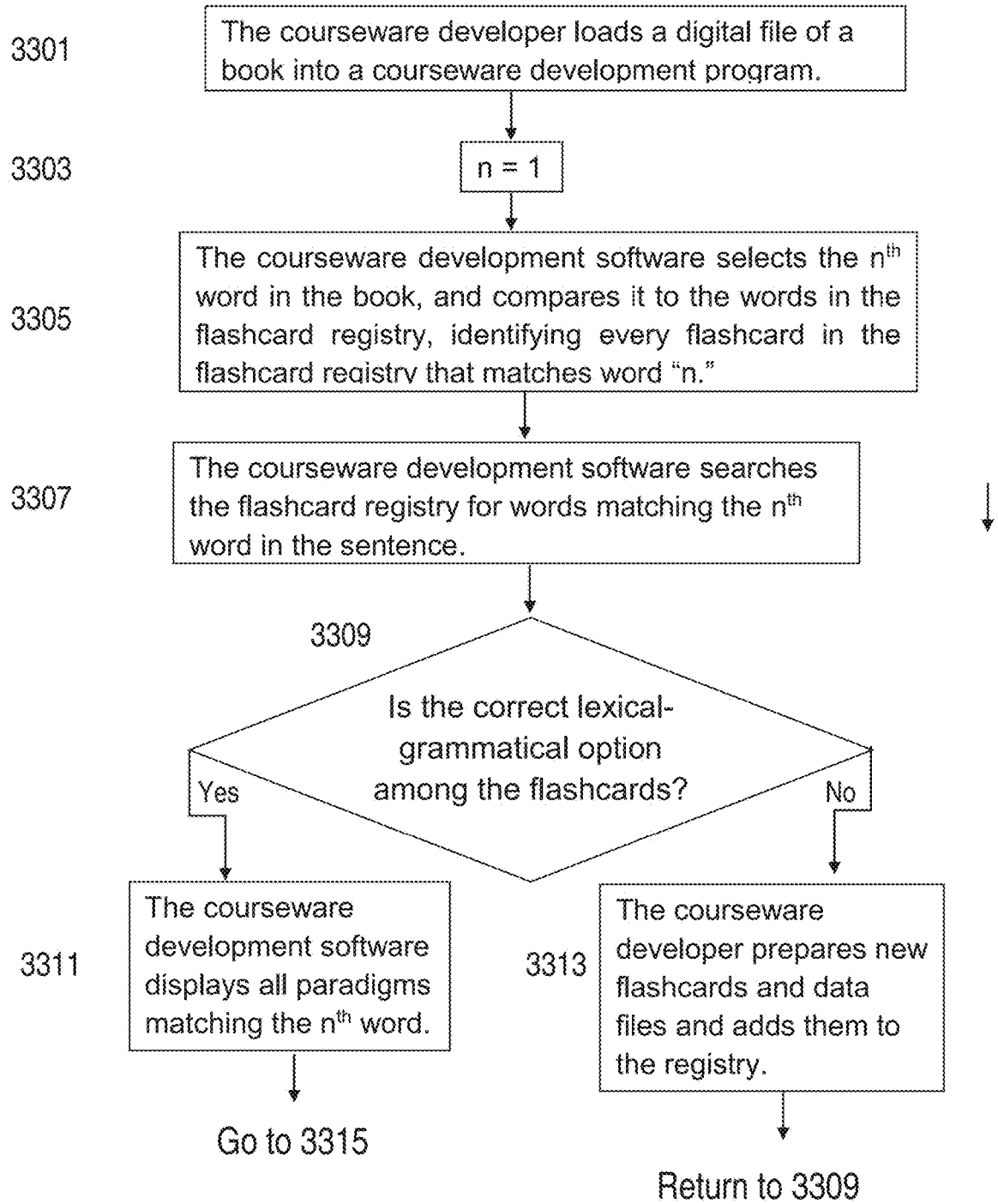

FIG. 33    (continued)

3315    The courseware developer selects all of the relevant options presented in step 3311, which are linked to the $n^{th}$ word in the interlinear text.

3317    $n = n + 1$

Return to Step 3305

FIG. 36

3601: The Student (or the application) selects a most temporally remote time in the forthcoming day, after which, the student does not expect to be further reviewing flashcards. The time is designated as "$t_1$."

3603: The student (or the Application) selects a time as the proximate temporal limit for the exercise. The time is designated as "$t_{final}$."

3605: The Application generates a First Temporary Flashcard Queue, including a first timestamp field.

3607: The Application writes the predetermined timestamp $t_1$ into the timestamp field of the First Temporary Flashcard Queue.

3609: The application calculates one or more performance metrics for all active flashcards in the flashcard registry (or a file folder or subset of the registry) using timestamp $t_1$.

3611: The application identifies those active flashcards that will be stale due to time decay by time $t_1$, and stores the identities of these flashcards in the First Temporary Flashcard Queue.

| Present Active Indicative | | |
|---|---|---|
| | Singular | Plural |
| 1st Person | ζηλῶ<br>1 Cor. 1:12. | ζηλοῦμεν |
| 2nd Person | ζηλεῖς | ζηλοῦτε<br>1 Cor. 12:31;<br>Wsd. 1:12 |
| 3rd Person | ζηλοῖ<br>1 Cor. 13:4; 2<br>Cor. 12:20, Gal.<br>4:20 | ζηλοῦσιν<br>Gal. 4:17 |

You are seeking.
You zealously seek after.

3903

| Present Active Imperative | | |
|---|---|---|
| | Singular | Plural |
| 1st Person | | |
| 2nd Person | ζήλου<br>Ps. 36:1; Prv.<br>6:34, 24:19; Ez<br>16:32, Sir. 9:1 | ζηλοῦτε<br>1 Cor. 12:31;<br>Wsd. 1:12 |
| 3rd Person | ζηλούτω<br>Prov. 23:17,<br>LXX | ζηλούντων<br>Sir. 37:1<br>(Classical) |

Seek!
Zealously seek after!

3905    3907
   3909

3911
   3913        3915

| ζηλοῦτε | δὲ | τὰ | χαρίσματα | τὰ | μείζονα. | covet earnestly    but   the   gifts         the    greater.

1 Corinthians 12:31

3917    3919

Done

FIG. 40

Present Active Indicative — 3901

|  | Singular | Plural |
|---|---|---|
| 1st Person | ζηλῶ<br>2 Cor. 11:2. | ζηλοῦμεν |
| 2nd Person | ζηλεις | ζηλοῦτε<br>1 Cor. 12:31;<br>Wsd. 1:12 |
| 3rd Person | ζηλοι<br>1 Cor. 13:4; 2<br>Cor. 12:20; Gal.<br>5:20 | ζηλοῦσιν<br>Gal. 4:17 |

You are seeking.
You zealously seek after.

Present Active Imperative — 3903

|  | Singular | Plural |
|---|---|---|
| 1st Person |  |  |
| 2nd Person | ζήλου<br>Ps. 36:1; Prv.<br>6:34, 24:19; Ez.<br>16:38; Sir. 9:1 | ζηλοῦτε<br>1 Cor. 12:31;<br>Wsd. 1:12 |
| 3rd Person | ζηλούτω<br>Prov. 23:17,<br>LXX | ζηλούντων<br>Sir. 37:1<br>(Classical) |

Seek!
Zealously seek after!

3905  3907
3909
3911  4001
3913  3915

| ζηλοῦτε | δὲ | τὰ | χαρίσματα | τὰ | μείζονα. |
|---|---|---|---|---|---|
| covet earnestly | but | the | gifts | the | greater. | Show / Hide |

1 Corinthians 12:31

3017  4003  3911

| Grade |
|---|
| No grades, I'm just reading |

METHOD AND APPARATUS FOR ADVANCING THROUGH A DECK OF DIGITAL FLASHCARDS

CROSS-REFERENCE TO RELATED APPLICATIONS

This application claims benefit of priority from, and incorporates by reference in its entirety, U.S. Provisional Application No. 62/110,464 "Method and Apparatus for Computer Based Teaching, and Incentivizing of Testing, Learning, Performing Tasks, and Developing Skills" by Patrick Leddy, filed on Jan. 31, 2015, and is also related to "Method and Apparatus for Incentivization of Learning," U.S. Pat. App. Ser. No. 14/939,483 by Patrick Leddy, filed concurrently herewith.

BACKGROUND OF THE INVENTION

Field of the Invention

The present invention is directed to the field of computer based learning. More particularly, the present invention is directed toward web/internet based incentivization of students, and automated control of digital flashcards and lessons to optimize learning in a digital environment.

Description of the Prior Art

Digital computers are well known in the art, and typically comprise one or more digital input/output ("I/O") ports and/or receivers for receiving input signals from a keyboard, a virtual keyboard, a touch screen, a mouse pad, "right click" and "left click" inputs, voice-to-text input and processing capabilities, vocal command input and processing capabilities, infra-red and RF signals such as blue tooth. Most of the information processing described herein is therefore understood in terms of digital functions performed by a digital computer. Digital protocols for computer I/O include, but are not limited to, IRQ interrupts or other token polling type protocols, token passing, contention (e.g. Ethernet), serial port, parallel port, USB input and output (I/O) capabilities, and the corresponding transmitters and receivers as appropriate. A computer also has output/transmission capabilities for one or more outputs including, but not limited to, a visual display, an audio display, as well as communication protocols. Moreover, the term "computer" comprehends mobile battery powered units of any size (e.g. "hand held" devices which were, at one time, limited to cellular telephone functionality, "tablet" devices, and "laptop" computing devices). Because size is fundamentally a spectrum, the distinction between different computing devices is not relevant to the embodiments described herein. The term "computer" further comprehends "desktop" units which are not designed for mobility, and may have little or no battery capability. Internet access includes "hard-wire" access and wireless access. Moreover, throughout this disclosure, "Internet" access is not limited to IP (Internet Protocol) messaging. Smart phones using CDMA ("code division multiple access"), TDMA ("time division multiple access") and FDMA ("frequency division multiple access") are often able to access visual "URL pages" which are interactive, and resembling in form and function, an "Internet page." The term "Internet" comprehends the widest possible array of accessible page displays, including, but not limited to, IP, CDMA, TDMA, FDMA, Intra-net, Extra-net, and limited access networks (LANS) with a functionality resembling traditional Internet functionality.

Many computers also have one or more digital storage devices including RAM, erasable and non-erasable PROMs, rotating media such as hard drives, optical disks and "floppy drives", and solid state memories. Digital storage devices comprehend removable devices such as optical disks and "thumb drives," permanently installed "hard drives" comprised of metal, metal oxide, or any other storage media, and remote storage devices accessed through the Internet or some other channel of transmission. Some remote storage and processing devices are referred to as "the cloud." The term "computer" comprehends all of these functions and apparatuses, and further comprehends a device having one or more microprocessors with digital processing capability, an operating system, and one or more "applications," as well as devices which distribute tasks to the "cloud" or remote processing.

As used herein, the term "application" describes a digital program comprised of digital code. An application runs on a computer and can be stored in digital storage media of a computer, or alternatively, stored remotely in the "cloud." Typically, the term "application" refers to a computer program capable of performing a wide variety of digital processing functions that are highly integrated in a common program. For example, spell checking, highlighting, italicizing or underscoring text, cutting and pasting text, and altering margins are distinct digital functions, but are deemed related to "word processing." These diverse digital functions are therefore typically part of a single word processing "application." A "module" is also a digital program integrated with an application. The distinction between an application and a module is largely one of consumer expectation, rather than any "bright line" distinction in information processing. For example, consumers will not pay extra for the ability to underline a word in a word processing system, but might be willing to pay extra for the ability to type or edit Chinese or Arabic on a system normally accustomed to the Latin alphabet. Hence, a programmable feature to underline a word in a digital paragraph, typically, would not be considered a "module," but an integral part of the application. At one time, functionality to type in non-Latin alphabets was an "add on module." Increasingly, foreign alphabets are considered part of an application due to consumer expectation, whereas, at this time, spell checkers in foreign languages are, in some instances, "add-ons" that cost extra, and may therefore be considered a "module."

A "suite" typically comprises a collection of applications which are conceptually distinct. For example, a word processing program such as Microsoft Word is commonly known as an "application." An integrated collection of Microsoft products, such as word (word processing), "Outlook" (e-mail) and Excel (spread sheet) may comprise a "suite."

An application typically appears in a single "window," (computer display), with icons and components pre-arranged on the screen lay-out, or a "menu" of an application which gives the appearance that alternative "windows" are accessed through the "same" application, whereas a "suite" typically requires opening separate "windows" to run or view distinct applications that are part of the suite.

Ultimately, however, there is no bright line between a module, an application, and a suite, and the distinction is in large part, one of cost, and consumer expectation. Therefore, the use of the terms "application", "module" and "suite" herein are employed exclusively to best describe the invention in terms that will enable the reader to make and use the same, and are not intended to limit the embodiments described herein, which comprehend the widest scope of these terms.

Government and citizens alike are alarmed at the snowballing reality that our schools are not educating children. In 1955, Rudolf Flesch's blockbuster book, "Why Johnny Can't Read" shocked the conscience of a nation. In 1981, Flesch's reprisal, "Why Johnny Still Can't Read," continued to underscore how ossified the government and educational communities had become to the tragic reality that our schools are not educating. Although Flesch may have established himself as the choragus of this vocalized dissent, he was not singing solo. Charlotte Iserbyt's "The Deliberate Dumbing Down of America" and John Taylor Gatto's monumental, "The Underground History of American Education" harmonized at soprano and bass. While all seem to agree that our elementary and secondary education systems are failing, few are looking for new solutions. The most common solution has been to increase taxes to "spend more on education," or introduce lotteries, with the promise that proceeds from the lotteries will "go to education." These solutions have proven abysmal failures.

At one time, flash cards were a primary tool for repetition in learning and memorizing facts. With the advent of the computer era, digital applications have been developed to duplicate, in some measure, the "flash card" experience in different fields of learning. For example, applications for learning a foreign language may disclose a word in the user's native language, and, after a pause allows the user to recite or type the foreign language equivalent, subsequently display through visual or audio output, the foreign language equivalent.

Nevertheless, because of a less than optimal arrangement of the order and frequency with which flash cards are presented to users in digital courseware, the effectiveness of digital flashcards remains sub-optimal. There remains therefore a need for optimization of the arrangement and frequency with which flashcards are presented to the user to maximize the learning experience.

Moreover, students are under-motivated to avail themselves of online learning products that already exist. For many years, parents across the world have used money as an incentive for their children to study and make good grades. Statistics demonstrate that the effects of incentivization are significant. However, the incentivization models, though a significant improvement, also remain sub-optimal. There remains therefore a need for more effectively incentivizing students to utilize a digital computer based learning platform(s) to maximize the effectiveness of study.

BRIEF DESCRIPTION OF THE SEVERAL VIEWS OF THE DRAWINGS

FIG. 2 depicts an embodiment of a front page of a flashcard for use in the incentivized and optimized learning program of FIG. 1.

FIG. 3 depicts a "student's answer" page for a flashcard depicted in FIG. 2, which, in the example of FIG. 3, comprises a text box in which the student can type an answer.

FIG. 4 depicts the answer page for a flashcard depicted in FIG. 2, including a digital field for self-assessment of accuracy.

FIG. 5 depicts an embodiment of a "user configuration page" for use in conjunction with the incentivized and optimized learning program depicted in part in FIG. 1.

FIG. 6 depicts an embodiment of a "donor configuration page" for use in conjunction with the incentivized and optimized learning program depicted in part in FIG. 1.

FIG. 7 depicts an embodiment of a "strength of learning" page for use in conjunction with the incentivized and optimized learning program of FIGS. 1-4.

FIG. 9 depicts an embodiment of a pronunciation interface screen for use in conjunction with the flashcard of FIGS. 2-4.

FIG. 11 depicts an alternative embodiment of a rear page ("answer page") of the flashcard of FIG. 10, for use in conjunction with the incentivized and optimized learning program of FIG. 1.

FIG. 12 depicts an embodiment of an interactive digital animation teaching a principle related to the flashcards of FIGS. 10 and 11.

FIG. 13 discloses an embodiment of equations available from a link on the flashcard of FIG. and 11.

FIG. 15 depicts an embodiment of a table of general algebraic principles which for the core of an algebra course.

FIG. 16 depicts a flashcard generator table for use by a courseware developer in developing flashcards for prime factoring in an algebra class.

FIG. 17 depicts a table-builder module for use by a courseware developer in developing flashcards and tables to teach various subjects, as discussed in FIGS. 1-4, 8, and 10-14.

FIG. 19 depicts an embodiment of a data file for flashcard F-0332, which is a hypothetical algebraic flashcard for prime factoring the value "18," such as discussed in conjunction with FIG. 16.

FIG. 20 is a data file for algebraic principle AP-0021 which comprises multiple flashcards as depicted in FIG. 16. The data file for this principle includes a histogram that records any answers to any flashcards relating to the principle.

FIG. 22 depicts the "answer side" of the flashcard depicted in FIG. 21.

FIG. 23 depicts a data table of general principles of Russian Grammar from which flashcards in a Russian language course will be derived.

FIG. 24 depicts an embodiment of a grammatical paradigm for masculine Russian nouns ending in a consonant, as depicted by general principle GP-0015 (element 2301) of FIG. 23.

FIG. 25 depicts a paradigm generation module for generating grammatical paradigms related to a general principle in FIG. 23.

FIGS. 27-a depicts the first half of a continuous data file for the word "glaz," as generated by a paradigm generation module such as depicted in FIG. 26.

FIG. 27-b depicts the second half of the continuous data file of FIG. 27-a, and includes a histogram which will record any attempt to answer any flashcard for any grammatical or morphological construction comprising the root word "glaz."

FIG. 28 depicts a data file for the flashcard comprising the word "glazom," which is a grammatical construct of the word of FIGS. 27-a, b, according to a grammatical principle of FIG. 23. The data file of FIG. 28 includes a histogram which will record any attempt to answer the flashcard F-3483.

FIG. 29 depicts the "front side" of a flashcard generated from the data file of FIG. 28.

FIG. 30a depicts an embodiment of an answer page of the question of FIG. 29. The answer page is generated from the data file of FIG. 28, and includes the option of a self-assessment of the student's response/answer. In the embodiment of FIG. 30a, the student has assessed his/her most recent answer as "correct."

FIG. 30b depicts an embodiment of an answer page of the question of FIG. 29. The answer page is generated from the data file of FIG. 28, and includes the option of a self-assessment of the student's response/answer. In the embodiment of FIG. 30b, the student has assessed his/her most recent answer as "incorrect" and nested menu has appeared to identify what portions the student answered correctly, and what portions the student answered incorrectly.

FIG. 31 depicts a data file and histogram for the grammatical principle associated with FIGS. 28, 29, 30a and 30b.

FIG. 32 depicts a flow chart of a method for answering a compound flashcard as depicted in FIGS. 29, 30a and 30b.

FIG. 33 depicts a flow chart of a method for preparing and presenting flashcards for reading a book or piece of literature in a foreign language.

FIG. 39 depicts an embodiment of a screen shot of a developmental screen for generating an interlinear book in a foreign language with pop-ups of grammatical paradigms, definitions and other student aids.

FIG. 40 depicts an embodiment of a screen shot of an interlinear book in a foreign language as displayed to a student, including pop-ups of grammatical paradigms, definitions and other student aids.

DETAILED DESCRIPTION

Architecture of Incentive Program

In select embodiments described herein, students are incentivized to learn through a digital Application 120 (FIG. 1) which may run on a computer device, such as a desktop computer, notebook, tablet, or "smart phone." The application presents lessons, that may include, but are not limited to, digital flash cards, audio and video lectures, and text based lessons which may be supplemented by figures, drawings and pictures, or audio recordings. As used throughout this disclosure, terms such as "video" and "image" comprehend the widest scope of meaning, including static images such as JPEG, semi-animated images such as flash technology and GIF images, and fully animated images such as MPG4. Metrics are generated to quantify the student's performance. When metrics satisfy certain predetermined criteria, incentives are released to the student/user.

Overview of Relevant Entities

Figure 1:
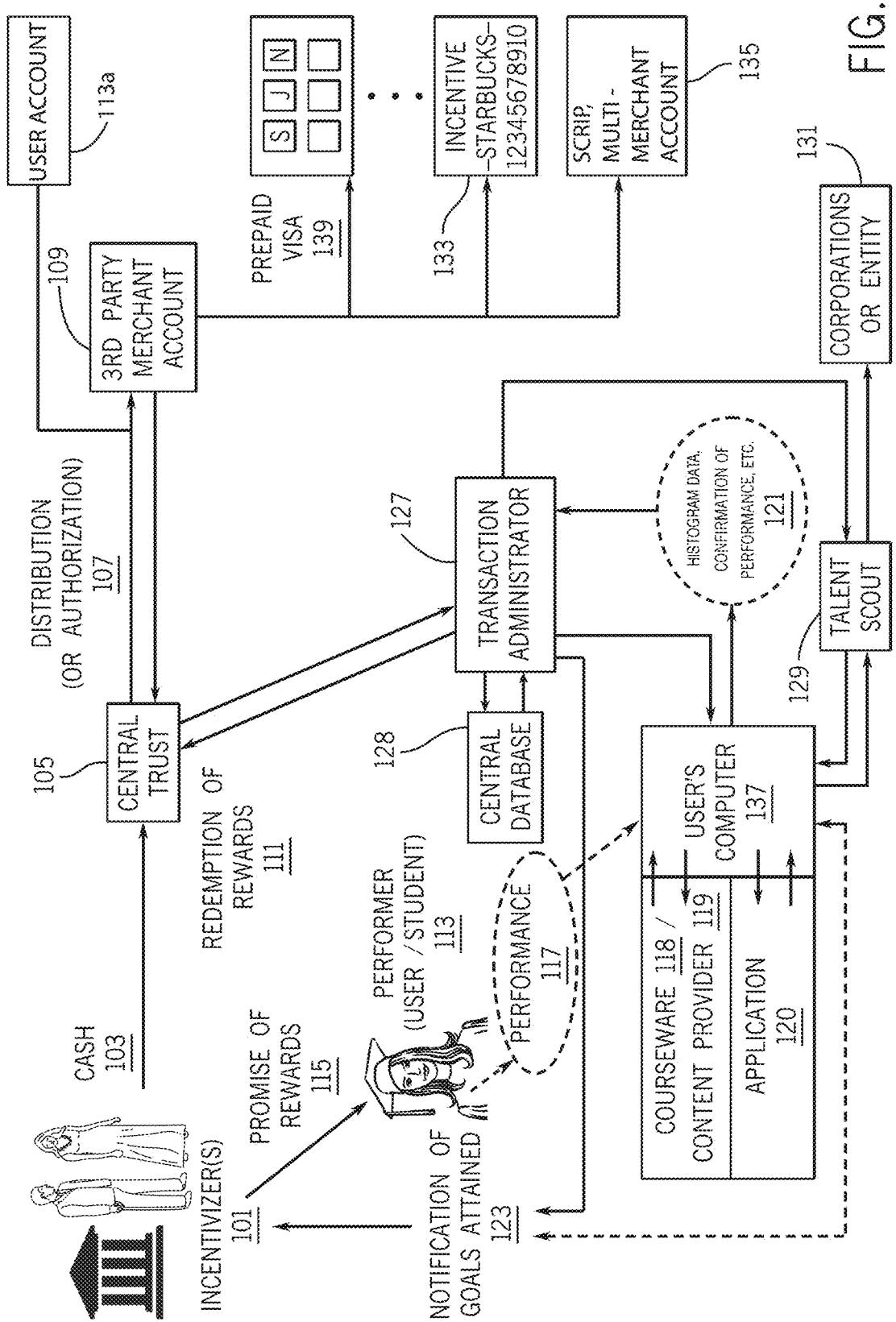
FIG. 1 depicts an embodiment of an overview of the system and network of incentivized and optimized learning.

FIG. 1 depicts an overview of a network of entities described herein. An incentivizer 101 may be a an institution (e.g. a university, law firm, technical corporation, etc.) or a person. The incentivizer 101 pledges rewards 115 to a user 113, who may be a student. Cash 103 is withdrawn from an account of the incentivizes and placed in a central trust 105, which may be a private bank or other financial entity. A content provider 119 develops flash cards and other courseware 118 for use and display on a computer device 137. In an embodiment, the courseware 118 runs on an application 120 on the user's computer in a manner analogous to the relationship between a software program and an operating system. This analogy, however, is not intended to limit the architecture and interface of a courseware and the application. The computer 137 may be a "smart phone," laptop, tablet, or any other computing device, and preferably, a mobile computing device. As used herein, a "performer" 113 refers to a person or entity whose performance is being assessed through the application. In many of the embodiments described herein, the performer is coextensive with a "student" studying courseware, who happens to be a "user" of application and the courseware crafted by a content provider. In such embodiments, these terms may be used interchangeably.

The transaction administrator 127 may be a single entity, or a plurality of geographically distributed entities that regulate and administer the program described herein. Although the transaction administrator 127 is generally described herein in terms of a digital device managing and regulating the functionality associated with FIG. 1, it may also include human agents who make critical decisions and inputs. The transaction administrator 127 receives data about users 113, principally from a user's computer 137, and stores data in the central database 128. The transaction administrator communicates with the central data base 128 to conduct statistical analysis on the broad range of data stored therein. Statistical analysis may include adaptive learning and/or artificial intelligence programs described herein.

A "talent scout" or "talent broker" 129 accesses the central data base 128, preferably through the transaction administrator 127 and identifies talent based on test scores, personal interests, and other demographic factors, and brokers talented individuals to corporations, schools, or other entities 131 that may be interested.

Content Provider

The "content provider" 119 (also referred to as a "courseware provider" or "courseware developer") generally refers to an entity that has developed or markets a digital educational aid (courseware 118) that runs in conjunction on/with the application 120 on a computer device 137 such as a "smart phone," laptop computer, or other computing device. Content of the educational application 118 may include, but is not limited to, digital flashcards (a sequence of questions and answers presented through a digital computing device) or audio/video lectures, interactive applications such as the "ideal gas law simulator," written lessons, summaries study guides, or combinations thereof. Examples of courseware include, but are not limited to lessons crafted to prepare a student for a college entrance exam, French grammar and vocabulary, algebra, or lessons designed to equip someone seeking re-certification with the Federal Aeronautics Association, ongoing training for enlisted navy personnel, etc. In an embodiment, the courseware 118 is distinct from the application 120, and runs "on" (or in cooperation) with, the application. For example, a college entrance exam prep course may be prepared by "College-Prep, Inc." The course comprises flash cards designed to drill the student in vocabulary and mathematics, is designed to run seamlessly "on" or "with" the incentivization application.

Reward Notifications

Notifications are also sent when a student earns certain rewards, or to remind the student of the available reward. For example: "You have just earned another $10 reward redeemable at Best Buy. You now have $150 available for purchase at Best Buy," or "you are 37% toward the new Corvette Stingray." Appropriate notifications are also sent to incentivizers, telling them that funds are being transferred from their account, or notifying them that funds have been released to the student whom they were incentivizing.

Still referring to FIG. 1, a third party merchant 109 is an entity to whom funds will eventually be transferred. Examples of third party merchants might be: a prepaid credit card, a prepaid debit card 139, gift cards to a specific merchant such as Starbucks, Jamba Juice, Best Buy, Nordstrom, etc. 133, or scrip cards good at multiple participating merchants 135. The use of the term "card" is comprehensive, and includes mobile cell-phone applications that identify a user (or the account of a user) by a screen image, public-key/private-key challenge and responses, and any other means of identifying and safeguarding an account of an incentivizer 101 or a user 113.

Funds may be distributed directly from the central trust 105 to a user account 113a, (such as a checking or savings account of user 113). User accounts and third party merchants receiving such distributions can be thought of as functionally equivalent to a successor trustee through which trust assets are routed in distribution to a beneficiary.

Still referring to FIG. 1, a transaction administrator 127 includes the entity that administers network transactions. The transaction administrator is preferably architected to seamlessly interface with the application 120 through the user's computer. The transaction administrator initializes or facilitates the transfer of money 103 from the incentivizers 101 to the central trust 105, and also initializes or facilitates the distribution of money 107 from a central trust 105 to a third party merchant account 109, or to a user's account 113a. The transaction administrator 127 also initializes notice 123 to the incentivizers 101 when goals have been attained and rewards are being released.

In an embodiment, interest is earned by the central trust 105 until the money is distributed to, or spent by, the user 113. The operation and functionality of the Central Trust is advantageously designed to conform to national banking laws and/or to avoid restrictive banking regulations which would unnecessarily encumber the operation of the central trust without enhancing relevant functionality.

Various embodiments for effecting a transfer of money from the central trust 105 to third party merchants allow money to remain in the central trust until the day of a user 113 transaction for goods or services from a third party merchant 109. This allows the central trust 105 to draw interest on the money saved therein, until the time of the transaction. A noteworthy feature of many of the embodiments described herein, however, is that they need not constitute a business method. A method of incentivizing studies is fundamentally a method to enhance learning, whether or not any fee is taken out by the central trust 105 or the transaction administrator 127 in the incentivization process.

The transaction administrator 127 is also responsible for performing statistical analysis or otherwise running adaptive learning/and/or artificial intelligence applications described below. The transaction administrator advantageously utilizes data in the central data base 128 in the execution of any adaptive learning or artificial intelligence functions.

Flash Cards

FIGS. 2-4 and 8-13 depict various embodiments of flashcards and lessons for use in conjunction with various embodiments of the claimed invention.

FIG. 2 depicts an embodiment of the "front side" 200 (question side) a digital flashcard. The "question" in this example is the English phrase "with whom" 201. The question solicits the student to translate the term into Russian. The front page also includes a variety of icons, including a "configuration icon" 203 that links to a configuration page of that allows the user to configure certain aspects of the configuration page, shown in greater detail in FIG. 5. A "strength of learning" icon 205 links to a page depicted in FIG. 7, disclosing the student's "strength of learning" and/or other performance metrics relative to the flashcard in question, and the course in question. Although embodiments are envisioned that utilize multiple strength-of-learning values and/or multiple performance metrics, these terms may overlap in meaning, and therefore, may be used interchangeably throughout this disclosure, and are intended to be interpreted so as to give the widest scope to the appended claims.

An "incentives" icon 207 links to a screen display describing to a student the incentives that have been pledged, those that have been released and are available for redemption, and those that are available, but for which the student has yet to meet certain performance objectives before redemption is available, including the specific courses. Icons and links, including, but not limited to, 203, 205 and 207 may appear on the "front side," "back side," or both sides of the digital flashcard.

FIG. 3 depicts an embodiment of a fillable field 301 of a "student's answer," in which the student may type in the proposed answer and submit it as his or her answer to the question. Continuing with the example of FIG. 2 in which the student is asked to translate a phrase into Russian, assistance in the form of a keyboard link 303 is available to display the layout of a Russian keyboard for the user.

Although not relevant to the example of FIG. 2, FIG. 3 also depicts other forms of student answers which may be used in conjunction with various embodiments, including clicking on the correct answer of a "true/false" question 305, and "multiple choice" answers 307. Additionally, embodiments are envisioned in which a student "says the answer to himself," and then clicks "enter" or some other prompt to advance to the "answer page."

FIG. 4 depicts the "back side" 400 of a digital flashcard 200 (also referred to herein as the "second side" or the "answer page"). The "answer" to the example question is displayed on FIG. 4 as the Russian phrase "с с кем " 401 (pronounced "skyem"). This is the translation of the English phrase "with whom." A self-assessment field 403 allows a use to grade the answer which he gave to the "question" (the first side). If grades are assigned automatically (such as true-false questions), self-assessment may be dispensed with. However, even in auto-assigned grades, a user may seek to override an assigned grade. For example, a student may answer "false," and immediately realize he or she simple lost concentration on a flashcard with which they were perfectly fluent. As illustrated below, self-assessment and/or user override of an auto-assigned grade may be controlled through the configuration page. For example, the parents of a student note that their son cheated on an earlier flashcard course, and was plainly unprepared for the final exam. To prevent such behavior, the parents may decide that their child lacks the character or maturity to self-assess his or her performance. Accordingly, a parent or incentivizer may have the option of restricting this prerogative in a configuration screen. In certain applications, such as "reciting a Bible verse," the programmer may determine that the user preference to "recite the answer to oneself" so outweighs the need to confirm the answer by an auto-answer, that the restriction is not available in a configuration page.

Referring still to FIG. 4, link 405 initiates a screen or pop-up that declines (or parses) a word or phrase in a foreign language. In the example of FIG. 4, the declination is: "the interrogatory pronoun of "кто " (who/whom) in the instrumental case." When an answer is brief, such as declining the phrase "с с кем ," clicking on the link need not open up a separate window or screen, but may simply open up a pop-up bubble within the screen display of FIG. 4.

FIG. 7 depicts an example of a "strength of learning" screen accessed through the "strength of learning" icon 205. It quantifies or describes the student's strength in specific flashcards, as well as the student's strength in the course under review. The specific learning metrics listed on FIG. 7 are offered only as examples. Other metrics are envisioned as useful to the student.

Figure 8:
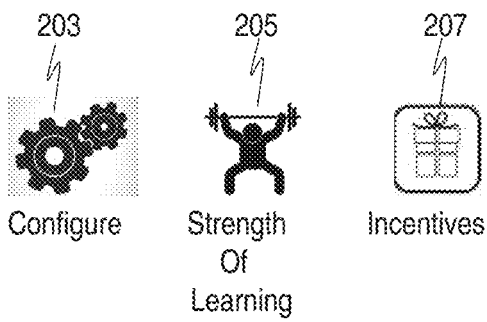
FIG. 8 depicts an embodiment of an "interrogative pronoun chart" for use in conjunction with the flashcard of FIGS. 2-4.

Still referring to FIG. 4, link 407 opens the screen display depicted in FIG. 8, disclosing a chart of the interrogative Russian pronouns кто ("kto͞," who), что ("shto͞," what), and сколько ("SKO͞L-ka," how many/much), arranged by case.

FIG. 9 depicts a screen accessible through icon 409 of FIG. 4, and includes a "playback" key, a "slow playback" key for generating an audio output of the word or phrase, and a pronunciation guide offering pronunciation tips to the student.

Still referring to FIG. 4, link 411 opens one or more MP3 lectures on interrogative pronoun, pronouns in general, the instrumental case and the Russian preposition "с" (pronounced like the English "s"). In a preferred embodiment, if multiple audio lectures are available, the MP3 link 411 links to a screen disclosing each of the multiple lectures, the length of each lecture (in minutes and seconds), and the topic of the lecture.

Links 413 and 415 are links to video recordings. If no such lectures are associated with the flashcard answer of FIG. 4, the icons are preferably not present on the screen. As discussed below, however, in a flashcard set on physics, the ideal gas law may be illustrated by flash animation or other video formats.

If there are multiple audio or video lessons, in an embodiment, a menu page opens, disclosing the alternative audio/video lessons. Shorthand descriptions may include the title of the lecture, the length (in time) of the lesson, the publisher or textbook with which the lesson is associated, and/or other indicators so that the student may select the audio/video lesson with some knowledge of the options available. For example, a student who has completed a lengthy written lesson, or who has viewed or listened to a lengthy audio/video lesson, may desire only a brief summary to remind them of the principles in question. If a student has reviewed, at length the ideal gas law, the student simply may wish to review the "ideal gas law simulator" of FIG. 12 at frequent intervals. A daily review of the simulation of FIG. 12 may take a minute or less, but, through repetition, the student may develop and retain an intuitive feel for the ideal gas law, reinforcing by repetition what they have learned, with minimum expenditure of time. As discussed throughout this disclosure, a statistical analysis of students, and the utilization of adaptive learning and/or artificial intelligence programs will optimize the course by varying a wide variety of parameters and recording student performance. A central data base will record the frequency and intervals of review of learning modules, including interactive learning modules such as FIG. 12, and ascertain, through analysis of data, the optimal frequency of review, and occasions of review.

In an embodiment, the program will advantageously use different lessons to explain and teach, test and drill, summarize and review the ideal gas law. As numbers are crunched for tens of thousands of students, the statistical analysis will gradually identify the most effective course for teaching the subject, the most effective courses for reviewing the subject and maintaining student proficiency—as well as how frequently those courses are best reviewed. (The term "how frequently" is not intended to limit such review to a time delay. For example, the student's performance on flashcards, and the performance metrics associated therewith, may be considered in the triggering of review of a lesson. Review flashcards may be tailored to avoid the need for lengthy calculations, while reviewing the mathematical principles with sufficient depth that the student stays "current" in this skill.

Link 417 is to text or written lessons. If there are multiple lessons, in an embodiment, a menu page opens, disclosing the alternative written lessons. Shorthand descriptions may include the length of the lesson, or the publisher or textbook with which the lesson is associated, so that the student may select a written lesson based on length, or preference. A student who has read a chapter on a topic may desire only a brief summary to remind them of the principles in question. In such embodiments, separate links open to the various written lessons.

Figure 10:
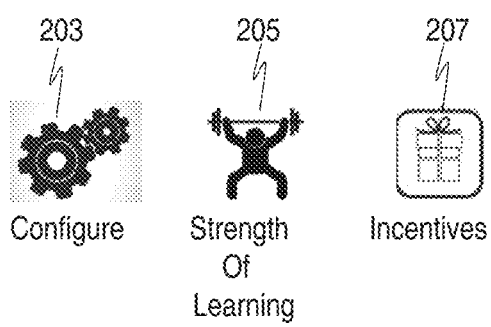
FIG. 10 depicts an alternative embodiment of a front page of a flashcard for the ideal gas law, which can be used in conjunction with the incentivized and optimized learning program of FIG. 1.

FIGS. 10 through 13 are examples of flashcards and lessons for the ideal gas law in the field of physics. FIG. 10 is the front page of a flashcard requesting that the user recite the ideal gas law. FIG. 11 is the back page or answer page for the ideal gas law question. The videos 413, 415 may include flash animation lessons, such as depicted in FIG. 12.

FIG. 12 depicts two adjacent containers, which will, in more advanced animations, include gages for pressure and temperature, and "hoses" to pump in or release more gas molecules, with appropriate user interface figures. In addition to illustrative temperature and pressure gages, they may change color from red (hot) to blue (cold) as the temperature changes, and the sides may bulge or become concave as pressure is increased or decreased. Air molecules are represented by balls bouncing off the sides of the tank. The animation advantageously includes an audio portion representing the collisions of molecules with the container, sounding something like popcorn. By selecting the variables that may change, and which are held constant, the animation depicts, in visual and intuitively clear manner, the effect that increasing or decreasing one variable has on the other variable(s). For example, by increasing "n" (the number of molecules or moles) through the pump, the student can see the effect on pressure, or temperature. In discussions of scientific laws and equations, the links at the bottom of FIG. 11 will preferably include an "Equations link" 1105. Depending on the student's level of education, relevant equations linked from the "ideal gas law" might include such a list of equations will advantageously disclose a summary of relevant equations in fluid mechanics, including the ideal gas law, and equations of Boyle, Bernoulli, Stokes, Euler, Navier, etc.

Flashcards on the ideal gas law advantageously include problems to solve, with answers disclosing the correct answer.

Importing Text Lessons or Parts of Courses

In an embodiment, digital lessons embedded within a flashcard review course may be flagged for substitution. For example, if "World Textbook Publisher" publishes a textbook on algebra, and seeks to merge their material with a predesigned flashcard review, they may correlate specific lessons from their textbook with the lesson portion of the flashcards. A configuration page is advantageously prepared for every flashcard review course. If no lesson is accessible through a flashcard, the link or icon is not visible, or a faded grayscale depiction of the font, indicating it is not operational or accessible at that time. If a textbook has been merged, the lessons associated with a link or icon on a particular flashcard are those prepared by the textbook publisher.

Any percent of a textbook may be imported. For example, a textbook publisher may feel that every aspect of their lesson is superior, and not even utilize existing flashcards or chose to link to them. Alternatively, they may determine to import the text lessons of the publisher in place of any text notes of the default program. In partial importation, the publisher may elect to allow links to remain active for other flashcards, flash animation lessons, etc. Alternatively, the textbook publisher may exclude some, or all of the default flashcards and "linked" lessons and helps. If no lesson is substituted, the default lesson, if any, is accessed through the link. In a preferred embodiment, a trademark or indicator of origin will identify the publisher and textbook name and edition if substitution has been made. Embodiments are also envisioned wherein an entire deck of flashcards is prepared by a specific publisher, including the flashcards and lessons. In such an instance, every screen will advantageously display the publisher's trademark.

The depiction of select icons in conjunction with FIGS. 2, 4, and 7-13 are not intended to preclude other potential icons or links that may be displayed. An important feature of the icons, however, is that they are intuitive to the user. Therefore, the meaning and significance of the icons should be consistent.

Some embodiments require a user input of an answer through keypad, touchscreen, audio input, or some other input means. However, alternative embodiments permit a user simply to answer "silently to himself." Although audio embodiments are envisioned, particularly for music appreciation (such as flashcards requiring the student to identify a Beethoven symphony from listening to a ten second segment of a piece), many of the examples herein are directed to screen display embodiments. These specific details are not intended to limit the claims, nor the broad range of alternative embodiments described herein. Accordingly, descriptions of visual flashcards are intended to extend to audio flashcards for music appreciation, speech recognition and the like.

Cycling Through Flashcards

In flashcards or lessons, the transition from question screen to answer screen can be time driven (e.g. a ten second delay), or event driven (e.g. the user must click a key, a virtual key such as "next," or recite a command.) If the user enters an answer through a computer input (e.g. entering a touch screen answer for a multiple-choice question, or keystroking the answer in a digital field), the application will automatically generate the user's score. Alternatively, as illustrated in FIGS. 4, 11, 30*a* and 30*b*, a user may enter a score after the application discloses the answer. For example, after the answer is displayed, the user enters a self-assessment of their accuracy. This self-assessment may be a between two possible assessments such as "correct" and "incorrect," or a number value (such as any integer from one to five, though this scale is offered only by way of example). A "flashcard" embodiment of question and answer is therefore particularly amenable to grading the user's progress.

Credit for Viewing Lessons

Student participation in viewing non-interactive online lectures may be confirmed through a number of known means, such as having a student enter a number that appears on the screen at various times throughout the lecture. Distribution of incentives is then predicated, at least in part, on participation in lectures, performance on interactive flashcards, or a combination thereof. After certain participation and performance milestones are reached, one or more messages (including commands, bank transfers, "acks," "nacks," etc.) are transmitted across the Internet to the appropriate entity, authorizing and executing the release or distribution of incentives to the user. A digital message, such as a text message on a cell phone, notifies the user and/or the incentivizer of the distribution.

Histogram

A histogram, such as depicted in Tables 1 or 2, below, records the accuracy of every answer a user gives to a flashcard question. Metrics derived from histogram data regulate the frequency of presentation of a flashcard, and/or the relative order of presentation of flashcards. Additionally, these metrics may function to regulate the distribution of incentives to participants when a student meets certain predetermined goals. However, embodiments comprising non-interactive learning modules, or non-graded lessons, are also envisioned within the spirit and scope of the invention.

No Answer for Tests and Quizzes

A "courseware developer" 119 may also provide testing material. The primary distinction between testing material and flashcards is that flashcards present a question, and then provide the answer. No answer is normally provided in a digital test or quiz. However, test embodiments are envisioned in which the correct answer is disclosed to the test taker immediately following a user's answer. A second distinction between teaching and testing is that, in a teaching environment, a "wrong answer" will advantageously affect the flashcard order—scheduling the incorrect flashcard for more frequent review in view of the wrong answer. In an online test, however, a wrong answer will not typically trigger a rescheduling of the flashcard for test purposes. However, an incorrect answer may be recorded in the histogram governing for that flashcard, thereby influencing the frequency of review of that flashcard in later review sessions.

Dynamic Testing

Testing may be dynamic, which is to say, the test is not fixed at the time it is administered. Consider an I.Q. test. An inadvertent wrong answer should not be interpreted as an indicator of I.Q. Rather, the "upper limit" of a student is defined where a student begins to err at a predictable rate, e.g. 50%. If a student "maxed-out" early, the test would administer a series of elementary questions. However, if a student quickly shows proficiency in elementary principles, a test will move progressively to more and more difficult material, eventually "maxing out" at a series of more difficult questions wherein a student is answering at about a 50% accuracy rate. As such, two different students would have two very different tests.

Incentivizing Einstein Testing

Referring again to FIG. 1, a "talent broker" or "talent scout" 129 incentivizes users to take an I.Q. test or other talent related test. The test is preferably administered online—but may be downloaded to a user's computer, or even taken at a controlled testing center. In a preferred embodiment, the test is administered iteratively, with incentives being awarded to the highest scoring participants to encourage them to go on to the next round of testing. In this manner, a talent broker can identify progressively rarer and rarer talent. With each successive round of testing, incentives are preferably increased to persuade the most gifted individuals to advance in the testing program. The talent broker 129 may sell lists of individuals falling within a talent bracket. For example, XYZ-tech corporation 131 may be willing to pay a scholarship to a gifted student who might eventually work for them. The talent broker may be willing to sell a list of names to XYZ-tech corporation for a fixed price per name. Alternatively, pools of participants identified through incentivized testing may form target groups for targeted advertising.

Students are incentivized to take online exams or quizzes which identify particular talent in society. For example, certain universities or corporations desire to identify rare talent or extremely gifted individuals. In an embodiment, testing is performed incrementally (i.e. iteratively) with incentives at each increment. The first iteration of an I.Q. test (or some other skill-centered test) is delivered to the subject through the digital application. A talent scout, corporation, university, or other entity incentivizes a broad base of individuals to take the sequence of exams. A single exam is not used to identify the "one in a million" candidate. Rather, using an "I.Q. test" as an example, the first session has a limited number of questions. Its intent is to identify persons by skill or I.Q., but very broadly. The results are not exact. However, students identified in the "top 25%" are identified with a high degree of accuracy. (A student at the $74^{th}$ or $76^{th}$ percentile will obviously have a higher degree of error in a rough exam, but the exam is detailed enough to ensure that very few students in the 90 percentile or above fail the exam by "one bad answer." Similarly, the test is designed such that it is not likely that someone in the $50^{th}$ percentile will score in the $75^{th}$ percentile or above.)

Those who score above the preset threshold (for example, the $75^{th}$ percentile) are incentivized to participate in a second round of testing. Again, a very "rough" or "granular" test may be given. For example, a granular second round test may split the second round of students into five groups, generally estimated to be in the top 5%, top 10%, top 15%, top 20% and top 25%. With a granular exam, it is certainly possible—even likely—that someone in the $89^{th}$ percentile will score above the $90^{th}$ percentile, and that someone in the $91^{st}$ percentile will score below the $90^{th}$ percentile. But the test will optimally be structured to statistically reduce to insignificance, the likelihood that someone in the $85^{th}$ percentile will score in the 95% percentile. The incremental granular approach has three advantages:

i) An iterative examination process circumvents the need for a single omnibus I.Q. exam. A sequence of short exams will suffice, at least until a rather elite group has been culled out.

ii) Shorter exams (e.g. one that lasts perhaps ten minutes rather than a hour) will yield a higher rate of participation, and lower cost to incentivize.

iii) Through this iterative process of incentives and progressive testing, a group of people can be identified based on their I.Q.s. These can be parsed out to persons in the top 1% of society, one out of one thousand, one out of ten thousand, one out of one hundred thousand, and even one out of a million. Each step preferably offers more lucrative incentives at higher levels as individual that are progressively rarer in their talent are identified. This helps to ensure that the most gifted individuals participate in the later exam iterations, even if the later examinations become longer.

Security measures are preferably utilized to ensure that there is no cheating. Later stage testing will advantageously incorporate more stringent security measures. Finger print readers, and facial recognition software may be utilized, as well as registration using official identification cards such as national I.D.s or passport.

Talent brokers sell lists of individuals to entities. Confidentiality may be maintained by requiring initial contact to go through the talent scout. For example, "High I.Q. University" or "High Tech. Inc." expresses interest in students X, Y and Z, the talent broker secures non-circumvention agreements from the university or corporation, and then contacts these students and notifies them of the offers on the table, brokering the contracts or offers that are available.

The Einstein search is not only useful for identifying elite individuals. It can be useful for targeted advertising as well. For example, a heating, ventilation and air conditioning (HVAC) technical school advertises for students. Because of the massive data base of student's scores, the talent scout is able to statistically determine that, for example, persons in the bottom 44% of I.Q.s do not have the aptitude to make it through a course in HVAC, and persons in the top 5% or above are not as likely to be interested in an HVAC career. Accordingly, an HVAC tech school can purchase targeted advertising to that pool of individuals most likely to be interested in a career.

Using I.Q. scores (or other aptitude scores, such as technical knowledge) for targeted advertising may segregate users by product preference, or targeted advertising. For example, a the same new automobile may be highly marketable to people of all I.Q.s, but the specific adds may be more effective for different groups. Techno-nerds (persons with high proficiency in technical matters) may be intrigued by technical advances in battery technology. Penny conscious persons may be most motivated by learning that the energy costs are equivalent to twenty-five cents for a gallon of gasoline. Environmentally conscious persons may be most attracted to the absence of fossil fuels. Some of these idiosyncrasies may have statistical correlates to I.Q., or other testable factors retained on a proprietary data base of the talent scout, enabling the talent scout to sell targeted advertising that is statistically shown to have optimum value and effectiveness.

Because of the extreme sensitive nature of the data collected, extreme measures should be taken to prevent hacking. The database can be physically segregated into two parts which are linked by an encryption key, and separated by switching logic that is substantially impervious to hacking, thereby preventing high level rogue nations from "mining" the database.

The test takers can be selected from a demographic class, such as young people between the ages of seven and sixteen. The incentive may be money, a product, a service, or even a "risk" (an uncertain reward). An example of an uncertain reward would be "one out of ten participants will earn a free sandwich at Subway." Smaller rewards are preferably offered for less rare talent.

Brokers can sell name lists to universities, high-tech corporations or other entities. Alternatively, brokers may protect the confidentiality of testers by acting as intermediaries. Only when a candidate indicates a desire to meet with an entity directly is the introduction made. This protects the confidentiality of candidates.

The method includes: i) offering an incentive for any qualified individual who takes an online test, ii) testing a student's skill in abstract thought, or in a specific subject through online testing, iii) identifying statistical correlates between test results and products or advertising, and iv) using the statistical correlates of test results for targeted advertising.

Einstein Search for Teachers

As discussed below, students will advantageously be able to engage in online sessions with other students in a student-teacher role. Soliciting a good evaluation is easy. However, the true measure of a teacher is the performance of the students who follow in his or her wake. In an embodiment, the central database tracks the performance of a student relative to the lecturer who taught them a specific principle. Statistical analysis of the database will rate the effectiveness of teachers, identifying those who have a stronger effect on the learning of other students. Gifted teachers may then be sought after for "tutoring for pay." Gifted teachers at the high school level may be targeted for recruitment or scholarships to universities that focus on teaching. Gifted teachers at the college level may be sought after by institutions looking for teachers.

Beneficiary

The term "beneficiary" as used herein refers to the person will reap rewards which are accrued by the performer's participation in the program. In many embodiments, the beneficiary will be the "student" or "performer" 113. Moreover, in many embodiments, the performer is the student using the educational or learning application described herein. As such, these terms may be used interchangeably. In some embodiments, however, the user and the beneficiary are not the same party. For example, to incentivize their daughter to learn vocabulary lists in preparation for a college entrance will exam, her parents may set up an automatic funds transfer to a Starbucks gift card, offering one latte for satisfactory mastery of every thirty new vocabulary words. The student, however, may choose to transfer those credits to a Starbucks gift card of her boyfriend, or simply give him the gift card to which certain incentives are being directed. Therefore, general reference to a student as the beneficiary is not intended to limit alternative embodiments in which the user and the beneficiary are different persons. In such embodiments, however, parental controls are envisioned to prevent some creep from taking advantage of an innocent victim.

The Incentivizer

Still referring to FIG. 1, the "incentivizer" 101 refers to a party who has pledged a reward that will be made available to a student 113 upon satisfactory completion of certain learning goals, measured by quantifiable metrics. In an embodiment, pledges are made over the Internet through a computer application on a computing device, such as a "smart phone" mobile application.

For example, a student's parents may set up an auto deduct program on a credit or debit card, which sets aside $20 a week for their daughter, but distribution of the incentives is contingent upon their daughter's satisfactory completion of a certain amount of coursework. In such a case, the parents would be the incentivizers. An incentivizer may be a spouse, friend or relative of a student, a corporate entity seeking to "invest in the community" in general, or to develop future talent to work at the corporation. An example of a web page accessible by incentivizers was discussed in conjunction with FIG. 6. The incentivizer 101 could also be a talent scout 129, who is testing a large pool of students, quantify their abilities, and sell, to universities or corporations, lists of select persons from that pool. The incentivizer 101 could also be an educational entity (such as a high school or university) seeking to develop students at the high school level to prepare them for college. An incentivizer could also be a government entity seeking to incentivize students from underprivileged families to develop educational skills. The government has an interest in increasing the percent of children from underprivileged families who are able to attend and complete college studies. On a functional level, the incentivizer may be thought of as equivalent to a trustee funding a trust.

Limitations may protect parents (or other incentivizers) from over-incentivizing a student. Consider, for example, parents that have incentivized their daughter $0.75 for every new vocabulary word learned. Assume that statistics show that the average student will learn 33 new words per week at reasonable diligence, but that, at this anticipated rate, the daughter is three weeks behind. The auto-deduct may be automatically curtailed, so that no more money is unnecessarily taken out of the parents credit or debit card.

The Application

Still referring to FIG. 1, the "application" 120 provides a digital platform on which to run courseware prepared by courseware developers. Courseware 118 (such as lessons and flashcards on vocabulary and mathematics) runs seamlessly "on" or "with" the incentivization application 120. The courseware 118, incentivization application 120 or the combination thereof, preferably generates metrics about the student's performance on lessons and flashcards. These performance metrics are used to optimize the order and frequency of flashcard presentation, as well as to establish milestones for the distribution of cash or other incentives to users. In an embodiment, distribution is initiated when the application 120 initiates a digital communication through the user's computer 137 to the transaction administrator 127 indicating that the student 113 has met certain goals which may be linked to specific rewards or incentives. Those skilled in the art, however, will appreciate, that some of the foregoing digital functions may be distributed among local and remote digital entities. For example, the Application 120 can upload data from the user's computer 137 to the transaction administrator 127, which then generates metrics to quantify user performance. (The transaction administrator 127 can refer to a person, or any remote digital process or "cloud computing." In an embodiment, the transaction administrator is responsible a variety of functions, from regulating the distribution of rewards through the central trust 105, to number crunching data stored within the central database 128.

Safeguards Against Fraud

An embodiment of FIG. 1 discloses notification of goals attained 123 directly from the user's computer to the incentivizers. However, digital communications initializing transfer of assets are a lure to fraud, embodiments are envisioned wherein a variety of safety measures are incorporated to prevent fraud. A first safety measure depicted in FIG. 1 includes the auto-transmission of histogram data and confirmation of user performance 121 from the user's computer 137 to the transaction administrator 127. The transaction administrator then notifies the incentivizers 101 when the student 113 achieves certain goals, particularly those for which rewards will be released. Additional safeguards may include password or biometrics. For example, the computer 137 performs ongoing facial recognition scans while the student operates the computer, confirming that all of the answers are from the proper person, and not some friend in his place.

Additional safeguards include challenge and response between the transaction administrator 127 and user's computer 137 before release, distribution or transfer of any funds.

Further safeguards prevent illicit transfer of funds. Still referring to FIG. 1, when a promise of rewards 115, the release 103 or distribution or authorization of incentives 107 appears excessive or unlikely, digital warning(s) are generated by and/or transmitted to the transaction administrator 127. Distribution may be withheld until appropriate confirmation is possible.

Digital warning(s) are similarly generated and/or transmitted when a student appears to be "cycling through" to reward levels at an unlikely rate, with appropriate responses by the transaction administrator.

Digital warning(s) are generated and/or transmitted when an incentivizer appears to be incentivizing an unlikely number of students. For example, an identity theft ring might gain access to a credit card or debit card of a fairly wealthy person, sets-up 3,000 bogus students as participants in the program, and develop a system to generate $20 of incentivized rewards per day for each of these 3,000 bogus accounts. However, the incentivization of 3,000 students is not impossible. Participating cities, states, or other institutions may incentivize hundreds and possibly even thousands of students. The system administrator will advantageously flag entities confirmed to be incentivizing large numbers of students, so that such practices do not trigger undue scrutiny. Nevertheless, in any contingency described herein, numerous anti-scam safeguards will be incorporated to protect the system from hackers, identity theft rings, and other forms of fraud.

On Screen Notifications

Although smartphone applications have developed "on screen notifications," none has been applied to learning applications described herein. More significantly, none incorporates learning apps having an "on screen/on demand interaction." The application and/or the transaction administrator performs a calculation, and based upon the results, selects a notification from among a plurality of potential notifications based upon user needs or user competence.

For example, in addition to a student studying vocabulary for a twenty-minute stretch for a college entrance exam, the application 120 may periodically message the student's cell phone or mobile computing device 137, and prompt the student for an answer to a digital flashcard. In an embodiment, the application identifies a flashcard to present to the user based upon user needs. The notification could be a vibration, a "ring tone," a flashing light, a screen illumination, a text message, a static screen shot, a video image, or combinations thereof. As discussed below, embodiments are envisioned wherein the application calculates a variety of learning metrics of the user in conjunction with a set of flashcards, such as "strength of learning" and "probability of a correct answer" based on past user responses to a flashcard or principle. In an embodiment, the application sends the user a message prompting user interaction with the learning application (a notification). Based on user needs the application selects a flashcard from among a plurality of flashcards to display to the user in conjunction with the notification. The flashcard may be a vocabulary card of a word in which the user is weak, and needs to improve for a college entrance exam. Statistical analysis programs discussed below may be used to select the flashcard that the student is prompted to answer. Alternatively, if the user 113 has not yet seen a flashcard, the application 120 may prompt them to expand their skill set.

Referring still to FIG. 1, in an embodiment, the application 120 is running constantly in the background. If it is running in the user device 137, it can be configured to periodically generate a message or notice through vibration, ring tone, etc. Such notices may function to review a course throughout the day at regular intervals, presenting a question or flashcard at periodic intervals. Alternatively, a remote application (e.g. one running in the transaction administrator 127) sends periodic notifications to designated user devices 137.

The user interface screen will include standard response prompts (true, false, multiple choice, etc.), but will also include control prompts such as "remind me later," or "Delay: 5 min., 15 min., 30 min. 1 hr., 2 hr" etc. with values selectable by touch screen or other appropriate input means. Metrics of student performance on a digital flashcard are displayed on the screen, such as "You have answered this card correctly 78% since first learning it," or "Competency rating: 97.4%." (A "competency rating" will employ certain presuppositions, such 97.4% "if tested 7 days from now without further review." Notifications may be time driven, for example, occurring at fifteen minute intervals, or randomly at intervals not less than a certain time (e.g. fifteen minutes) nor more than a longer time period (e.g. an hour). The user may preprogram a set of hours in which he does not want to receive notifications (e.g. classroom hours).

Restricting Incoming Calls or Alarms at Select Locations

In an embodiment, mobile computing devices 137 can be programmed to withhold (disable) alarms, messages, reception of cellular phone calls, or other digital applications at predetermined locations. In a simple embodiment, the locations are defined as falling within a certain radius of a specific point. In a first step, the mobile computing device ascertains the instant location through GPS coordinates or some other reliable method. In a second step, the student configuring the device indicates a radius from the coordinate point. Within the prescribed radius, the selected features (alarms, text reception, cellular phone call reception, etc.) can be disabled on command by the student. In the third step, the user identifies, through a digital configuration page, the features to be disabled within that location.

In a more sophisticated embodiment, locations may be "pre-configured." For example, a courthouse often restricts cell phone usage. The court house could define the limits of the courtrooms therein, and upload these pre-defined limits to a publically accessible web page. Users could then download the pre-configured locations from the web page defining the GPS coordinates defining the geographic limits of the courthouse, and store the pre-configured location in their mobile computing device. The user would then configure the mobile computing device to define what functions or applications are to be inactive within that pre-configured location. Continuing with the example of an attorney in a courthouse, thereafter, the attorney would not need to remember to turn off a cell phone when he entered the courthouse. The attorney could simply leave the "filter" in the active state. Whenever the mobile computing device (e.g. cell phone) was within the proscribed area, select functions would be disabled. This same feature could be used for theaters, conference rooms, classrooms, and any other location at which it might be considered rude or disruptive to receive incoming calls or alarms, or for which a user may not want to be disturbed, even if the location is appropriate for incoming calls or alarms.

Auto-Disable

In an embodiment, entities such as theaters, court-houses, churches, etc. could subscribe to a trusted agency, such as "Auto-Disable, Inc." When entering the restricted area, a note on the premises advises the owner that they must subscribe to the disabling feature to allow their cell-phone to be turned on when inside. A module is downloaded to the user's cell phone from Auto-Disable, Inc. Whenever the phone is turned "on" within a certain geographic area, it does a GPS update, identifying any restricted locations in the area, and disabling the cell-phone while it is in that region.

Multiple levels of restriction and/or permission are envisioned. For example, a teacher may obtain a code to keep her cell phone operational when in the classroom. A sheriff may do likewise when in a courtroom, and an obstetrician (who may be called at any moment to perform an emergency caesarian section) may be granted a code allowing them to receive calls. Restrictions and/or permits may be related to geography, time, a person or entity, occupation, or combinations thereof.

This same system may be used to restrict annoying alarms on a student's phone. For example, the student certainly need not be "reminded" of an algebra question in the middle of algebra class, and may not want any interruptions during dinner with their family, defined by the geographic limits of the dining room, and further defined by certain times of day.

In an embodiment, complex geometric limits can be approximated through a sequence of overlapping circles. To more closely define the geometric limits of a room, the overlapping circles may comprise different sizes. By identifying a sequence of GPS locations and corresponding radii, a sequence of overlapping circles of different radii can approximate the geometric limits of a courtroom, classroom, or other location. These geometric limits can be pre-configured and stored on a publically accessible digital location, such as a URL site, and available for user download.

Such a filter would be extremely appropriate for various embodiments described herein, to restrict annoying alarms or messages from interrupting a student in class. The filter could further be configured with respect to time, such that a user is not interrupted during sleep. Finally, the filter may be configured with respect to certain digital applications. For example, if a student is actively reviewing mathematics flashcards, he may, or may not, want to be interrupted with an alarm of a vocabulary card to review. If the student is reviewing vocabulary cards, he almost certainly would not want to be interrupted to tell him to do what he is already doing!

Other Configurations for Review of Flashcards

In addition to postponing a triggered review, the user will have the option of configuring how frequently reviews are automatically initiated, and how long (in duration) the reviews last. In a preferred embodiment, a default configuration is available, which is calculated to optimize the number of review sessions based on statistical analysis of effectiveness. This may be supplemented by a user entering their college classroom schedule, dinnertime, bedtime, etc.

Embodiments are envisioned in which a student may modify the review configuration by a slide bar or other adjustment requesting "more intense" or "less intense" review, increasing the frequency and/or length of reviews. Frequency and length of review may be adjusted independently, or may default to a concurrent adjustment.

The Incentivization Process

Figure 14:
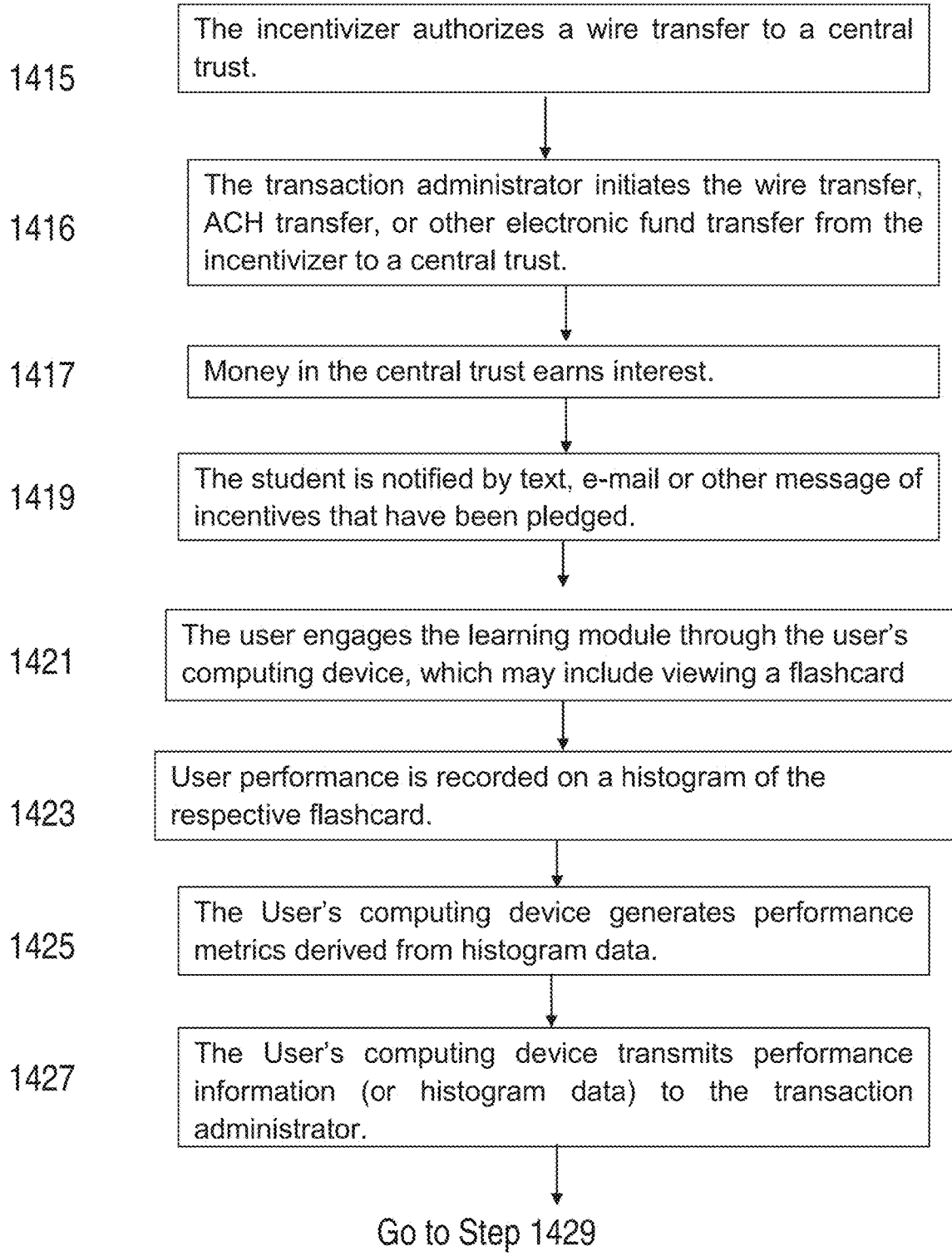
FIG. 14 discloses an embodiment of a method of online incentivizing a student through a series of digital transactions and notifications, to engage in a digital learning program depicted in FIGS. 1-13.
Figure 14:
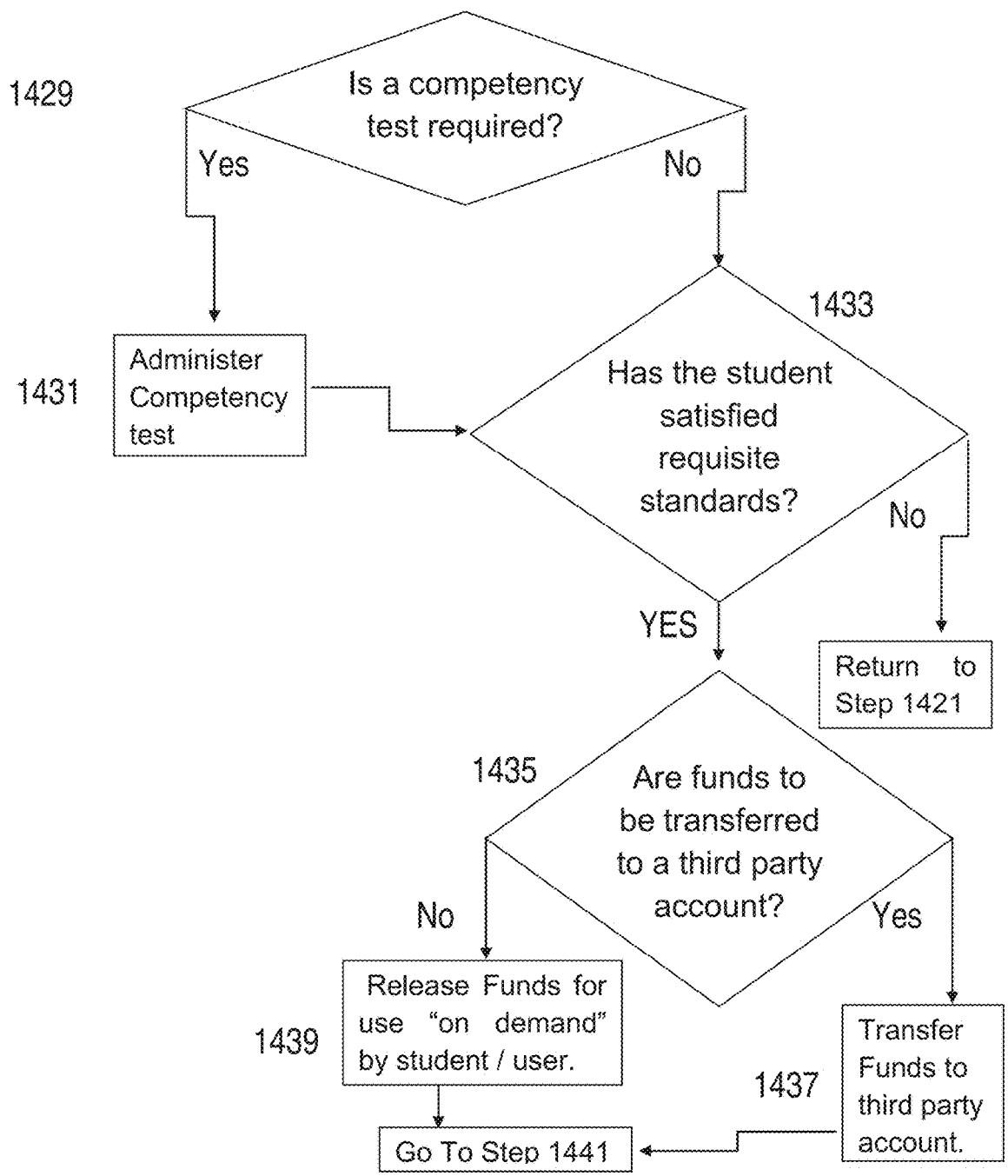
Figure 14:
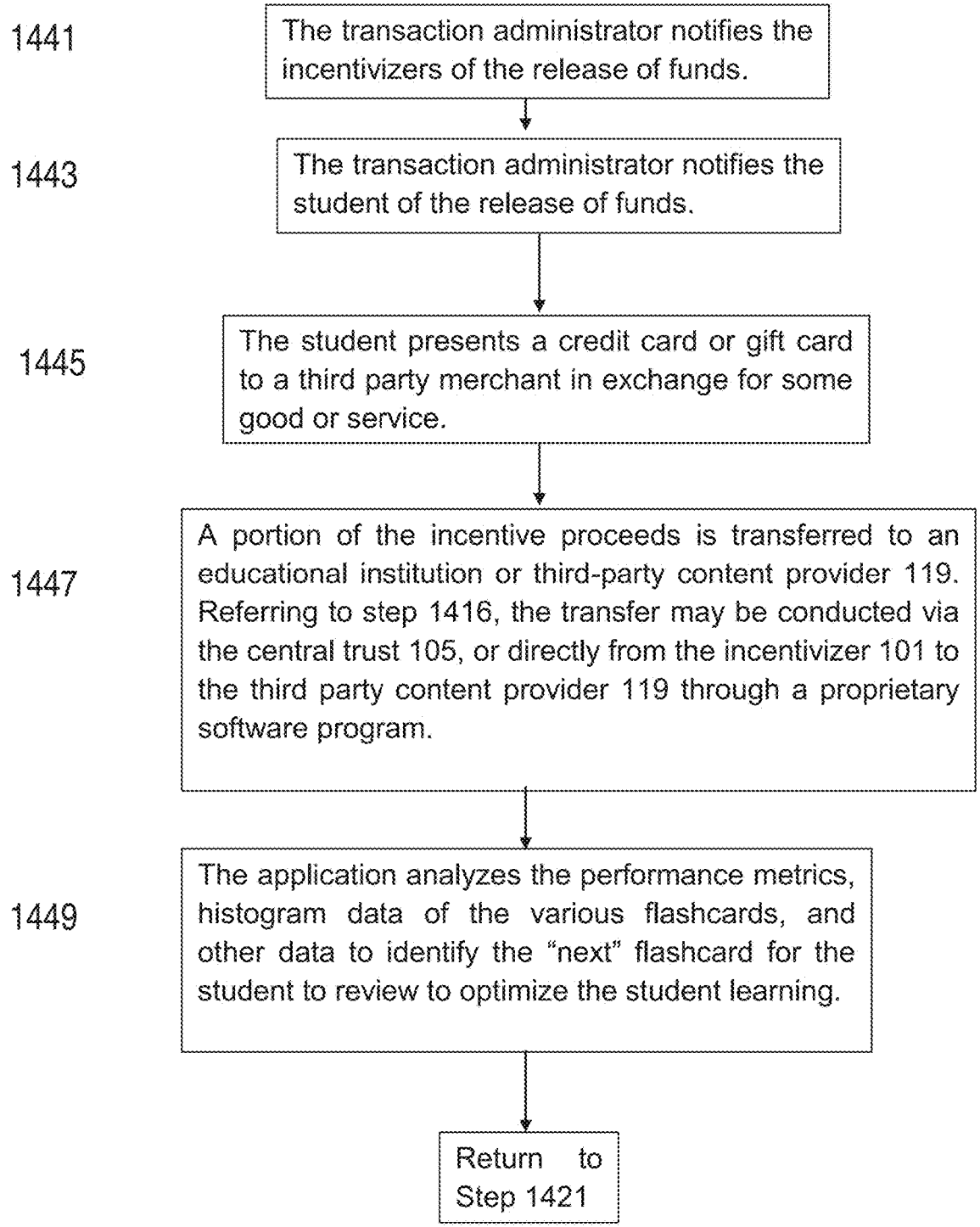

FIG. 14 depicts a flow chart of a method for incentivizing users according to an embodiment of the claimed invention.

Referring to both FIGS. 1 and 14, in step 1401, a courseware developer develops courseware (an interactive learning module) for display and operation on a computing device 137 such as a laptop computer, tablet, or handheld mobile computing device, such as a "smart phone." In an embodiment, the courseware 118 includes digital flashcards presenting a question side, and interactive user response section, and an answer side. The interactive user response section may comprise multiple-choice answers which a user can select through a touchscreen, mouse, etc.

Avoiding Surcharges by Operating Systems

Referring briefly to FIG. 1, the Application 120 is depicted as running on the user's computer 137. It is commonly known that certain industry giants are attempting to "take a cut" of transactions performed through their operating systems. For example, one industry leader in mobile computing devices and operating systems is reported to exact a 30% transaction fee for certain "digital content" applications delivered across the industry leader's mobile operating system. The exact terms of such licensing fees are difficult to define, and anti-trust implications are unclear. To avoid such fees, the elements of FIG. 1 are envisioned as flexible, and may be arranged in any way necessary to avoid such surcharges for operating on a mobile device. For example, the application 120 may actually be integral to a remote unit such as the transaction administrator 127 rather than the user's computing device 137. Video and audio information are simply downloaded to the computing device 137 from the transaction administrator 127. The computing devices then serves as nothing more than a display platform and transmitting device to notify the application 120 of the user's answers, etc.

Moreover, as noted in FIG. 1, the money 103 pledged by the incentivizers 101 goes directly to the central trust 105, from which it is distributed to third party merchant accounts 109, 133, 135, 139. The transaction is a donation, much like sending money to a friend through Western Union, or PayPal. It is not part of the sale of digital content, presumably removing it from the ambit of any "surcharges" imposed for operation on the operating system.

Moreover, if an embodiment of the application 120 is made available for use with a digital operating system that charges a fee for content sold that operates in conjunction with their operating system, and the application is sold for $5.00, the price of the download may be adjusted to include the surcharge required by the company or entity requiring a 30% cut.

In step 1403, each set of courseware is identified by a proprietary digital value, such as a trademark or corporate name, coupled with a course name. To prevent malware from corrupting a program of courseware, a verification module advantageously ensures that the courseware is authentically developed by the party whose name, trademark, or other proprietary digital value is represented on the courseware. The courseware developer may have one general "folder" or link under their own name or icon, with multiple folders representing different topics contained therein. Each of the folders may contain nested subfolders, further subdividing the content of each folder.

In step 1405, new or revised courseware is registered with the transaction administrator 127. In an embodiment, the courseware is stored in a digital storage facility governed by the transaction administrator. This allows centralized control of downloads to users, ensuring that bogus software is not downloaded.

In step 1407, a user 113 downloads relevant courseware 118 onto a computing device 137. The authenticity of the courseware is confirmed by a digital handshake such as ack-nack protocol, public-key/private key encryption, etc.

It will be appreciated that such specific details of software loading and interaction are offered for illustrative purposes only. The embodiments described herein envision alternative architectures and designs, including, but not limited to, cloud computing.

In step 1409, a student registers with the transaction administrator 127. Registration identifies the student 113, and allows friends, relatives, or other potential incentivizers 101 to access a visitor page associated with the user 113, to pledge incentives for user performance.

Referring briefly to FIG. 5, an embodiment of a user registration screen 500 illustrates how a user can enroll in the incentivization program described in this disclosure. In an embodiment, registration screen 500 is accessed via the internet and displayed on the screen of the user's computer 137. In alternative embodiments, however, a data interface screen is downloaded to the user's computer 137. After the user 113 fills out the screen, the demographic and user data is uploaded from the user's computer 137 to a remote central data base 128. The use of the term "Internet" therefore comprehends screens that are "cached" on the user's computer, wherein data is transmitted between the user's computer 137 and the data base 128 in a non-real time. The term "internet" as used herein further comprehends the communication means between any of the diverse entities in FIG. 1.

Referring still to FIG. 5, digital field 501 allows the user 113 to enter his name and register an account.

Digital field 503 allows the user to establish a "public" PIN. Consider the name "Joe Black." Because there may be multiple persons named Joe Black, to ensure that friends and family members may find his profile to incentivize him for his studies, the user generated "public PIN" differentiates this "Joe Black" from any other Joe Black. In one embodiment, the "public PINs" of all Joe Blacks are visible, and the user 113 tells his family or incentivizers which is his public PIN. The incentivizers may then select his PIN. In an alternative embodiment, the public PIN is not visible. Joe Black must notify his family members of his PIN. When they input Joe's name along with the proper PIN, they will be granted access to a "back page" as shown in FIG. 6, from where they can incentivize the student of their choice.

Digital field 505 depicts a fillable field for the student's age.

Digital field 507 depicts a fillable field of the student's sex.

Digital field 509 depicts a fillable field of the student's birthday.

Digital field 511 depicts a fillable field for the student's racial background.

Digital field 513 depicts a fillable field for the Student's education.

Digital field 515 depicts an example of a field for collecting any other demographic information. For example, a student who lives in New Orleans may live near Terpsichore Street. If the word "terpsichorean—of or relating to dance" is presented to a student trying to enlarge his English vocabulary in preparation for college entrance exams, a memory device drawing upon Terpsichore Street in New Orleans may be useful to residents who know of the street. Demographic data including the zip codes of the student's past addresses would be able to confirm whether a student from New Orleans could learn this term faster than the average student if prompted by the right memory aid. Because there is no limit to potential statistical correlates, in a preferred embodiment, the student is encouraged to fill out the broadest range of demographic data possible. Field 515 therefore exemplifies this broad range of demographic data.

Digital field 517 lists the available courses for which the student may be incentivized. The student will preferably be able to upload new courses which will be listed for potential incentivizers.

Digital field 521 allows the student to access or organize their performance metrics.

Digital field 523 includes a record of incentives earned.

Throughout the foregoing description of FIG. 5, the term "digital field" comprehends any alternative data entry technique as well, including, but not limited to drop down menu.

During the registration process, the user selects courses from among those that are registered with the transaction administrator 127 of FIG. 1. In addition to drop down menus of available classes, a student is able to enter "new" classes or courses through the registration page 500.

If the user desires to operate the application from multiple alternative computing devices, accessing the registration page from an "unlisted" computing device will advantageously trigger an inquiry as to whether the user desires to download the application 120 or specific courseware 118 on the new computing device. "Synch" features will advantageously upload user data, thereby allowing a user to switch between different computing devices.

Some of the configuration data which may be entered on the user configuration page includes demographic data about the user, the course(s) which the student is reviewing, the correlation of any text books to courses he is studying on the digital application.

The reader will appreciate that embodiments are envisioned wherein there is no "merging" of a publisher's material with pre-designed flashcards. Rather, in certain embodiments, an entire course, from flashcards to lectures, are all designed by a third party educator.

User Interface Through Multiple Computing Devices

An advantage of registration and record-keeping at a central database can be appreciated by considering a user who performs some of his lessons on multiple computers. The order of presentation of flash cards depends on a student's history of proficiency with those flash cards. The distribution of incentives is also related to that performance. If records were kept only on one computer platform of the user, and the user went from one device to another, the record of his proficiency would not be accurate. However, if his performance is updated at a central database 128 of the transaction administrator 127, and these values are synched with the multiple devices he or she may be using, the history and metrics of student performance will be up to date, even if the user switches from his cell phone to his laptop. This ensures the freshest performance metrics, and the most effective utilization of the courseware. The histograms of each flashcard will be automatically updated from the computer to the central database, as are the metrics drawn from those flashcards. However, because users will not always have Internet access (or other channels of transmission), history and metrics are advantageously stored on every computer as well.

Returning to FIG. 14, in step 1411, an incentivizer 101 (such as a parent of a student) registers with the transaction administrator 127 to incentivize a student. The registration process identifies the student whom they will be incentivizing, the specific exercises which they will be incentivizing, the amount they are pledging, the duration during which an auto-renewal is authorized, credit card information, etc.

FIG. 6 depicts an example of the interactive display that the incentivizer 101 might see on the Internet during registration step 1409 of FIG. 14. In field 601, the incentivizer is prompted to fill in the name of the party 113 whom they will be incentivizing, which, in the example, is Joe Black.

As noted above, there may be many persons named Joe Black. To ensure that the incentivizer does not pledge money to the wrong person, digital field 603 depicts a field with a public PIN disclosed to the incentivizer by Joe Black. It may be drop down, or a fillable field. In any configuration, the feature safeguards the pledge, ensuring that the money or pledge does not go to the wrong person.

Field 605 depicts an embodiment of a fillable field for the Incentivizer's name.

Field 607 depicts an embodiment of a fillable field for a credit card number or bank account number of the incentivizer. This will be part of an authorization to transfer funds in the incentivization of Joe Black.

Because Joe Black may have listed multiple courses for which he seeks incentivization, field 609 allows the incentivizer to identify the course which they will be incentivizing. Embodiments are envisioned in which an incentivizer 101 incentivizes multiple courses independently, or even collectively.

Field 611 depicts the amount that is being pledged. This field may be as complex as necessary to identify the requisite contingencies. For example, the incentivizer may pledge $5.00 for every ten vocabulary building words that Joe Black memorizes, but with the requirement that there is a long term retention of 98% or better, and further, with the limit of $5.00 per month, and with the further limitation that the pledge is only good for ten months.

Field 613 is directed to any number of configurable limitations not disclosed with specificity above. For example, the incentivizers 101 may not believe that Joe Black 113 has the maturity for self-evaluation of his scores on the flashcards, and may therefore limit scoring to auto-generated scores.

Field 615 allows the incentivizer to select the incentivization vehicle. Referring again to FIG. 1, this may be a prepaid visa card 139, a gift card to a local coffee shop 133, a scrip card honored by multiple merchants 135, or a user account 113*a*. The vehicle may be one which Joe Black has selected. Alternatively, the incentivizer 101 may designate a new incentivization vehicle.

Field 617 depicts a drop down menu for assigning restrictions to the incentives. For example, if the incentivization vehicle is a prepaid debit card, incentivizers 101 may designate restrictions prohibiting the user from buying alcohol or tobacco with rewards.

Field 619 represents a menu or other interactive field for establishing a validation for withdrawal or transfer of funds from an account of the incentivizer 101. For example, the incentivizer may have a fingerprint validation requirement with the bank from which the incentives will be drawn. The validation may be directly to the incentivizer's bank, or, in the alternate, may be with the central trust 105 or the transaction administrator 127.

In an embodiment of a validation process, in the first step, the incentivizer arranges with the central trust for one or more deductions for incentivizing the user 113 through the field 619 of FIG. 6. In the next step, the central trust 105 forwards a digital authorization to the bank of the incentivizer. In the next step, the bank requests the incentivizer to authorize the transaction. In the next step, the incentivizer logs onto the bank web site, confirms the incentivization request, and provides a fingerprint, password, visits the local bank to confirm it in person, or any other confirmation means. In the next step, the bank confirms with the central trust 105 that the withdrawal or transfer has been authorized.

Returning to FIG. 14, and also referring to FIG. 1, in step 1413, through a digital transmission such as an Internet web page, the transaction administrator 127 also presents the proposed testing parameters and safeguards that are in place to confirm performance and prevent cheating, and asks the incentivizer 101 to select or approve of those testing parameters for the performer/student 113.

Consider the example of a student studying vocabulary for a college prep exam. The application setup page of FIG. 5 includes digital field 519, "course configuration," which allows the student to read the question of a flashcard (a word), recite the definition silently to herself, and flip the Digital flash card to learn she answered the question correctly, and digitally enter whether she answered correctly or incorrectly. This may be a sufficient safeguard for in the estimation of one incentivize, but may not be sufficient when dealing with a different incentivizer, or a different student. The transaction administrator 127 will disclose to the incentivizer 101 other confirmatory procedures that are available.

For example, a user may review vocabulary cards by reciting definition silently, reviewing the answer screen, and then entering "correct" or "incorrect" on a touchscreen according to their self-assessed accuracy. When the user's accuracy exceeds a certain threshold learning metric, the incentive is released to the user's gift card or prepaid credit card.

According to a slightly higher level of security the user must select from among multiple choice answers, or keystroke a definition of a vocabulary word into an input of the computing device. The student does not have the liberty of grading themselves. When the user's accuracy exceeds a certain threshold learning metric, the incentive is released to the user's gift card or prepaid credit card.

According to yet a higher level of security, a scoring system may apprise the user of their general preparedness for an exam, but the student's day-to-day performance and progress will not supplant the need for final exam to earn the rewards.

In a further measure of security, the user 113 of FIG. 1 digitally registers a biometric feature with the transaction administrator. These biometric features may be selected from among fingerprints, Retina Scan, Facial Thermal Imaging, Facial Structural Imaging, Voice Forensic Signature, or other biometric identification which may be developed. Biometric registration is preferably non-erasable, thereby impeding fraudulent use of the system described herein. This biometric recognition could then be invoked to confirm that she was the party taking an online test to confirm authenticity of the test taker. Such a safeguard could prevent a user 113 from handing his cell phone to a friend to complete learning exercises for him or her. Although cheating would still be possible, such safeguards would go a long way to discourage cheating, without the need for the incentivizers to be present.

As demonstrated by these examples, security and preventive measures against cheating can be set at different levels. Some may be invoked by the user at the time of registration or the time the user commences a study of a course. Other safeguards may be invoked by an incentivizer 101, with incentives contingent upon compliance with those safeguards.

Returning to FIG. 14, in step 1415, the incentivizer 101 authorizes a transfer of funds to the central the transfer may be through credit card, debit card, ACH, wire transfer, or other means for transferring cash.

In step 1416, the transaction administrator 127 initiates the wire transfer, ACH transfer, or other form of electronic fund-transfer 103 from one or more accounts of the incentivizer(s) 103 to the central trust 105.

In step 1417, the money in the central trust earns interest until it is distributed to a third party merchant, spent by a performer/student 113, or returned to an incentivizer 111.

In step 1419, the student is notified by email, text message, or other automated messaging technique, of the new incentivization that has been pledged, including the amount, and restrictions.

In step 1421, the performer/student 113 engages the learning module (courseware 118) of FIG. 1. for an incentivized subject. For example, a high school girl may study vocabulary flash cards for a college entrance exam.

For applications that include flashcards, a plurality of digital histograms are linked to a respective plurality of flash cards. In step 1423, the accuracy of the student's answers (for different flashcards) are recorded on their respective flashcard histograms, along with the time and date of each of the answers.

In step 1425, the application 120 generates one or more performance metrics from the data collected on the histogram of each flashcard. These metrics include measures of the student's proficiency for a particular flashcard. In non-flashcard embodiments, Examples of performance metrics are discussed below. The performance metrics for a particular flashcard are stored on the data file of that flashcard (FIGS. 27, 28 discussed infra). The performance metrics for a course in general may be stored in a data file in the Application 120.

In step 1427, the user's computing device notifies the transaction administrator 127 of performance information of the user.

In step 1429, if a competency test is required, then,

In Step 1431, the transaction administrator 127 or the application 120 (FIG. 1) administers a competency test. Safeguards are envisioned such as digital biometric recognition to ensure that the proper person is taking the competency test. In an embodiment, the incentivizer may stipulate that they be present, physically, or online, while the student is being tested. If presence is required online, an Internet session is formed wherein the incentivizers 101 (FIG. 1) can monitor the student to confirm that the testing is authentic.

In Step 1433, the transaction administrator 127 or the application 120 (FIG. 1) determines if the student has passed a threshold proficiency level necessary for distribution (or release) of incentives. This may be with or without a competency test, according to the proficiency standards that are established for distribution of incentives. If proficiency is determined by the application 120, a message is transmitted from the computing device 137 of the user 113 to the transaction administrator 127, notifying of the successful milestone. In an embodiment, such a transmission is preferably formatted, encrypted, or otherwise confirmed as authentic by some process configured to thwart the generation and transmission of bogus messages.

If, in step 1433, the student has not satisfied the threshold proficiency levels necessary for distribution of an incentive, the process returns to step 1421.

If, in step 1433, the student has satisfied the threshold proficiency levels necessary for distribution of incentives, then, in step 1435, the process determines if funds are to be distributed to a different account, or otherwise released for distribution or use.

In step 1435, if the funds are to be distributed to a third party account, then, In step 1437, the transfer is executed. This transfer may be a "push" initiated by the central trust 105 (FIG. 1), or may be a "pull" initiated by the third party account as the student attempts to use the third party merchant account. A "pull" transfer to the third party merchant account from the central trust may be configured similarly to the banking transfers through a debit card, allowing the central trust to keep funds the maximum possible time before divesting themselves of the funds, thereby drawing interest for the maximum amount of time. An example of a third party merchant account would be a prepaid visa card 139 (FIG. 1) in the student's name, or a prepaid gift card to Starbucks 133, Nordstrom's 135, Best Buy, or a "scrip" card accepted by a variety of merchants. In gift card embodiments, numerous independent accounts are collectively held by the third party merchant (or, more specifically by a bank of the independent third-party merchant), and the third-party merchant collects interest on the aggregate deposits. The funds, however, are administered to each account independently of the other accounts.

In an alternative embodiment, the incentivization funds 107—which have been authorized for release to the student—are kept with the central trust 105, and a hybrid gift card 133, 135 is issued in the name of a third party merchant. However, a hybrid gift card is distinguished from a traditional gift card in that the funds are kept in a segregated account in the central trust, earning interest for the central trust 105, transaction administrator 127, or other representative entity, rather than for the benefit of the third party merchant. A hybrid gift card 133, 135 preferably bears the name of the third party merchant. In an embodiment, however, hybrid cards 133, 135 also bear the name of the Transaction Administrator 127, or the Central Trust 105, or some other entity associated with the incentivized courseware.

In yet another embodiment, the funds are transferred to the third party merchant in exchange for a percent of the funds, which are retained by the central trust. For example, the "Incentivized Education Corp." contracts with "American Pie and Coffee Shop" to target incentivized funds to American Pie gift cards. In January of a given year, one million dollars are pledged to students by various incentivizers 101 (FIG. 1), and directed to American Pie gift cards. By contract with American Pie, Incentivized Education Corp. retains one-hundred thousand dollars and transfers $900,000 to American Pie and Coffee Shop. Because the 10% retained by "Incentivized Education Corp." is essentially a fee as a fee to acquire customers, no different from an advertising budget, American Pie credits the various user cards the full one million dollars. "Incentivized Education Corp." is therefore able to accurately represent (to respective incentivizers pledging the aggregate one million dollars in January) that the full one million dollars is going to the gift card. This does not, however, prevent "Incentivized Education Corp." from taking a percent" up front, provided that there is full disclosure of such "up-front" fees to clients pledging incentives through "Incentivized Education Corp."

If, in step 1435, the funds are not to be transferred to a third party account, then, in step 1439, the portion of the funds for which the student has satisfactorily performed, are "unfrozen" or otherwise flagged for release on demand by the student, but retained in the central trust 105 (FIG. 1), where they can draw interest for the central trust.

In step 1441, the transaction administrator 127 notifies the incentivizers 101 of the payout.

In step 1443, the transaction administrator 127 (FIG. 1) notifies the student 113 of the release of funds.

In step 1445, the student 113 presents a credit card or gift card to a third party merchant in exchange for some good or service. In an embodiment, a gift card need not be a traditional plastic credit card, but can be an application and coded display on a mobile cellular telephone. The user presents the screen of the cellular telephone to an interactive digital device controlled by the third-party merchant.

In Step 1447, a portion of the incentive proceeds is transferred to an educational institution or third-party content provider 119. Referring to step 1416, the transfer may be conducted via the central trust 105, or directly from the incentivizer 101 to the third party content provider 119 through a proprietary software program. The distribution of a portion of the incentive proceeds to various content providers serves to enhance participation of third-party educational providers in the incentive program. The third-party content provider or educational institution 119 then acts as a marketing platform to drive more students to the incentive program.

In step 1449 the application analyzes the performance metrics, histogram data of the various flashcards, and other data to identify the "next" flashcard for the student to review to optimize the student learning. The flashcard may be one the student has already reviewed, and which is scheduled for review again, or may be a "new" flashcard which the student has not reviewed before. As discussed below, histogram data of each flashcard and other variables are evaluated by various equations, charts, statistical analysis techniques, and logical flow charts, to select the "next" digital flashcard from a deck. Each "round" or iteration of flashcard selection is preferably preceded by a new calculation of the deck, thereby ensuring the best data in selecting flashcards to select. The iterations are guided by a statistical analysis program that records and assesses a user's metrics for a given flashcard to reassess, after every answer, how soon, and how often, that flashcard should be reviewed again.

Permanently Retaining a Portion of Proceeds

As discussed above in conjunction with step 1437, in an embodiment, the Central Trust 105, transaction administrator 127, or other corporate entity working in cooperation with the incentivized courseware, retains a percent of the money pledged by an incentivizer 101. For example, Irina's parents pledge $50.00 per month for her studies for French, algebra, and her college entrance exam. The parents designate National Coffee Shop as the third party merchant. The gift card is a hybrid card, wherein the money is stored in the Central Trust 105 while the "Incentivized Education Corp." earns interest on it. Additionally, the "Incentivized Education Corp." will keep a percent, say (for example) $8.50 of the $50.00 pledge, (which would be $17%). National Coffee Shop will still grant Irina $50 worth of goods and services, but only $41.50 will be transferred to National Coffee Shop from the Central Trust 105. This is possible for several reasons: Firstly, the cost to acquire a customer may account for 10% of National Coffee Shop's gross expenditures. Free (or reduced cost) advertising on the "Incentivized Education Corp." application reduces National Coffee Shop's overhead expense. The third party merchant does not care from where the business is coming, so long as they get that business. Moreover, the sheer volume of increased sales for National Coffee Shop gives the "Incentivized Education Corp." negotiating power. In the meanwhile, as long as the money remains in the central trust 105, the central trust (and its corporate interests, such as the "Incentivized Education Corp.") draws interest on the funds.

Clauses of the Incentivization Process

The following clauses summarize certain embodiments of the incentivization process.

Clause 1: A method of incentivizing a user to engage in one or more education related tasks, the method comprising:
 a. connecting to a web site through a digital computing device;
 b. pledging, through a digital transmission, an incentive for a benefit of the user;
 c. establishing performance objectives, wherein a distribution of a at least a portion of said incentive is dependent on a satisfactory completion, by the user, of at least some of the performance objectives;
 d. notifying the user, through a mobile computing device that an incentive has been pledged;
 e. notifying the user, through a mobile computing device, of an aggregate of incentives which are available;
 f. notifying the user, through a mobile computing device, of at least some of the performance objectives that must be satisfied to secure one or more pledged incentives;
 g. registering the user through a secure means to curtail cheating;
 h. performing, on a digital computing device, at least some of the one or more educational tasks, wherein said one or more education related tasks are to be performed by the user;
 i. authenticating that said one or more tasks are being performed by the user;
 j. tracking a performance of said one or more tasks;
 k. determining that a user has met one or more performance objectives;
 l. transmitting, to a transaction administrator, a notification that the user has satisfied at least some of the one or more performance objectives;
 m. authorizing, for release to the user, at least part of the incentive that was pledged for the benefit of the user; and
 n. transferring at least a portion of the incentive to an account that is accessible by the user.

Clause 2: The method according to clause 1, wherein said incentive is a monetary incentive.

Clause 3: The method according to clause 2, further comprising transferring money from a central trust to a first third-party merchant account, a transfer of money being related to a monetary incentive for the benefit of the user.

Clause 4: The method according to clause 1, wherein said incentive is convertible for a good or service.

Clause 5: The method according to clause 4, limiting a nature of the good or service which may be redeemed by the user;

Clause 6: The method according to clause 4 wherein the good or service is provided by a third party merchant.

Clause 7: The method of clause 1, wherein the user is a student, and wherein said one or more performance objectives are educational tasks.

Clause 8: The method of clause 1, wherein at least some of the one or more tasks comprising digital operations are performed on a remote digital device.

Clause 9: The method of clause 1, wherein at least some of the one or more tasks comprising digital operations are performed on a digital device proximate to the user.

Clause 10: The method of clause 9, wherein the digital device proximate the user is a mobile computing device.

Clause 11: The method of clause 10, wherein the mobile computing device includes a smart phone.

Clause 12: The method of clause 7, wherein the educational tasks comprise reviewing digital flashcards.

Clause 13: The method of clause 7, wherein the educational tasks comprise reviewing video lectures.

Clause 14: The method of clause 7, the mobile computing device comprising an application for determining whether a user has satisfied at least some of said performance objectives.

Clause 15: The method of clause 2, wherein pledging a monetary incentive comprises the step of authorizing at least one deduction from a user account.

Clause 16: The method of clause 2, wherein pledging a monetary incentive comprises the step of authorizing a repeating auto-deduction from a user account.

Clause 17: The method of clause 15, wherein the user account is selected from among a group of accounts consisting of credit cards, debit cards, checking accounts, savings accounts, money market accounts, online banking accounts, bitcoin accounts, digital money, and combinations thereof.

Clause 18: The method of clause 1, wherein the step of determining that a user has met one or more performance objectives comprises, at least in part, calculating an accuracy of the user in review of digital flashcards.

Clause 19: The method of claim 1, further comprising the step of safeguarding against fraud.

Clause 20: The method of clause 19, the step of safeguarding comprising the step of monitoring a number of incentives offered by an incentivizer.

Clause 21. The method of clause 19, the step of safeguarding comprising the step of monitoring a frequency of determining that a user has met one or more performance objectives.

Clause 22: The method of clause 9, further comprising the step of initializing a review notification within the mobile computing device of the user, said notification configured to prompt the user to review at least one digital flashcard.

Clause 23: The method of clause 22, wherein the review notification is selected from among a group of notifications consisting of a vibration, a sound, an emission of light, a screen display, and combinations thereof.

Clause 24: The method of clause 22, further comprising the step of configuring a frequency of review notifications.

Clause 25: The method of clause 24, further comprising the step of activating a delay configured to delay a review notification a predetermined length of time.

Clause 26: The method of clause 1, further comprising the step of displaying, to the user, an accounting of incentives which have been released to the user and are available for redemption by the user.

Clause 27: The method according to clause 1, further comprising the step of displaying, to the user, a measure of how close the user is to a distribution of one or more incentives that have not been authorized for release to the user.

Clause 28: The method of clause 1, further comprising the step of displaying, to the user, a notification of incentives that have been pledged and are awaiting release based on the user's performance.

Clause 29: The method of clause 1, wherein registering the user through a secure means comprises a biometric registration.

Clause 30: A method of presenting a digital educational program to a student through a digital computing device, the method comprising:

i) displaying, through the digital computing device, course content designed by a third-party educator; and, ii) mediating, through a digital program of an incentivizing agent, the distribution of incentives to the student, wherein said incentives are related to the student's activity in relation to the course content designed by the third party educator.

Clause 31: The method of clause 30, further comprising the steps:

i) copying digital content files relating to the course content designed by a third-party educator; and, ii) pasting said digital content files in an application driven by a program related to the incentivizing agent, wherein the step of displaying the course content designed by a third party educator is performed, at least in part, through a digital program related to the incentivizing agent.

Clause 32: The method of clause 30, wherein the step of displaying the course content designed by a third party educator is performed, at least in part, on a digital application provided by the third party educator.

Flashcards

Flashcards as defined herein normally comprise digital interactive screens which provide the "questions" on a first screen display, as depicted in FIGS. 2, 10, 21 and 29 the answer(s) on a second screen display depicted in FIGS. 4, 11, 22, 30*a* and 30*b*.

The "question" portion of a flash card need not be displayed in the actual form of a question, but only need prompt the user to the correct answer. For example, in a Bible memorization application, the display of "Romans 11:6-7" functions as a question, and prompts the user to recite that passage from the Bible (or keystroke the verse, or any other appropriate response.)

Within this disclosure, a "question" may also refer to a flash card as an entity. Consider, for example, a reference to "cycling through all the questions in the deck." The term "question" in this sense plainly refers to an entire flash card, both question and answer. The scope and meaning of the word "question" within this disclosure is therefore understood in the manner which gives fullest scope to the appended claims, and most sensibly comports with the context.

In the physical world, the term "deck" is often used to refer to a deck of cards. Analogously, as used herein in a digital context, the term "deck" is substantially equivalent to a "file folder," "category" or "course" of flashcards. File folders can be temporarily linked by a user. Linked file folders would function as a single deck when reviewed by a user. A deck also includes all the sub-folders disposed "within" a more general folder.

To "flip" a card refers to transitioning from the "question page" (FIGS. 2, 10, 21 and 29) to the "answer" page (e.g., FIGS. 4, 11, 22, 30*a* and 30*b*). To "flip through" or "cycle through" multiple cards, however necessarily must include not only the transition from the first side to the second side, but the step necessary to inaugurate the following question. The reader will appreciate that terminology describing digital concepts are intuitively drawn from concepts and terms associated with physical flash cards. A "cycle" can be the complete viewing of the front and back side of a flashcard, or, if specified, refer to "cycling through a deck" of flashcards, that is, a collection of multiple flashcards.

Audio and Video Embodiments of Flashcards

Although many examples described herein are directed to visual flash cards, such examples are not intended to limit the applications disclosed herein. A student taking a music appreciation class could have audio flashcards which play a ten second segment of a symphony, opera, overture, oratorio, sonata, concerto or other piece of music, requiring the user to identify one or more features such as the composer, opus number, name of the piece, the musical period in which it was generated, the key in which a segment of music is played, etc. A medical student may view a digital image of a body part as the "question," wherein the answer involves reciting, keystroking, or otherwise providing its anatomical name. A soldier being certified for rating in the signal-core can view an image of a semaphore flag design in the question page of the flash card, with a field to type in the letter of the alphabet corresponding thereto. The answer page can display a single letter corresponding to the semaphore flag displayed. Accordingly, reference herein to "questions" or "answers" in the form of text is offered for illustration only, and is not intended to preclude alternative embodiments, including audio and visual images that functions as "questions." A question functions as a "prompt" to an answer by the student.

Command Prompts and Navigation Links

In a preferred embodiment, to the extent reasonably possible, identical command prompts, icons, buttons and essential navigation links are used by all third party developers, creating a consistent "look and feel" for users, thereby providing users a more intuitive understanding of any additional courseware and enhancing user-friendliness.

A user may respond to a question in any known means of inputting into a computer, including, but not limited to, clicking on navigational links, touch screen verbal commands, etc. Answer formats include, but are not limited to, true/false format, multiple-choice format, keystroking in the correct answer in a text field, and audio response including voice to text.

Navigation buttons for flipping to the next card, a previous card, pausing, etc. are preferably displayed in a menu on each page of a flashcard, even in audio embodiments, to develop a consistent "look and feel" for the application.

In a preferred embodiment, the user or some other third party or merchant may use a flash-card generation module of the application to generate their own flash cards ("aftermarket flashcards"). The aftermarket flashcards can be added to a preexisting file folder, or may create an entire new category or file folder. Categories or file folders may be organized into sub-categories as well.

Histogram and Metadata on Flash Cards

Before a "self-generated" flashcard (by the user) or "aftermarket" flash card (developed, for example, by one of the user's friends in medical school, or by company or commercial enterprise) is permanently stored in the flash card registry, metadata must be attached to the flash card. For example, if a flashcard question or answer is written in English, may not be self-evident the application. If a user enters a user parameter which limits his or her review to flashcards with questions and answers in English, this parameter request will be meaningless unless some metadata is attached to a flash card identifying it as being in English.

In applications wherein the student or user is generating flashcards for review, and adding them to a pre-existing file folder generated by a provider, the application includes a module that provides a pop up menu of alternative parameters, and allows the user to set the parameters to the new flash cards. The user is prohibited from finalizing the download of new flashcards until the essential metadata has been added.

For example, metadata on an I.Q. test would advantageously include data about the difficulty of the card relative to other subjects in the deck. The application provider, or some other entity advantageously maintains a large statistical data base. The success or difficulty that users experience for each flashcard is uploaded to the statistical database and analyzed. Relevant data distilled therefrom is subsequently stored as metadata on the respective flashcards.

Automatic Grading of Answers

It can be readily appreciated that certain answers are graded for accuracy by the application, whereas other answers are graded for accuracy by the user. Consider, for example, questions or flash cards requiring a "true/false" answer, or "multiple choice" answers. Such an answer would advantageously be presented by a "touch screen" icon, or clicking on an icon with a cursor. The accuracy would advantageously be entered automatically, and not subject to the user's input. The true/false questions are easily graded automatically by the application as soon as the user attempts to answer them.

Gradations of Correctness and User Generated Scores

In cases, wherein the user is simply reciting to himself or herself the flash card answer, the user will simply grade himself or herself by toggling a prompt such as "correct" or "incorrect." Embodiments are also envisioned in which a user can grade the correctness answer on a graduated scale having any number of gradations. The "zero to five" scale in the following illustration is offered simply by way of example. Consider a medical student who identifies a bone as the "Humerous Head" aloud, and upon flipping to the flashcard answer, discovers that a bone was the "Humeral Head." The error may be trivial compared to other anatomy parts for which he or she has frequently gets answers completely wrong. The frequency with which a flash card is re-presented by the application is governed by the accuracy of the user's past answers. If the student were to assign a "1" on a sale of "1-5" for a minor error such as "humerous head," this flashcard would be re-visited as often as one on which the student was completely erring. A scale of 1-5, for example, allows a more exact record of a student's accuracy in gross anatomy, foreign languages, and the like. Early on in the study of gross anatomy, a student may be inclined to grade the answer "humerous head" as a four of five on a scale of one to five. Near the end of the course, when the student is answering all anatomy parts with a high degree of accuracy, the same student may want to hold themselves to a higher standard, and grade the answer as wrong, or as a one or two on a scale of one to five.

It therefore can be appreciated that the user may wish to grade the same error more liberally when the entire subject is vague, but more strictly as the student gains in proficiency. A user-assigned grade gives the student this flexibility.

Because past grades in the histogram will affect the "strength of learning" value, as a student begins to hold himself to a higher standard, they may want to "clear the histogram." However, statistical models preferably give greater weight to more recent answers, which will optimally render it unnecessary to clear the histogram.

Different gradations may be necessary for different learning tasks. Consider a theology student memorizing Scripture. A passage of Scripture may have hundred words or more. Although a scale of one to five (or zero to five) may be useful in rating accuracy of anatomical terms, or vocabulary in a foreign language, a scale of 1 to 100 might be more useful in assessing a student proficiency in Scripture memorization of a new verse or passage. Consider a passage containing 29 words. A raw score might be calculated by: (29 minus the number of errors) (divided by 29). A perfect score would therefore be "1." This "raw score" could then be multiplied by 100 to normalize it to a value more intuitive to the student. However, not all errors are equal. Imagine, for example, a passage of Scripture comprising two clauses, wherein the verse is equally sensible with either clause being recited first. If the user recites the verse with an interpolation of the two clauses, on a mechanical level, and automated word count may award the user a score of zero. All of the words would be "out of place." In the judgment of the user however, the error represented by the interpolation of the two clauses may be properly scaled as only one word, or even no error whatsoever. In an embodiment, the screen displays an open-ended score "_____ out of 29," indicating that there were 29 words in the passage. If the user determined the interpolation to the worth one-half word, and further determined that no other errors were present, the user would input an accuracy of 28.5. The application will normalize this value by dividing 28.5 by 29 (the total number of words in the passage) and multiplying the quotient by 100, for a 98.3% accuracy.

Third Party Veto of User Assessment of Grades

As discussed in greater detail below, embodiments of the application are envisioned for use in conjunction with an incentive by a second party to motivate the user to study or memorize. The third party may want to review the accuracy of the user to ensure that the monetary incentives are being awarded on an objective basis. Accordingly, embodiments are envisioned wherein the incentivizing third party would have the option of vetoing the user's ability to overwrite the automated accuracy assessment.

User Selection of Flashcards

Certain embodiments are amenable to user selection of flashcards. Consider, for example, a student memorizing Scripture. A file folder may have ten Bible verses or passages. The student may prefer to have the ten verses displayed as a "menu" or "table of contents," recite one to himself, and touch the screen of the computing device to confirm the correctness of his answer. After selecting a verse from the menu, the selected verse expands to fill the screen as the "front" end of a flash card. E.g. "Galatians 5:1-4." After the user recites the memory verse, he or she prompts the designated input to "flip" the flash card and view the correct quote on the "reverse" side of the flash card. Along with the proper translation, a field is displayed, prompting the user to enter a value representing their accuracy in the answer. In such an embodiment, the application may dispense with a display of the standard "first page" or "front side" of a flash card.

"Cover-Up" Book-Marks and Drag-Bars.

In an alternative embodiment, an answer page may comprise a line by line "cover-up" much as a book mark one might use to cover lines of a book. A "drag" icon allows the student to drag the "cover-up" bar downward, disclosing correct answers. This may allow a student to review more material faster than in a cycling flashcard embodiment. To allow grading, at some point (such as when the "cover-up" is at the bottom of the page, the application 120 will prompt the student to grade each of the questions that have been answered on the page.

Preset Parameters

An embodiment of the present disclosure is directed to digital flashcards. FIG. 5 depicts a parameter-screen for presetting operational parameters. The depiction of certain parameters in FIG. 5 shall not be construed as limiting. Other parameters not depicted in FIG. 5 are fully envisioned within the scope of the various embodiments and inventions described herein. An example of a selectable parameter is the language in which an exercise will be conducted. However embodiments are envisioned wherein multiple languages may be incorporated side by side.

Dual Language Embodiments

Consider for example, a student holding dual citizenship in the United States and Germany, who is undecided where he will study medicine. To equip him for either alternative, the student may want to memorize gross anatomy and other specialized medical terminology in both languages. A question in the format of a picture of the body part would not require any language. Nevertheless the command button "next" (or some other command required to flip the flash card to its second side) still advantageously appears in a user selectable language.

In a dual language embodiment, the parameter page preferably lists the order of the foreign language answers. When a student flips a flash card to the answer page, in an embodiment, there are successive answer pages in the several languages. A prompt such as "next" pulls up the second answer page on the computer.

Language Neutral Answers

If all command prompts (e.g. "play," "replay," "pause" and "next") are in icon format rather than language format, no language theoretically need be selected. Similarly, circumstances are envisioned (such as an I.Q. test requiring selection of a shape, or mathematical question requiring numbers or value) wherein language selection is not essential for the "answer." In a preferred embodiment, however, the parameter page offers these parameters as a standard setting to maximize user familiarity with the application.

Other Parameters

Other variable parameters may include, but are not limited to, whether a transition between flash cards is "event driven" or "time driven". An "event" requires a user prompt, such as audibly saying "next," or clicking on a navigation link/button such as the word "next." If a transition between screens is time driven, the preset time for screen transition from question to answer, or answer to next flashcard, is preferably adjustable to a user's preference is an adjustable parameter. Embodiments are envisioned wherein the time-driven/event-driven parameter is selectable by the user. However, other embodiments are envisioned wherein this parameter is fixed, such as for a test in which part of the examination is the ability of the user to answer every question within a fixed time.

Read Only and Read-Write Parameters

Some parameters may have preset values from the factory, or, alternatively, may be set entirely by a user. If parameters are pre-set by a provider, they may be read-only (not subject to alteration by the user), or read-write (accessible to the user who may alter pre-set parameters). Embodiments are envisioned which include some read only parameters, and some preset parameters that are read-write.

Select Parameters Visible on Flash Card Screen

At least some of the commonly used parameters are preferably visible on the "question page" (first page) of a flash card, and the "answer page" (second page) of a flash card. An example is a dual language embodiment, wherein a student reviewing a picture of an anatomy part. Guides and links visible on the screen will remind the student that he or she is in a dual language mode, and that, before turning to the answer card, they are required to provide both the English and German words for the body part. Right clicking (or some other navigation technique) on language link that appears on a flash card screen will advantageously redirect the user to the parameter page.

User Parameters Applied to Flashcards Under Review

In an embodiment, if the application is already open in the name of a certain user, the opening of a file folder will automatically incorporate those user parameters. Accordingly, if a user wants to alter operational parameters, those changes will preferably be entered on to the user's profile stored in the digital memory that stores the application for the computing device.

Because parameters are stored in the application under a user name, multiple persons could use the same application on the same computing device, but retain their own preferences and preset parameters.

Third-Party Applications and Courseware

"Courses" may be conceptually represented as digital "third-party applications" disposed within, or running astride of the incentivization application described above. As noted earlier, the relationship between the application and third party courseware may be thought of as analogous to applications running on a computer operating system. For example, the United States Navy has approximately fifty-seven "ratings" (specialties) among enlisted personnel, such as aviation boatswain's mate, hospital corpsmen, machinists mate, etc. Each of these ratings requires specialized training at Navy schools. There are many "ongoing" courses for these ratings. Successful completion is oftentimes a requirement for making the next rank or paygrade.

Consider an example in which the United States Navy wishes to supplement its many courses with flashcards according to the embodiments described herein. The Navy could simply utilize the general application described herein to display their courseware. Alternatively, the Navy could develop a third party application configured to operate in conjunction with the application described herein. According to one embodiment, the Navy application is functionally "inside" of the general flash card application. The user would open up the flash card application described herein.

Upon navigating to an interior menu page, the computer will advantageously display a variety of logos and icons for various third-party applications and courseware. According to this embodiment, courses developed by the United States Navy are accessed by clicking-on (or otherwise navigating through) the United States Navy emblem.

File Folders, Sub Folders and Sub Flashcards

Throughout this disclosure, flashcards and courseware (including those developed by a third-party provider) are often described as being stored in "file folders." This description is intended for illustrative purposes only, and comprehends alternative programming approaches for producing substantially the same functionality. For example, an expansive set of courseware such as the United States Navy's can be represented by a plurality of different icons, each icon representing the specific rating (specialty) of its enlisted personnel. Navigation may be conducted to any level of subfolders disposed therein. Subfolders at any level may be uniform in appearance, but may also be identifiable through unique icons.

In an alternative embodiment, the user would not need to independently open the general flash card application to access third-party courseware interfacing with the application. An icon representing courseware would appear on a menu screen of the user, such as the users "homepage." Upon opening the link to the particular courseware, the flash card application will automatically open. In an embodiment, the flash card embodiment runs in the "background," and is invisible when a third party courseware developer seeks to advance their own product by their own logo, trademark(s) and the "look and feel" of their product. In an alternative embodiment, however, certain features of the software application of the present invention will be visible in conjunction with the running of any third party courseware. This includes one or more of a logo, trademark, display of user configurable parameters, and navigation commands and icons, thereby providing users a more intuitive understanding of any additional courseware they download which "runs on" (operates in conjunction with) the application described herein.

User Created Flash Cards

Additionally, a user may create their own flashcards. The application described herein includes a module for creating flashcards, including features to enter text for a question and/or answer, command functions to import JPEG's and other photographs for visual questions and answers, and command functions to import audio segments for audio questions and answers.

Flash Card Registry

In an embodiment, flashcards (and features associated therewith, such as a histogram for each flashcard, as discussed below) are stored in a general file folder or flashcard registry. The registry comprehensively may include flashcards that have developed by multiple third-party courseware developers. Alternatively, third-party providers and courseware developers may incorporate a flashcard registry compatible only with their own flashcards and courseware.

Principle Registry

Figure 21:
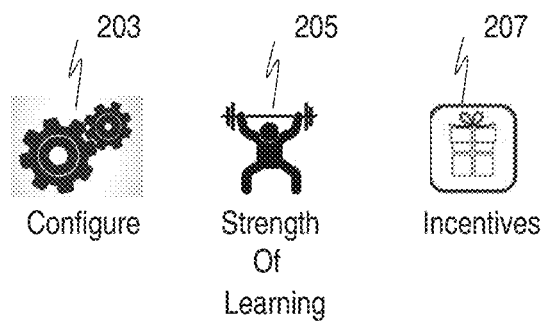
FIG. 21 depicts the "question side" of an algebraic flashcard requesting a student to prime-factor the value "18," the data table of which is depicted in FIG. 19.

As discussed in greater detail herein, a principle may be taught in multiple flashcards. Consider the principle of "prime factoring" in algebra. There may be hundreds of flashcards requiring the student to prime factor some integer value. The principle of prime factoring is thus not limited to any one flashcard. As illustrated in FIGS. 21 and 22, a single flashcard is dedicated to the prime factoring of a single integer. Not shown for algebraic principles, but illustrated in FIG. 31 for grammatical principles (and discussed in greater detail below), a separate data file is constructed for a principle taught in multiple flashcards. The data file has a histogram for the principle, recording each time a flashcard is answered that relates to that principle. A reference to the principle, or an indirect address, is stored in the principle register, preferably on the data file of each flashcard relating to that principle.

Application Control Parameters

The term "Application Control Parameters," as used herein, or the abbreviated form "control parameters" refers to equations, mathematical operations, constants, variables, values, limits, metrics, algorithms or logical flow charts, and decision models, tables (including structure and values therein) and other factors that influence the order of flash cards, or frequency of review.

Statistical Analysis, Artificial Intelligence and Adaptive Learning

In a preferred embodiment, a primary function of control parameters includes predicting student accuracy in answering a flashcard. When predictive models suggest that a students likelihood of accuracy is below a certain threshold, a flashcard is slate for review. To develop and optimize these predictive models and control parameters, simultaneous calculations are run in parallel, utilizing multiple alternative control parameters. A database maintains statistical records of the predictive accuracy and/or quality of these different control parameters. The accuracy and effectiveness of these alternative control parameters are compared using statistical models or other comparative techniques. By such parallel calculations, even before a particular set of control parameters is/are utilized in the actual control of flashcard display, such parallel calculations may identify a more optimal set of control parameters because of its superior predictive accuracy. The more optimal set of control parameters may then be substituted into an application functioning in a user's computer.

Parallel calculations may work for predictive models, but not for models needing empirical verification. That is to say, if one hundred different equations are run in parallel to calculate the probability of an accurate user answer, and one equation is more accurate, with a lower standard deviation than all the others, it is a superior for such predictive purposes. As long as the threshold for reviewing a flashcard is set at some fixed value, such as 90%, a control parameter can be deemed superior before it is even run on a user's system. However, other factors can only be calculated in "hindsight." For example, what is the optimal threshold before reviewing a flashcard? 70%? 90%? This must be discovered empirically by using different thresholds, and then seeing which level produces competence in a subject most rapidly with the lowest "drop out" rate. This cannot be achieved simply by running parallel calculations on the same person. It can only be achieved by running parallel values on different persons.

Within this disclosure, the processes of i) "parallel computation" (including statistical comparison of results), ii) "artificial intelligence" and iii) "Adaptive Learning" processes, have a great deal of overlap in design and function. One hundred equations can be crafted, and run in parallel on the same data, or the equations can be generated by an AI program and exported one-at-a-time into a user's computer to operate as control parameters. Because of the functional and conceptual overlap in statistical analysis, AI, and adaptive learning, reference herein to any one of these techniques comprehends, any or all of these alternative techniques for optimizing the course presentation.

Flashcard and Lesson Order Both Optimized by Statistical Analysis

Although the examples described herein focus largely on optimizing the order of presentation of flashcards through statistical modeling, this comprehends statistical analysis of the advantages of inserting various lectures, videos, and animations at certain points in the flashcard presentation to optimize the course in every aspect.

The Most Optimal Lessons Identified by Statistical Analysis

Referring again briefly to FIG. 12 (interactive ideal gas law illustrator), the central data base will advantageously record, statistically, how often a student revisits this illustration to conceptually reinforce the ideal gas law. Regression analysis, least squares, "ceteris paribus," and other statistical techniques are used to chart the student's performance in questions relating to the ideal gas law are charted against the frequency with which they reviewed the "interactive ideal gas law illustrator." Additionally, alternative models of the "interactive ideal gas law illustrator" can be used to determine the most effective. For example, one group of students are given a gas law illustrator with interactive slide bars controlling any of the variables. Another version may simply depict a prewritten scenario of different variables being changed, seriatim, while others are held constant. Statistics are kept on the eventual performance of the students in these alternative models. In the more interactive version, one may use slide bars, and another may use knobs. One may be with sound, another without sound. Statistical analysis of a massive student database will enable the textbook publishers or content providers to tailor the frequency of the "ideal gas law illustrator" (or any other flashcard or non-flashcard lesson) to optimize learning.

Demographic Data Analyzed in Statistical Analysis

For any demographic sector, different lessons, or variations between lessons, may be more or less ideal for different demographic groups as defined by age, race, sex, education level, foreign languages spoken, geography where the subject has lived (and any of dozens of other variables). Accordingly, there may not be an "ideal" lesson (or ideal feature in an interactive lesson), but a variety of lessons that are more or less ideal for students.

False Positives and False Negatives

Referring again to FIG. 1, lesson review may, of course, also be tied to the performance metrics and progress a student is making in a particular subject. However, courseware developers will have to incorporate "hedges" against bad data. For example, a student 113 gaining fluency in flashcards in a subject may begin to grade themselves more strictly on a self-assessment. This could appear, on first glance, as though the student's progress has slowed, and that they are making as many mistakes of equal significance as much earlier in the course. On the local data base within the application 120 of a student's computer 137, when the student "raises the bar" of self-assessment, it affects all flashcards uniformly. Therefore, this does not have a deleterious statistical impact. However, when student performance is recorded in a central database 128, wherein one student "raises the bar" for self-assessment, and another sets a low standard for self-assessment, statistical analysis is rendered meaningless, or at least, severely crippled by disparate types of data. Such false positive or false negative data may filtered by a variety of methods.

In a first embodiment, self-assessment pages include a toggle of two or more types of self-assessment. In a first mode, the student is "grading the general accuracy." In a second mode, the student is "nit-picking over specifics." In any given subject, a meaningful description of these alternative modes may be described on the self-assessment page. For example, in a foreign language, in an easy mode, spelling does not count at all, and in a more difficult mode, spelling counts. This reduces the disparity in statistics of self-assessed scores stored in the central data-base.

Another means of reducing false-positives or false-negatives is based on a profile of the user reporting the grades. Someone with a higher I.Q., a neurotic, or some other identifiable demographic group, may be more induced to keep "raising the bar" on self-assessment as they develop a fluency in a course. Least squares may be able to discard such students, and a comprehensive database of student demographics, or some other statistical control may be able to eventually identify the type of students who are more apt to "raise the bar" on self-assessment, segregating their scores within the central database 128.

A third means of reducing false positives and false negatives is through the use of data collected in quizzes for which no self assessment is possible, or wherein self-assessment is highly controlled.

Once an optimal model for flashcard selection (and lesson presentation) is discovered, it may be possible to largely dispense with statistical analysis and comparison of different control parameters, control metrics, or AI and adaptive learning modules to further hone the model. Nevertheless, further optimization may always be possible. The control parameters that work best for Algebra I may be a useful starting place for French I, but in the end, the optimal control parameters may be quite different for different courses. Statistical comparison, adaptive learning or AI programs may therefore always be necessary when a new or modified course becomes available.

Similarly, the optimal control parameters for French I may be different for a twelve year-old female from a multi lingual family than for a forty year old male who has never studied a foreign language in his life. Such demographic data may be useful in introducing a different set of control parameters for different persons.

Finally, even if different "optimal" control parameters are identified for different courses, and differently situated persons in a demographic sense, the optimal control parameters, still, may be subject to refinement due to different idiosyncratic tendencies of individual users. Therefore, the most "optimal" set of control parameters may be, in the final refinement, unique to a user and to a particular course. Statistical comparison, adaptive learning or AI programs, therefore, may continue to have value in optimizing the course for an individual user.

By collecting the broadest set of demographic data, ongoing statistical analysis may continue to uncover new statistical correlates, allowing for a more useful set of control parameters to be proposed to each individual user, optimally controlling both flashcard presentation, and the frequency and order of presentation of lessons, lectures, interactive demonstrations, and other teaching aids.

Alternative Embodiments for Reviewing Courseware

In a "complete course" embodiment, the application selects a next flashcard from among an entire course or collection of flashcards. Preferably, the "next" flashcard using statistical analysis described herein. The statistical analysis program may be honed by an AI or adaptive learning program operating along side the statistical analysis program. Cards which have been previously examined are automatically recycled (re-presented to the user) at a rate calculated to achieve and maintain a certain minimal proficiency, e.g. 90%. Whenever a student drops below 90% probability of accurately answering a flashcard, it is slated for review, thereby maintaining a high level of proficiency in subjects that have already been reviewed. When a student is "caught-up" in his review of flashcards (i.e., the student is above the predetermined baseline of proficiency among all flashcards that have already been reviewed), new flashcards in the course are presented to him, thereby advancing through the course.

In an alternative embodiment, a course is subdivided into file folders, and a student selects a file folder to review. Flashcards are segregated within file folders or other digital means of segregating flashcards. To advance, the student must personally select the next file folder. In this embodiment, the application may prompt a student to review an old file folder in which certain flashcards are growing stale. Alternatively, the student must "guess" at how often to review previous file folders to remain current in their contents, selecting a file folder for review when the student sees fit.

Order of Review and/or Frequency of Review

As used herein, the term "frequency of review" can be expressed in numerous related, but distinct meanings: i) it can refer to the number of intervening flashcards presented before re-examining an original flashcard; ii) it can refer to an intervening length of time before re-examining an original flashcard; and/or, iii) it can refer to the frequency with which a card is reviewed relative to other cards in the deck.

The reader will appreciate that these are all directed to the same concept. Accordingly, "optimal frequency," "optimal delay" and "optimal number of intervening cards" or other functionally equivalent terms used herein comprehend the widest scope of meaning that can be sensibly interpreted in the broadest sense which meaningfully applies to the alternative embodiments. Such descriptions are therefore intended to be enabling and illustrative, not exhaustive, nor limiting. The preferred embodiment, however, envisions review of most flashcards when the probability of an accurate answer falls below a predetermined threshold.

The arrangement (order) of flashcard presentation inherently affects the frequency with which a flashcard is displayed. Therefore, any metric, equation, paradigm, or control parameter directed to the "order of presentation" of flashcards comprehends "frequency of review." Conversely, any metric, equation, paradigm, or control parameter directed to the "frequency of review" of flashcards comprehends "order of presentation." The selection of the "next" flashcard relates to the order of review. These terms and concepts comprehend any metric, equation or paradigm which influences or controls the order of flashcard presentation ("application control parameters").

Performance Metrics

Various performance metrics govern both the distribution of incentives, and the order of automated review of flashcards. These metrics will advantageously be "reverse engineered" to bring about the optimal results, and will advantageously be "honed" to perfection by statistical analysis and/or an artificial intelligence (AI) program which substitutes alternative equations, coefficients, constants, and logical paradigms as the application reviews the effectiveness of the alternative performance metrics.

i) The Subject:

Is the student studying American history, music appreciation, algebra, or the Russian language? The strength of learning of a historical fact may be high after the first or second review of that fact. However, for most users, it would not be possible—after only one exposure to a melody—to listen to a ten second audio segment of classical music and identify the composer, the opus number, etc. In view of this disparity, the subject itself may advantageously be considered when establishing metrics to govern the frequency of review of flashcards. Although the coefficients, equations, flow charts, and logical paradigms that govern the order of flashcard presentation in a course on Algebra II may provide a "starting place" for the equations governing music appreciation or history, it is likely that disparate subjects will have their own learning dynamics. Alternative equations and paradigms that govern the presentation of courseware, or otherwise predict student proficiency, are compared by statistical analysis of student answers, and an AI program selects the optimal equations, coefficients, logical paradigms and flow charts for a particular subject. When sufficient data has been collected, the equations and coefficients—which were initially used to govern the presentation of courseware—can be replaced by alternative equations, flow charts and logical paradigms which more accurately predict student accuracy or performance for a different course.

ii) Accuracy:

What is the student's history of accuracy for a particular flash card, or a particular principle? This value aggregates incremental metrics for correct answers, and either ignores, or subtracts from that aggregate value, the incremental metrics for wrong answers by the student. In an embodiment, the multiplier (coefficient) for incorrect answers may be also smaller from that used with correct answers. An adjustment has to be made, however, for repeated recent answers. If a student gets a flashcard wrong, a control parameter taking accuracy into consideration will determine that the flashcard be re-presented for review more quickly than if the student answered it correctly. (Even if the student gets the answer correct, a weak flashcard may be re-asked within a few cycles to again reinforce it.) Repeating a flashcard multiple times in quick succession to "get a student back on track" may result in several correct answers in a short space of time. Such answers should not be given undue weight concerning the student's true proficiency with that question. Logical flow charts should be used to consider the intervening time (or the number of intervening cards), and reduce the aggregate weight of "accuracy" for correct answers that are given in rapid sequence for a flashcard. An example of such a logic command is: "if two or more correct answers for a flashcard or principle were given within a span of thirty minutes, the first correct answer shall be accorded the standard multiplier for a correct answer, and the coefficient for subsequent correct answers shall be reduced 50% for each correct answer given within thirty minutes since the last time that question was asked."

According to this limitation, the incremental metric awarded to a correct answer for a question re-asked within thirty minutes is multiplied by ½ the standard coefficient. One within thirty minutes of that is multiplied by ¼ the standard coefficient. One within thirty minutes of that is multiplied by ⅛ the standard coefficient, etc." Mathematical constructs are envisioned which can effect this limitation on a more mathematically rigorous ground. For example, durability (discussed below) is the length of time between correct answers. If the time between correct answers is small, or the time from an incorrect answer to a correct answer is small, the low "durability" quotient (discussed below) can advantageously be used to augment an equation for accuracy, limiting the aggregate effect of correct answers given in a short span of time.

iii) Freshness:

Even if a student got an answer wrong, review of the correct answer afterwards enhances the user's freshness with that question. According to this metric, a correct answer increases the aggregate value of Freshness, and so does a wrong answer! However, the multiplier may be different from that used with correct answers.

iv) Durability:

What is the students accuracy in answering a question correctly after a hiatus of one day? A one-week hiatus? A one-month hiatus? A five-month hiatus? A higher score for "durability" is awarded when the student is able to accurately answer a question after a longer period of time in which he or she has not reviewed it. The success at answering a question will normally be greater the more recently the user had last attempted the question. The longer delay the student is able to endure and still get the question correct, the more "durable" the student's comprehension is of that question. Success can be graphed as a function of time, and a line of best fit can be adduced to recommend a derivative metric of Durability. Care must be taken, however, to ensure that durability is not artificial. For example, if a student reviews Boyle's law, and gets it wrong, the review may nevertheless increase the probability of the student accurately remembering the ideal gas law shortly thereafter. In establishing durability, therefore, care must be taken to statistically consider the effect of flashcards that act as "memory aids" or triggers for related cards.

v) Density:

Density may be calculated with features similar to accuracy (counting correct answers and subtracting for wrong answers) or freshness (where a positive score is awarded for the correct answer, and a positive score with the lesser weight is according for a wrong answer because the card was reviewed). The principal distinction of density from either freshness or accuracy is that, in calculating freshness or accuracy, more recent answers are accorded greater weight than answers advanced a long time ago. However, it has long been recognized that repetition over a long period of time increases long-term memory and comprehension. Moreover, even if the student "completely forgets" matter, the fact remains that it is relearned far more quickly if a student had achieved a level of proficiency in that subject some time ago . . . . Particularly if the students exposure was over a long period of time. Therefore, as one goes back in time, the time-dependent "weighted multiplier" (time-dependent coefficient) attenuates more rapidly when calculating incremental metrics for Accuracy and Freshness, than it should for density. For example, if an answer given within the last minute is assigned a weighted value of "ten," an answer given a month ago might be assigned a value of "nine" or when calculating "density," but a value of "two" when calculating "accuracy." (Multipliers weighted as a function of time are illustrated below in Tables 1 and 2). A mathematical way of expressing this is that is greater than the Density Coefficient$_{(for\ a\ 6\ month\ old\ answer)}$÷Density Coefficient$_{(for\ a\ 1\ month\ old\ answer)}$ is greater than the Accuracy Coefficient$_{(for\ a\ 6\ month\ old\ answer)}$÷Accuracy Coefficient$_{(for\ a\ 1\ month\ old\ answer)}$. And, in an embodiment, Density Coefficient$_{(for\ a\ 6\ month\ old\ answer)}$÷Density Coefficient$_{(for\ a\ 1\ month\ old\ answer)}$=1.

However, because uniform long-term density is relevant to learning, and the freshness of a subject is also relevant to learning, embodiments are envisioned wherein these two factors are weighed in an equation simultaneously, even though they are in "competition" with each other. For example, an answer which was a month old may be given a value of "six," splitting the difference between Accuracy and Density.

There may, nevertheless be utility in two separate metrics that attenuate the measure of intervening time at different rates.

vi. Total Number of Cycles.

The total number times a flashcard or principle has been reviewed, and the total number of cycles a flashcard has been correctly answered, also may be relevant to assessing a student's proficiency of a subject. This is particularly true if the attempts are separated by many cycles, rather than an hundred correct answers in the space of thirty minutes. If a student has reviewed a flashcard on over one hundred separate days, and was establishing a high proficiency at it, a wrong answer after a two month lay off will probably be corrected more thoroughly after a few reviews than a wrong answer the third day a student has seen a new flashcard or principle. This metric is similar to density, but may be calculated differently. It may include the total number of cycles or the total number of correct answers. Alternatively, it may include the total number of days, weeks, or months in which a cycle or a correct answer was produced.

The Histogram of a Flashcard

Before the foregoing metrics can be distilled, however, the application must record a histogram of a student's answers for each of the various flashcards. Each flash card will have a digital histogram embedded therewith.

Table 1 below depicts an embodiment of a histogram, including the accuracy of each of the last twenty answers of a particular flashcard (or principle), and a time stamp (which includes the date and time) of the answer.

TABLE 1

Histogram: Weighted Accuracy and Aggregate Accuracy

| Attempt | Weight (%) | Accuracy (1 to 5) | Product | Date/Time Stamp |
|---|---|---|---|---|
| 20 | 10% | 5 | 50 | 2014-11-30; 18:23.04 |
| 19 | 9% | 5 | 45 | 2014-11-30; 18:22.04 |
| 18 | 9% | 5 | 45 | 2014-11-30; 18:21.04 |
| 17 | 9% | 4 | 36 | 2014-11-28; 18:23.04 |
| 16 | 8% | 5 | 40 | 2014-11-27; 18:23.04 |
| 15 | 7% | 5 | 35 | 2014-11-27; 17:23.04 |
| 14 | 6% | 5 | 30 | 2014-11-27; 16:23.04 |
| 13 | 5% | 4 | 20 | 2014-11-27; 16:20.04 |
| 12 | 5% | 5 | 25 | 2014-11-26; 18:23.04 |
| 11 | 5% | 4 | 20 | 2014-11-26; 18:02.04 |
| 10 | 4% | 0 | 0 | 2014-11-25; 18:23.04 |
| 9 | 4% | 5 | 20 | 2014-11-25; 18:00.04 |
| 8 | 4% | 2 | 8 | 2014-11-24; 11:13.04 |
| 7 | 3% | 0 | 0 | 2014-11-24; 11:03.04 |
| 6 | 3% | 0 | 0 | 2014-11-24; 10:45.04 |
| 5 | 3% | 2 | 6 | 2014-11-24; 10:30.04 |
| 4 | 2% | 1 | 2 | 2014-11-23; 17:23.04 |
| 3 | 2% | 0 | 0 | 2014-11-23; 16:23.04 |
| 2 | 1% | 0 | 0 | 2014-11-23; 16:13.04 |
| 1 | 1% | 0 | 0 | 2014-11-22; 18:23.04 |
| TOTAL | 100% | | 382/500 (76.4%) | |

In Column 1 of Table 1, the answers are numbered 1-20. The histogram could have been longer than twenty, shorter than twenty, or "cumulative" (wherein no specific limit is set). Referring to Column 2, the most recent attempt is given a 10% weighted average, and the least recent is accorded a 1% weighted average. In circumstances in which many students are using the same flash cards and courseware, an AI program will advantageously use different coefficients for different students, and compare student performance to determine which has the best predictive value in establishing a student's proficiency. In Column 3, the student (user) has rated his accuracy on a scale of 0-5 for each answer. Other scales are possible, including "right or wrong" (which may be weighted as −1 through 1, or 0 through 1), or 1-100. Column 4 records the product of the (weighted value) multiplied by the accuracy. Column 5 includes a time stamp.

The bottom of Column 4 of Table 1 records the aggregate accuracy, which is the sum of the values in col. 4. I.e., Σ (weighted percent)×(accuracy) for attempts 1-20. The twenty attempts have an aggregate weight of 100%, and an aggregate accuracy of 382 points out of a possible 500 points, which also translates to a 76.4% accuracy.

Arithmetical steps in Table 2 illustrate how the metric "accuracy" can be normalized to an intuitive scale, such as 0-100%. Such normalization allows simple derivation of highly intuitive metrics, but is not essential to the use of the embodiments described herein.

TABLE 2

| Elapsed Time (Since answer was given) Correct = T Incorrect = F | Time between answers | Accuracy Sqrt. (600 ÷ Elapsed Time in seconds For wrong answers, multiple final value by −1 | Freshness Sqrt. (600 ÷ Elapsed Time in seconds For wrong answer, divide the foregoing answer by two. | Durability Correct: sqr. Root (seconds since previous answer ÷ 3600) Wrong: (−1) *Sqr. Root (seconds since previous answer ÷ 3600) |
|---|---|---|---|---|
| T, 15 sec. | 4 sec. | 6.3 | 6.3 | 0.033 |
| F, 19 sec. | 41 sec. | −5.619 | 2.809 | −0.107 |
| T, 60 sec. | 240 sec. | 3.162 | 3.162 | 0.26 |
| T, 300 sec (5 min) | 600 sec. | 1.414 | 1.414 | 0.408 |
| T, 900 sec (15 min.) | 3120 sec. | 0.81 | 0.81 | 0.931 |
| T, 4020 sec (67 min.) | 5,820 sec. | 0.386 | 0.386 | 1.271 |
| T, 9,840 sec (2 hr. 44 min.) | 8,160 sec. | 0.247 | 0.247 | 1.505 |
| T, 18,000 sec (5 hrs.) | 18,000 sec. | 0.183 | 0.183 | 2.236 |
| T, 36,000 sec (10 hrs) | 46,800 sec. | 0.129 | 0.129 | 3.606 |
| T, 82,800 sec. (23 hrs.) | 288,720 sec. | 0.085 | 0.085 | 8.955 |
| T, 371,520 sec. (4 days 8 hrs.) | 320,400 sec. (3 days 17 hrs) | 0.040 | 0.040 | 9.434 |
| T, 694,800 sec. (8 days 1 hr.) | 1,206,000 sec. (13 days, 23 hrs) | 0.029 | 0.029 | 18.303 |
| T, 1,900,800 sec. (22 days) | 3,628,800 sec. (42 days) | 0.018 | 0.018 | 31.74 |
| T, 5,529,600 sec. (64 days) | 345,600 sec (4 days) | 0.010 | 0.010 | 9.798 |
| T, 5,875,200 sec. (68 days) | 15 sec. | 0.010 | 0.010 | 0.065 |
| F, 5,875,215 sec. (68 days, 15 sec) | 518,385 sec (6 days) | −0.010 | 0.005 | −12.000 |
| T, 6,393,600 sec. (74 days) | 8 sec | 0.009 | 0.009 | 0.471 |
| F, 6,393,608 sec. (74 days 8 sec.) | 777,592 sec. (9 days) | −0.009 | 0.005 | −14.697 |
| T, 7,171,200 sec. (83 days) | 10 sec | 0.009 | 0.009 | 0.053 |
| F, 7,171,210 sec. (83 days 10 sec.) | N/A | −0.009 | N/A | |
| Aggregates | | 7.194 | 15.66 | 115.659 |

Table 2 above depicts an alternative embodiment of a histogram. Rather than assigning a coefficient (as Table 1), the coefficient is derived from the time value itself. Column 1 depicts the elapsed time since an answer was given. These values will continually change according to the elapsed time. They may be derived from a date/time stamp, such as shown in Table 1. Column 2 depicts the time between answers. That is, if an answer is correct, had it been re-asked ten seconds after an incorrect answer was advanced by the user? This shows very little "durability." On the other hand, if the value in column 2 shows that the user gone three weeks without seeing a flashcard or the principle therein, and got the answer right, this shows a great deal more "durability."

Columns 3-5 depict various hypothetical equations for calculating accuracy, freshness and durability.

Accuracy=Sqrt. (600÷Elapsed Time in seconds)    Equation 1

For wrong answers, multiple final value by −1.

Freshness=Sqrt. (600÷Elapsed Time in seconds)    Equation 2

(For wrong answers, multiple final value by 0.5.)

Durability=Square Root (Seconds since previous answer÷3600)    Equation 3

For wrong answers, multiple final value by −1.

Examples of calculating the aggregate Accuracy, Freshness and Durability for a flash card are illustrated in Equations 4, 5 and 6.

$$\text{Accuracy}_{(Aggregate)} = \Sigma(\text{Accuracy values for each attempted answer}). \qquad \text{Equation 4}$$

$$\text{Freshness}_{(Aggregate)} = \Sigma(\text{Freshness values for each attempted answer}). \qquad \text{Equation 5}$$

$$\text{Durability}_{(Aggregate)} = \Sigma(\text{Durability values for each attempted answer}). \qquad \text{Equation 6}$$

The foregoing six equations are offered as illustrations only, and have been deliberately simplified to ensure clarity of expression. Other equations are envisioned for calculating these performance metrics. Moreover, an equation may be incorporated within a logical paradigm. If a student was already proficient, but gets a principle wrong three times in the space of two minutes, a paradigm may shift to a different equation, or different coefficients on the same equation.

A principle distinction between Table 2 and Table 1 above, is that "weight multiplier" in table 1 was "grainer." For example, in Table 1, attempts "8, 9 and 10" were all given a weighted value of 5%. In table 2, however, the "weighted value" of each answer is derived from the elapsed time, and is measured down to the second. It is functionally impossible, in the space of one second, to read a new flash card, answer the question, flip to the correct answer, compare the correct answer to your own answer, and flip to the following flash card. Therefore, the weighted multipliers in and Table 2 are, on a functional level, "spectral or "continuous." That is to say, the weighting assigned to each answer is unique. No two answers in table 3 can have the same weighted value. Table 1, on the other hand, was "granular." That is to say, the graduations in weighted values were not continuously decreasing, but allowed several answers given at different times to be assigned the same weighted value in Table 1.

Moreover, the gradations of table 1 were based upon the number of intervening flashcards, whereas the gradations of table 2 were based upon the intervening time.

Finally, a histogram of table 1 was limited to one metric: "accuracy." The histogram of Table 2 includes two additional metrics: "freshness," and "durability." Formulae are included in the top line of Table 2 to show how these values are derived. The arithmetic functions used to generate these metrics may vary, but the fundamental distinctions between these metrics are as follows:

Accuracy increases with correct answers, and decreases with incorrect answers.

Freshness increases with both correct and incorrect answers. In an embodiment, multiplier is calculated differently for correct answers then for incorrect answers.

Durability considers the time span from a correct answer of a flashcard to the most recent previous to the correct answer. It measures how deeply embedded a concept has been in the mind of the user.

For any of the foregoing metrics, in various embodiments, the multiplier on answer is weighted more heavily the more recent the answer.

Density

Density "$\rho$" is a measure of consistent repetition over a period of time. In calculating accuracy, the weighted multiplier significantly reduces the value of data with passage of time. In predicting a student's likelihood of accuracy on a subject flashcard, a histogram record of a correct answer twenty-four hours earlier is more probative of student success than a correct answer two years earlier.

In contrast, Density does not reduce the weight of past answers as significantly, if at all. Density is concerned with how long someone has studied a subject, and how diligently over a period of time. For example, if someone reviewed a flashcard every month for four years, it would rate high on Density.

In a mathematically simplified embodiment, Density calculations may break the calendar into months or years, and offer a general estimate of the density for each month. To create some sort of control, each month may be normed to a maximum value, such as 1, if a matter was reviewed sufficiently during that month. Thus, Density offers a prediction of long-term memory and comprehension that generally comes with long-term exposure. In an embodiment, the equation for $\rho$ can be represented:

$$\rho_{(for\ a\ particular\ month)} = (\text{Square Root (Number of Days Flashcard was reviewed during the month))} \div 5.477 \qquad \text{Equation 7}$$

For example if a flash card were reviewed 23 times in a month, the square root value would be 4.78÷5.477=0.8727. Through the foregoing equation, the maximum density for any single month is normed to 1. The foregoing equation could be adjusted to create a more intuitively accurate predictor. For example, if a student has reviewed a flashcard every month for two years straight, and has displayed an accuracy of 100% for fourteen consecutive months, a review of five times per month may be more than enough to establish maximum density for that month. Whereas, in the earliest months that the student learned a topic, a review of fifteen or thirty times per month may have been necessary to "jump start" the student's proficiency. Accordingly, monthly metrics which are aggregated for "density" may be calculated differently. Below, Equation 8 illustrates a cumulative expression of density over a period of time.

$$\rho_{(Total\ per\ flashcard)} = (\text{Total Consecutive Months})*(\text{percent of those months in which the user reviewed the flashcard})*(\text{density of each respective month}). \qquad \text{Equation 8}$$

Equation 8 is offered only for illustrative purposes of an aggregate value for density over a period of months. Other aggregation formulas are envisioned. Consider, for example, that user first reviewed the subject flash card for six consecutive months. The second reviewed the subject flash card for six consecutive months, and prior to that, reviewed the subject flash card on alternating months over a period of one year. The user who had a one-year head-start intuitively had a higher aggregate density score. However, foregoing equation would favor the user who just began studying a flashcards six months ago, which contravenes the purpose of the metric "Density." Equations for calculating density should be developed or proposed based on an intuitive understanding of the programmer of what the metric is attempting to demonstrate. Improvements and refinements to maybe in the way of substitute values, alternative mathematical operations, and/or incorporating a flowchart (decision chart) in the calculation process.

Performance metrics are used, inter alia, to predict student success in answering a specific flashcard if he were to answer it "immediately." This, in turn, is used to regulate and control the selection of flashcards that are presented to the user (as well as calculating when to distribute rewards or incentives). Flashcard selection is configured to optimize the speed at which the student advances through a course, and to optimize the strength of learning metrics associated with each flashcard. In a preferred embodiment, this is achieved by accurately predicting student accuracy on flashcards (including principles taught in compound flashcards), and reviewing the flashcards or principles sufficiently often to maintain student proficiency above a certain minimum threshold (e.g. 90%) while progressing through the deck.

Various metrics are also used to predict the student's probability of success when a student is ready for an exam that will not commence "immediately," but in one day, one week, etc.

Reciprocal Metrics

Referring to Table 1, the user had a 76.4% accuracy rate for the hypothetical flash card. The reciprocal of accuracy (i.e., 100%−76.4%=23.6%) can be thought of as the error rate. A reciprocal value of a Metric "M" is herein depicted {R}M. Reciprocal values need not be calculated the same way, and indeed, if a metric is not normed at "1" or 100%, the foregoing formula is not relevant. Nevertheless, some form of reciprocal can be generated for any metric, including Accuracy {R}A, Freshness {R}F, Durability {R}D and Density {R}ρ.

Derivative Metrics

In an embodiment, a "line of best fit" can be generated if at least two distinct data points exist for a metric. Using the metric "Accuracy," for example, a user's Accuracy in answering a particular flashcard is plotted over successive cycles, A "line of best fit" is calculated by any known method, such as "least squares." Once a "line of best fit" is established, a slope of the line is calculated, constituting a derivative metric. Reference to using "least squares" to establish a line of best fit is offered by way of example only. Any mathematically sensible technique for establishing a "line of best fit" may be employed. Similarly, the "derivative metric" need not be the slope of a line. Any value derived from an underlying metric may be used.

Within this disclosure, a derivative metric for Accuracy is represented as $\partial A$, the derivative for freshness is $\partial F$, and the derivative of durability is $\partial D$ and the derivative for Density s $\partial \rho$. The foregoing means of calculating a derivative are, as noted, only offered by way of example. A derivative metric may be the slope of a line, or any other derivative function which meaningfully conveys information, and is derived from the underlying performance metric.

Combining Metrics

Metrics are advantageously combined into one or more values that predict a user's probability of success in: i) answering a particular flash card during the review session currently underway; ii) test performance (e.g. SAT, LSAT, GRE, etc.), and, iii) long term job performance. Different equations may be necessary to most accurately predict each of these diverse performance demands, and to govern the order and frequency of review of flashcards.

Consider the following hypothetical equation for determining the probability of success of an answer to a flashcard:

$$P_{success\text{-}Flashcard} = (k_1 * \text{Accuracy}) + (k_2 * \partial A) + (k_3 * \text{Freshness}) - (k_4 * \partial F) + (k_5 * \text{Durability.}) + (k_6 * \partial D) \quad \text{Equation 9}$$

In the foregoing equation, each of the values (Accuracy, Freshness, Durability, and their derivatives,) are preferably normed to some value, or otherwise manipulated, such that $P_{Success}$ ("Probability of success for answering a flashcard") can be directly calculated from Equation 9, or more easily derived from Equation 9. $P_{Success}$ for each flashcard then used to organize the order of presentation of flash cards in a deck. There are two problems with Equation 9. Firstly, the concept of "Probability of Success" varies over time. A student who has just reviewed a subject flashcard may have a 99% probability of success if he or she reviews it again within the next 15 seconds, a 90% probability of success if he or she review it in five minutes, and 40% probability of success if he or she waits three days before attempting to answer it again. So "$P_{success\text{-}Flashcard}$" is not a truly meaningful metric. It depends on intervening time and/or intervening events (like the review of other flashcards).

The second problem with Equation 9 is that it has an upper limit. This does not meaningfully represent strength of learning of certain words. Consider a foreign language student who learned several hundred French words in seventh grade, and never studied or reviewed it again. Twenty years later, the probability of recalling most French words or rules of grammar is virtually nil. However, many former students of French can still say the word "bonjour," ("hello," or, technically "good day") forty years after they have forgotten the language as a whole. A 99% rating of "bonjour" compared to a 28% rating of "empêcher" ("to prevent") hardly captures the difference in the strength of learning these two words by our intrepid French student.

An improvement on Equation 9 is presented below in Equation 10.

$$\text{Strength of Knowledge} = (k_1 R * \text{Accuracy}) + (k_2 R * \partial A) + (k_3 R * \text{Freshness}) - (k_4 R * \partial F) + (k_5 R * \text{Durability}) + (k_6 R * \partial D) \quad \text{Equation 10}$$

wherein "R" is the total number of times the flashcard (or principle) has been reviewed. In Equation 10, the "strength of knowledge" is not "normed" to a fixed upper limit such as a probability of 1, or a probability of 100%. Rather, strength of knowledge of a flashcard is "open ended." It can grow to any limit. This reflects human learning in many endeavors, such as illustrated above with the French word "bonjour."

Note that a negative value is given to $\partial F$ (the slope of the freshness line). Ideally, as a student demonstrates proficiency in a flashcard, the delay between reviews of that flashcard will progressively increase, allowing the student to review of more and more intervening flashcards as the student's scope of comprehension grows. The "delay" between reviews of a subject flashcard (measured in terms of an amount of intervening time between reviews of the subject flashcard, a number of intervening flashcards before returning to a subject flashcard, or a combination thereof) should be progressively growing as competence increases.

This problem reflects a tension in how to utilize "freshness" in calculating the probability of a correct answer, or other performance metric. Freshness is of greater relevance if the "durability" is low, but less relevant as a student's durability in a principle grows.

Since "freshness" is related to the frequency that a flashcard appears, a trend toward increasing freshness (a positive slope of the line) demonstrates that the student's proficiency was overrated, necessitating that the "strength of learning" value be reduced. The AI programmer should recognize, however, that such negative values could create "feedback" and generate an "oscillation" wherein the student's competence does not progressively grow, but moves like a sine wave. Mathematical precautions must be taken to avoid oscillations, or other counterproductive circumstances.

Frequency of Review Derived from Strength of Knowledge

The "strength of knowledge" value can easily be translated into a probability. Consider, for example, Equation 11 below:

$$P_{successful\ answer} = 0.7 * (\text{Strength of Knowledge} \div \text{Time}) + 0.3 * (\text{Strength of Knowledge} \div \text{Number of Intervening Flashcards since the last attempted answer})$$   Equation 11

Equation 11 incorporates Equation 10, and calculates the probability of successfully answering a flashcard if reviewed on the next cycle (the next presentation of a flashcard). In Equation 11, the coefficients 0.7 and 0.3 are hypothetical. It is possible that the "Strength of Knowledge÷Number of Intervening Flashcards" is irrelevant to the probability of success, and should be removed from the equation. Alternatively, it may be discovered by large scale statistical analysis of the progress of thousands of students, that, at least for a specific subject, such as French or algebra, when a student first learns a new principle, the number of intervening flashcards serves as a "mental distraction" independent of time, and the hypothetical coefficients 0.7 and 0.3 are accurate. However, as a student gains competence in a new flashcard, the distractive effect of intervening flashcards is reduced, and intervening time between reviews becomes the dominant. In such statistical discovery, the coefficient on "Strength of Knowledge÷Time" may gradually grow from 0.7 to 1.0, whereas the coefficient on "Strength of Knowledge÷Number of Intervening Flashcards" gradually decreases from 0.3 to zero over the first thirty-five reviews of the subject flash card. Alternatively, the coefficient may for "Strength of Knowledge÷Number of Intervening Flashcards" may decrease from 0.3 to 0.04 over a period of thirty-five flashcards, but then level off. Statistical analysis of student performance, coupled with an AI program or Adaptive Learning program to move equations and paradigms to the more efficient format, will gradually improve the effectiveness of the application.

Table in Place of an Equation

The reader will appreciate that it is not necessary to reduce the "open ended" value of Equation 10 to a percentile by means of Equation 11. As illustrated below in Table 3, the Application 120 or Transaction Administrator 127 (FIG. 1) may simply track the statistical success of answering a question, against the "Strength of Learning" value of Equation 10 (or some similar equation), and identify the Strength of Learning values falling at percentile breaks.

TABLE 3

| Strength of Learning | Probability of Success (%) |
|---|---|
| 6,600 and up | 99% + |
| 6,589 | 98% + |
| 6,500 | 97% + |
| ○ | ○      ○ |
| 3,550 | 90% |
| 3,512 | 89% |
| 3,050 | 88% |

Quality of Predictions:

There are at least three factors that determine which performance metric is the superior include the equation (or performance metric) which: i) on the average, comes closest to predicting user accuracy; ii) the equation whose predictive value displays the lowest standard deviation from the target range; and, iii) the equation that has the greatest linear smoothness.

Linear Offset not Considered a Weakness:

If an equation or other set of control metrics consistently predicts 87% accuracy when the results consistently show 90% accuracy, this simple linear offset is not to be considered a weakness in the equation. Rather, a simple linear offset can be added to the "strength of learning" equation (or other control metric) to conform the predictive value of the equation to that which occurs in the real world.

Linear Smoothness

Since a table can be reverse engineered to comport exactly with the probability of success, this accuracy may give the illusion of being reliable and useful. However, while a table can be statistically "engineered" to align specific percentiles at specific "strength of learning" values, it may be deeply flawed in reality. The above table exhibits a profound lack of linearity. At a "strength of learning" value of 6,589, a mere eleven point increase will improve the from 98% to 99%. However, to improve accuracy from 97% to 98% requires an eighty-nine point jump. The reader will appreciate that, if the curve is linear within the desired range, non-linearity elsewhere is not very significant. Moreover, an equation that is linear on a log scale may still have good predictive value.

Standard Deviation

A strength of learning equation, or other control metric, must accurately predict user accuracy in the desired range. If the predictions have a very low standard deviation the predictive value is more reliable, and the equation is superior to one with a high standard deviation.

Statistical Comparison of Equations

Alternative equations and/or tables will advantageously be run in parallel, using multiple different equations, different coefficients, and different constants. The results are compared in statistical analysis to identify the superior equation, table, paradigm, or other tool for generating a reliable performance metric which governs, in large part, the order of flashcards.

Predicting Future Performance

Poor linearity and high standard deviation from the statistical norm are just two ways of judging the utility of an equation. Ultimately, the gravest statistical weakness portended by lack of linearity and high standard deviation, is quality of predictions of the mathematical model. At a roulette table, the fact that the ball had fallen on "red" nine of the last ten times does not mean that the next roll has a 90% chance of being red. The odds of the roulette ball landing on red are about 48.64% no matter how many consecutive reds are rolled. Nine reds in a row has no predictive value on the next turn of a roulette wheel. Similarly, the essential feature to the collection of statistical data in the learning application described herein is the ability of that statistical data to predict, reliably, future accuracy in student answers—not simply report on past success. This is the ultimate goal of the "strength of learning" equation. The equation, and tables generated therefrom, are useless if they simply describe past statistics. The goal is to find the optimal equation (including the optimal variables and coefficients) to accurately predict future accuracy of the user. Only then can the learning paradigm described below in FIG. 34 (review of flashcards) be meaningfully applied.

Equations or variables may differ from flashcard to flashcard. For example, most foreign languages have "cognates." Assuming, for example, that a student's native language is English, a "cognate" will sound very similar to the English word. For example, in many foreign languages, the word for "Europe" is similar to the English word "Europe." Consequently, the "learning curve" for cognates will be faster than for very unintuitive foreign words. Whether the same equations and variables will work equally well for highly intuitive flashcard questions as for highly un-intuitive flashcard questions must ultimately be answered by statistical analysis of control parameters, and/or trial substitution of alternative variables and equations through an AI module or adaptive learning module.

It should be noted that, even if the equations and metrics begin to "break down" (loose reliability in their prediction of accuracy outside of a certain range) this need not severely impact the usefulness of the equations in most cases. As long as an equation is reliable within the range for which it is being used, this is sufficient. In a preferred embodiment, the trigger point for reintroducing a "stale" card for review will be when a the probability of accurately answering a flashcard has fallen to a level in the range of 75% and 96%, and more preferably, in the range of 88% to 94%.

Statistical Data and Artificial Intelligence In Selecting Optimal Equation

As discussed above, Equations 10 and 11 were simply offered as a starting point for predicting user accuracy for a given flash card. In selecting the best equation for predicting the probability of a student accurately answering a flashcard question, the transaction administrator 127 (FIG. 1) will advantageously run parallel alternative equations, or parallel equations with alternative coefficients, and track the statistical success of the alternative equations in predicting user accuracy. The predictions of the alternative equations are compared. All other things being equal, the superior equation is the one which most reliably predicts the accuracy of a student in answering specific questions. This is largely, but not exclusively, determined by the standard deviation.

Although embodiments of the claimed invention comprehends values outside of the following range, according to an embodiment, the control metrics will preferably establish a cut-off at somewhere between 75% and 97% accuracy, and even more preferably between 88% and 94%. That is to say, the control metrics predict the probability of a student accurately answering a question. Because intervening time and/or intervening flashcards degrade the probability of a correct answer, the probability continually decreases if an answer is not reviewed. When the probability falls below a certain threshold (e.g. 90%), the flashcard is flagged as "stale," and slated for review. As discussed below, this threshold will optimally be adjusted by an AI program which substitutes different values and determines which operational level of accuracy is optimal for advancement through the course (or individual flashcards), and mastery of the subject.

Final exam accuracy is optimally set at 99%. These goals can be altered, but they for a starting place in seeking the "optimal" equation for governing the order and frequency of flash cards presented by the application.

In a preferred embodiment, an AI application will substitute alternative equations, coefficients, variables, logical decisions, and other control metrics, maintain statistical records of their ability to predict, and hone the equations and/or variables to the most accurate and useful.

Once a superior predictive equation (e.g. "strength of learning" equation) is identified out of dozens, or even hundreds of alternative equations running in parallel, that equation becomes the baseline for further refinement. Dozens or hundreds of new equations are generated by making increasingly minor deviations to the preferred equation, including variations in coefficients and constants. These equations are again run in parallel on computers of multiple users, and their predictive value is measured and statistically analyzed by the AI module. The most accurate is again selected, progressively refining the predictive value of the equation, and thereby optimizing the learning experience of the user.

The ultimate goal of the application is to achieve the maximum accuracy in the shortest amount of time. As noted, hypothetical targets are: 90% probability of accuracy before advancing to a new flashcard, and 99% accuracy after reviewing for a final exam and mastering the material to which a student has been exposed. It is possible that the predictive accuracy of various equations may be within certain bands. For example perhaps no equation reliably predicts a 90% accuracy, but the reliability of predictions of accuracy may rise precipitously by the time an equation is predicting a 93.7% accuracy by a student with a given flashcard. In such an event, the application can be reprogrammed to advance a student to new flashcards and lessons only after a 93.7% accuracy level is reached on "active" flashcards, producing a reliable and predictable learning application.

However, after all the numbers are pushed around, the goal of an AI program is to bring the maximum number of students to a maximum level of accuracy (proficiency, mastery of the subject matter) in the shortest period of time.

Auto Selection of Flashcards and Advancement through a Course

An essential feature in optimizing the learning of the student is to optimize the rate of review of flashcards. If flashcards are reviewed too often, a student will not advance through the course at a reasonable pace. If reviewed too infrequently, the student will not remember the material. In computer based training heavily geared to flash-card review, effective teaching therefore requires arranging the order of flash cards being reviewed to optimize the student's capacity to learn the greatest amount of data and maintain the highest level of accuracy.

An auto-advance program for an entire course adds new flashcards to the active deck, until an entire course has been completed at some minimal level of proficiency. An embodiment of the process is discussed in greater detail in conjunction with FIG. 34. For purposes of illustration only, the "minimum proficiency" before advancement to new flashcards, also referred to as $P_{success-Flashcard}$ (probability of success of a flashcard) for each active flashcard, is arbitrarily set at 90%, and the "target proficiency" after the completion of a course (in preparation for an exam) at 99%. These values are for example only. The reader will understand that "probability" is expressed in terms of a scale of "one-to-one-hundred" for human intuition. Normalization at "1," (one), log-normal graphs, or even "open ended" scales may be utilized in place of a performance metric based on a one-to-one hundred scale or "percent." In an embodiment, what the value shown to the student is in a "percent" format, while the value used in calculations is mathematically related, but distinct from, the "percentile" value. Other "performance metrics" or "strength of learning metrics" are envisioned, and the probability of successful answer is offered as an example of a preferred embodiment of a performance metric.

Order of Flashcard Review

In a preferred embodiment, the order of flashcard presentation is not "predetermined." Rather, a "next" card is selected only after the preceding card has been answered, and the correctness of the student's answer has been recorded. At that time, the application reviews and/or recalculates the performance metrics of all "active" flashcards, and selects the "next" flashcard (or lecture) for review. This considers not only the "strength of learning" or "performance metric(s)", but also, the classification of a flashcard.

As discussed subsequently herein, alternative paradigms of review are envisioned for different classifications of flashcards.

Basic Algorithm for Reviewing Flashcards

Figure 34:
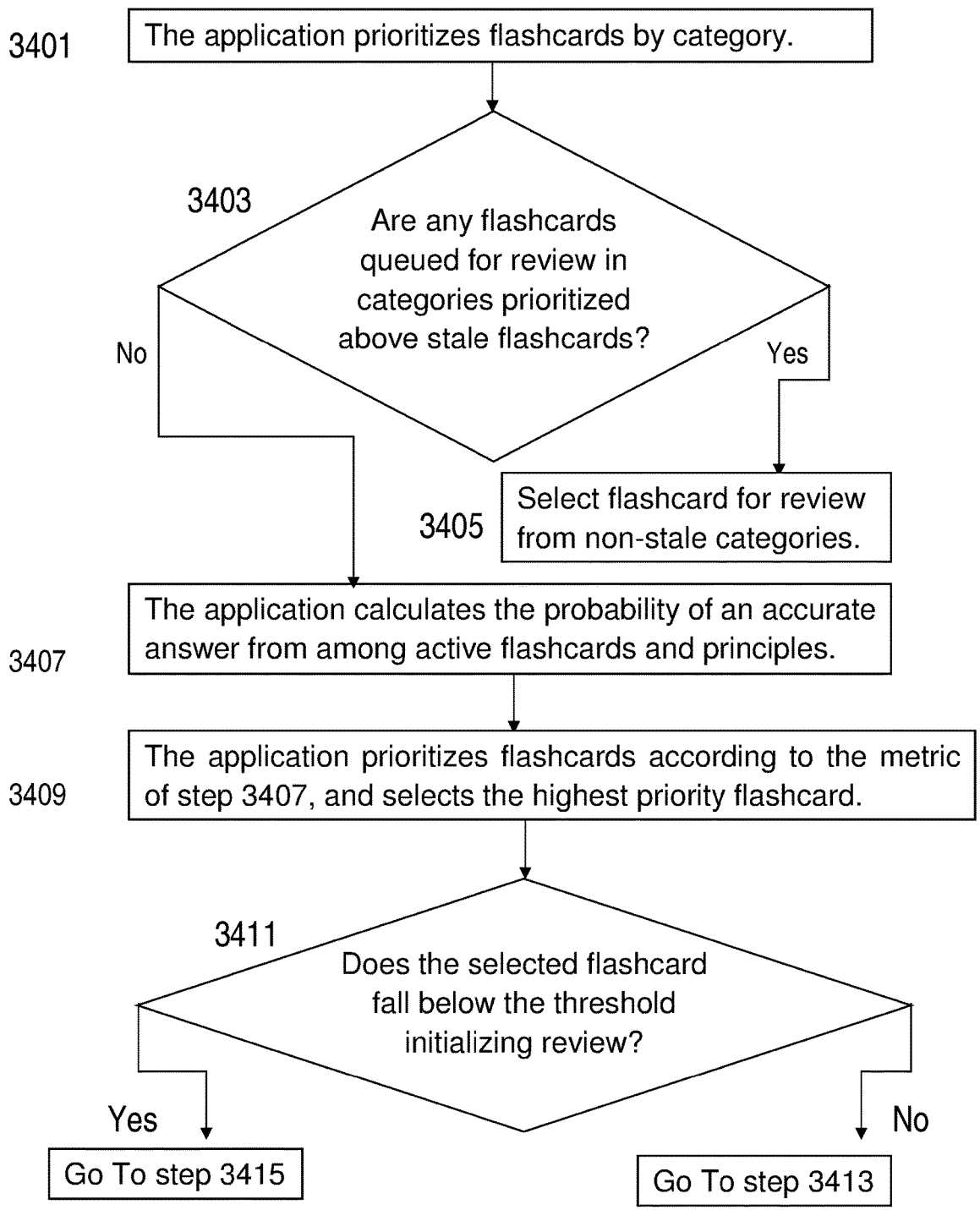
FIG. 34 depicts a flow chart of a method for selecting a "next" flashcard, as depicted in FIGS. 2, 3 4, 10, 11, 21, 22, 29, 30a, 30b, and advancing through a deck of flashcards.
Figure 34:
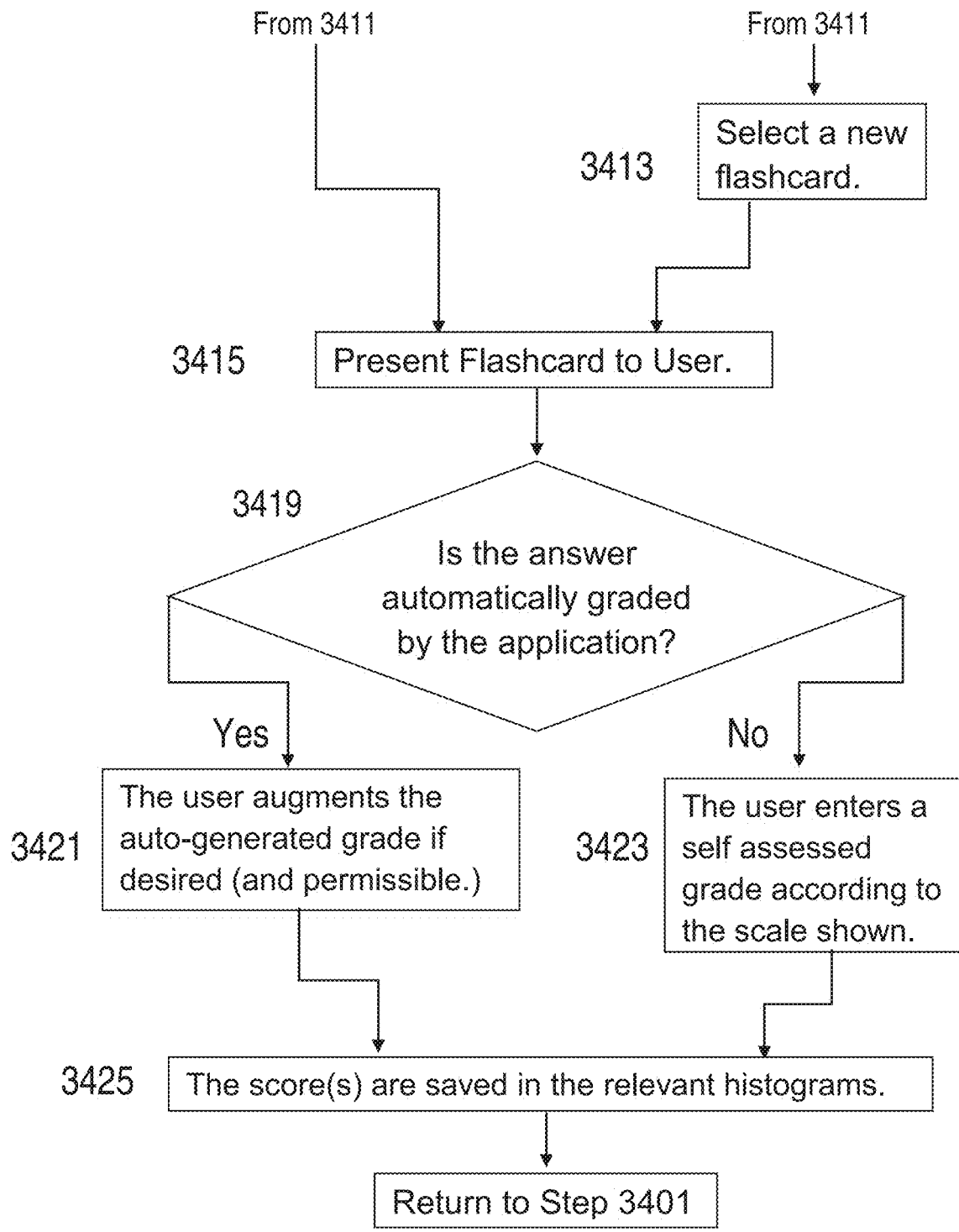

At the beginning of every flashcard cycle, the Application must select the next flashcard. FIG. 34 discloses a method for flashcard selection.

In step 3401, the Application 120 of FIG. 1 categorizes flashcards by category. As discussed above, various categories (introductory, stable, stale, tainted) may utilize different criteria for review. A stale flashcard is one which is marked for review when it falls below a certain performance metric (e.g., a 90% probability of an accurate answer), whereas a "tainted" flashcard (one which was answered incorrectly in review after it became stale). Flashcards are only assigned alternative categories if the standard paradigm for a "stale" flashcard becomes ineffective—having high standard deviation from the predicted probability of accuracy. If the equations and paradigms governing stale flashcards are useful, no alternative categories are even necessary.

Assuming, however, that certain flashcards are assigned to alternative categories, the paradigms governing those categories may follow a fixed schedule for review. For example, a "tainted" flashcard may be reviewed on the second, eighth, sixteenth, twenty-fourth, thirty-forth and forty-sixth cycles after being answered incorrectly. An introductory flashcard (one which has been introduced, but has not been answered often enough to be classified as "stable") may also have a review process independent from the standard "90% probability of an accurate answer" or other performance metric. If such alternative categories exist, the relative priority among categories must be established. For example, a priority paradigm may establish introductory flashcards highest, followed by tainted flashcards, followed by stale flashcards.

In step 3403, the Application 120 determines if there are any flashcards queued for review in categories prioritized above stale flashcards.

If there exist any flashcards queued for review in categories prioritized above stale flashcards, then in step 3405, the highest priority flashcard from among that group is selected for review. Those skilled in the art will readily appreciate that if there are multiple flashcards awaiting review in step 3405, additional decision charts or paradigms may be introduced to prioritize the remaining candidates for presentation.

If, in step 3403, there are no flashcards queued for review in categories prioritized above stale flashcards, then, in step 3407, the application calculates the probability of an accurate answer from among active flashcards and principles. Examples of equations for calculating performance metrics are depicted in Equations 10 and 11. As discussed above, the calculation of performance metrics may be an ongoing process, and may take place asynchronously from the flashcard cycles. In such embodiments, step 3407 may be skipped or modified.

In step 3409, the Application 120 of FIG. 1 prioritizes all active flashcards. The flashcard with the lowest strength of learning or performance metric is selected as the highest priority for review. Those skilled in the art will appreciate that any flashcards assigned to a different categories are exempt from the selection process of steps 3407 and 3409. This exemption may be effected by pointers, flags, or other digital techniques. In an embodiment, the Application cursors through the performance metrics. A flag is toggled if a flashcard is weak enough to merit review. When toggled, the Application 120 writes the flashcard number (or principle number) and its respective performance metric into first and second temporary digital fields. As the Application searches through the sequence of remaining flashcard metrics, it compares the value in the second temporary field with the performance metric of the each of the sequence of remaining flashcards. If a weaker flashcard is encountered, the first and second temporary digital fields are overwritten with the new flashcard number and performance metric.

In step 3411, if the selected flashcard does not fall below the threshold level initializing review (e.g., it is not below 90% probability of a correct answer), then none of the active flashcards are in need of review. Accordingly, in step 3413, the Application selects a new flashcard for review. In this manner, the student advances to new flashcards only when they exhibit a rudimentary grasp of the flashcards they have already seen.

In step 3415, the new flashcard is presented for review to the student.

Order of Flashcards Configurable to Textbook

The digital course may then be configured to conform to a particular textbook being used by a student. For example, "Publisher A" may have an electronics chapter in which Kirchhoff's current law is taught first, and Kirchhoff's voltage law is taught second. Publisher B may teach these two laws in the opposite order. In configuring the flashcards for review, a configuration page offers a selection process such as a drop-down menu to select from among text books that have been conformed to the digital courseware. Once the text book is entered, the order of the "chapters" or "lessons" in the digital course (e.g. the flashcards) is conformed to the order of chapters (lessons) in the textbook. In this manner, "new" flashcards are also governed to conform to the lesson order of the selected text book. In any event, the selection of "new" flashcards is preferably not in random order, but to the unfolding of the course in a predetermined manner.

Returning to step 3411, if the selected flashcard does fall below the threshold level initializing review (e.g., it is below 90% probability of a correct answer), then, in step 3415, the selected flashcard is presented to the user, who answers the flashcard.

In step 3419, if the answer is not automatically graded by the Application 120, then, in step 3423, the user enters a self-assessed grade. It is recalled that, for compound flashcards, there may be multiple principles being tested. The self-assessment portion of the flashcard may unfold into nested answers for compound questions, as depicted in FIG. 30b.

If, in step 3419, the answer is automatically graded by the Application 120, then, in step 3421, the user may augment the score if it is permitted by the software configurations and limitations.

In step 3425, the scores are saved in all relevant histograms, and the process returns to step 3401.

Reducing Processing Demands on CPU in Calculating Performance Metrics

In a preferred embodiment, the re-calculation of one or more performance metrics for a flashcard takes into consideration the histogram for that flashcard. Examples of histograms are shown in Tables 1 and 2 above, as well as FIGS. 19, 20, 27, 28 and 31. Examples of the equations for deriving the strength of learning metrics from these histograms are illustrated in Equations 1-11. However, these calculations may consume an inordinate amount of the CPU processing power, requiring significant overhead by the user's computer 137. In an embodiment, the application 120 of FIG. 1 recalculates the strength of learning or some other performance metric of all active flashcards after each flashcard cycle. However, in a deck of several thousand flashcards, many having dozens or hundreds of entries in their respective histograms, the calculation could take several minutes. This is hardly conducive to flipping through a digital flashcard deck. Moreover, since the goal is to accurately predict the accuracy of a user in answering a flashcard, it is possible that an artificial intelligence program described herein will identify a superior equation that consumes even greater amounts of processing power and CPU bandwidth.

Figure 36:
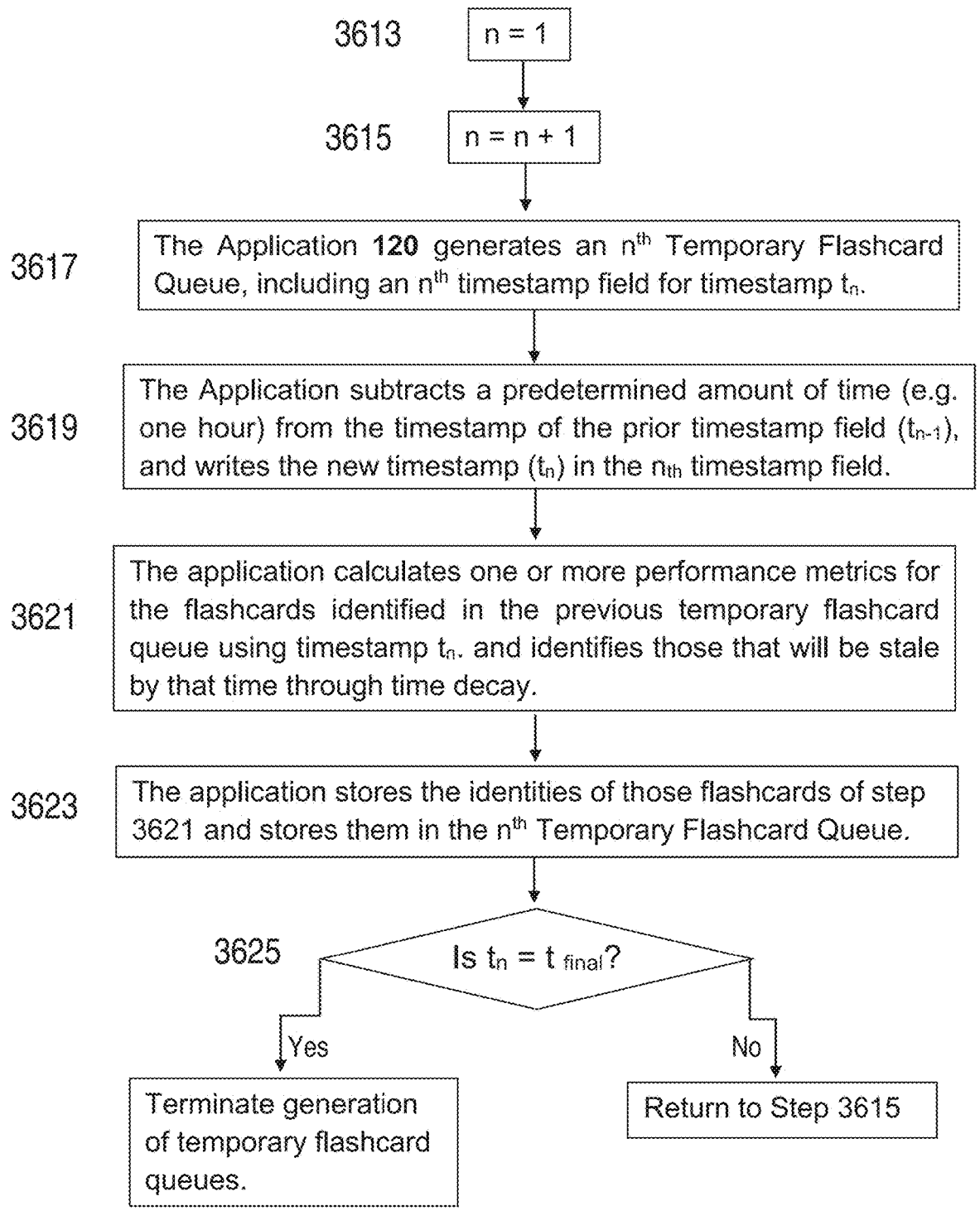
FIG. 36 depicts a method for generating flashcard queues for multiple future times to reduce overhead and the need to recalculate a flashcard's performance metric as often.
Figure 37:
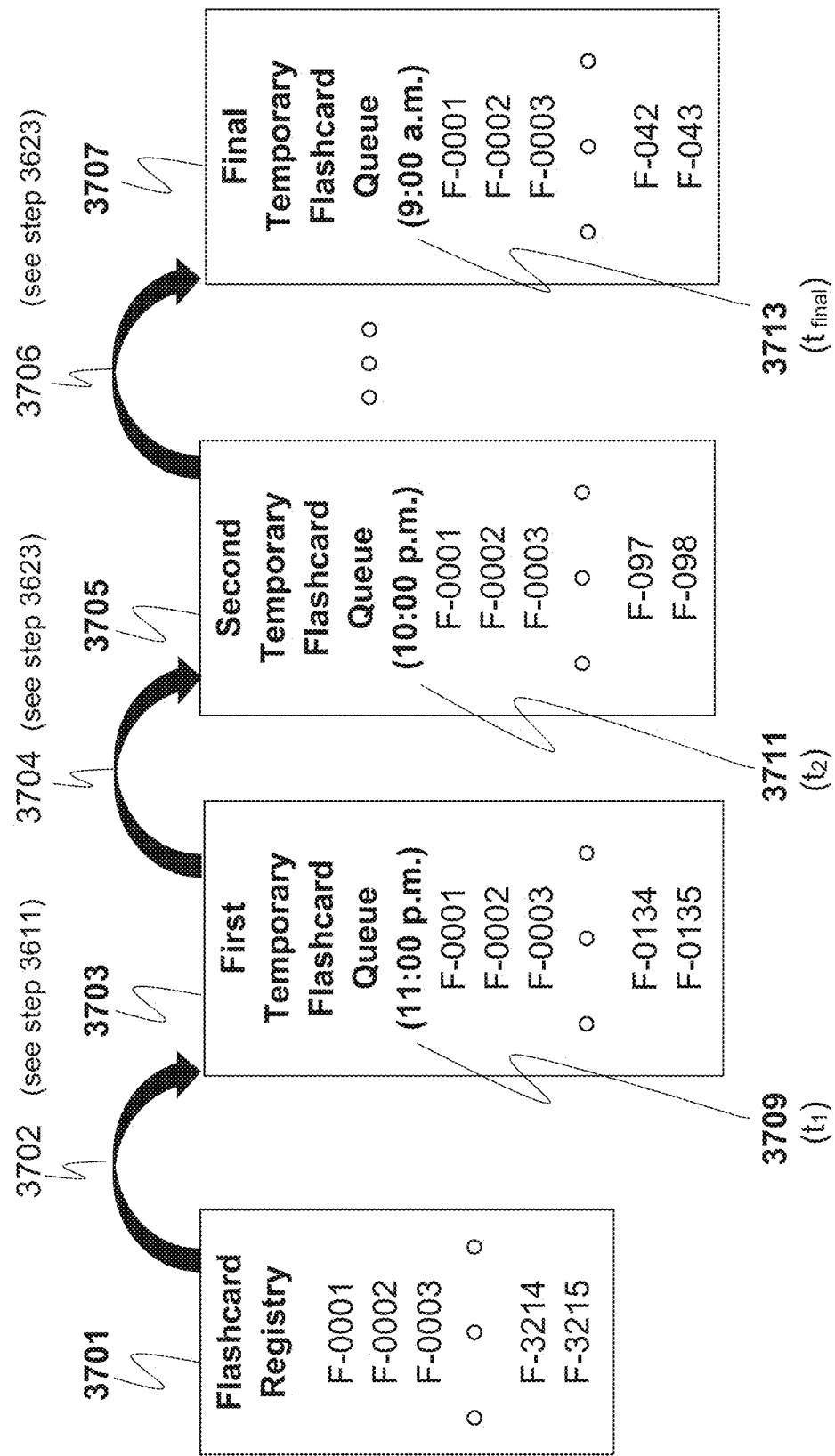
FIG. 37 depicts a sequence of temporary flashcard queues, the performance metrics of the flashcards listed in each queue being calculated at different future points of time.

A need exists, therefore, to reduce the "overhead" (CPU bandwidth consumption) and reduce the delay between flashcard cycles that would result from re-calculating the performance metrics of every active flashcard after each flashcard cycle. A need further exists to achieve these savings without any decrease in the accuracy the algorithm for selecting the "next" flashcard. Performance metrics of a flashcard (or a principle) degrade over time. FIGS. 36 and 37 depict a method that uses this feature to reduce consumption of CPU bandwidth, and reduce the calculation time between flashcard cycles.

Projecting Performance Metrics at Future Points in Time

The strength of learning of flashcards decays or degrades over time. Eventually, the "strength of learning" (or some other performance metric(s) used to organized the order of flashcard presentation) will fall beneath the "review threshold," triggering review of the flashcard. In the present disclosure, the threshold has been set, by way of example, as the probability of a student correctly answering a flashcard. The value of 90% is used for illustration of that threshold in FIGS. 36, 37 and 38, as well as throughout much of this disclosure.

Assume, under this example, that a student terminates their studies every day, no later than 11:00 p.m., and goes to bed. While a student sleeps, as the performance metrics of all active flashcards degrade. Some of them will fall below the review threshold during the night, necessitating review the next day. As decay continues throughout the next day, some will fall below the review threshold during the day.

Figure 38:
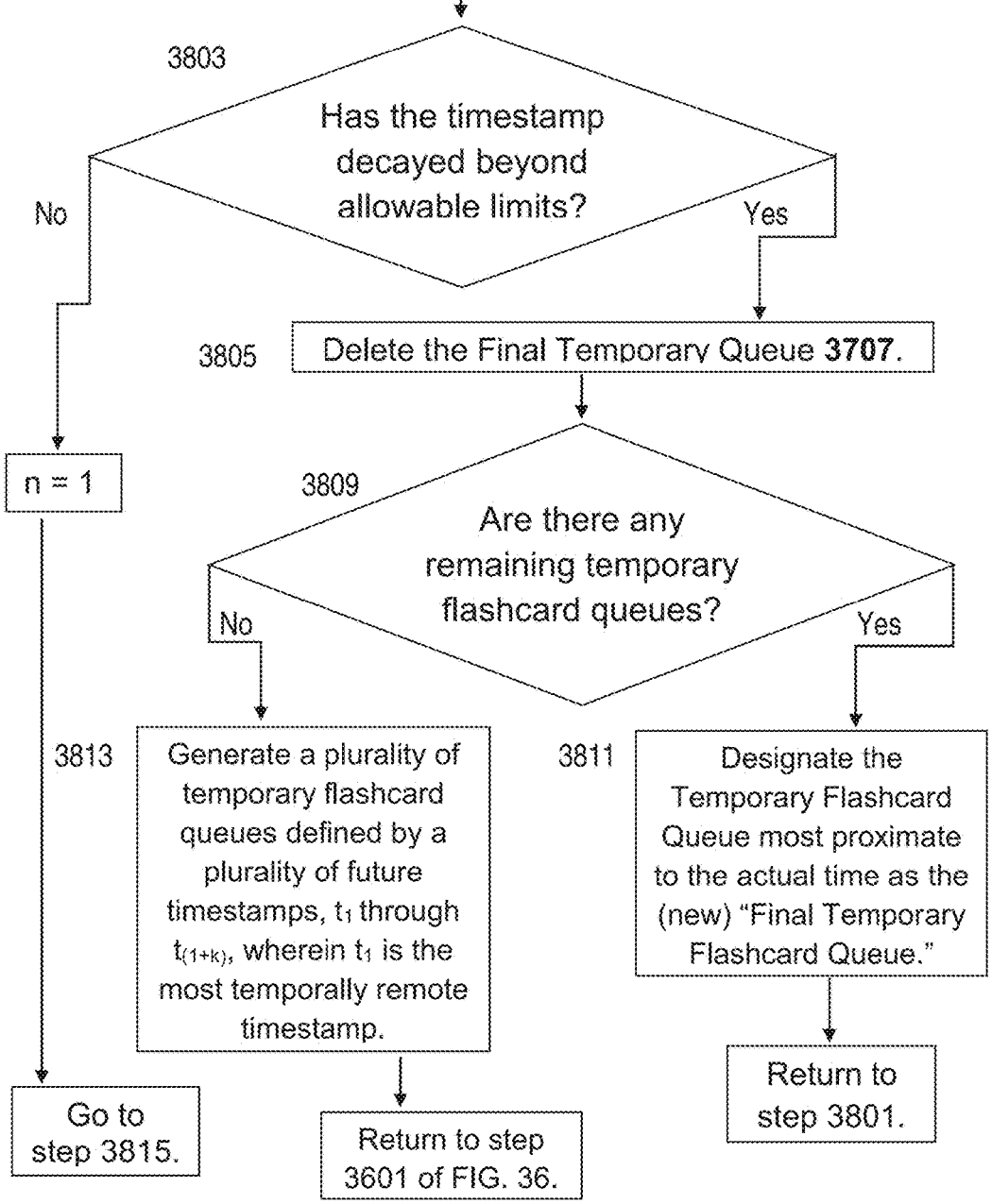
FIG. 38 depicts a method for managing future temporary flashcard queues, and the sequencing of flashcards listed therein.
Figure 38:
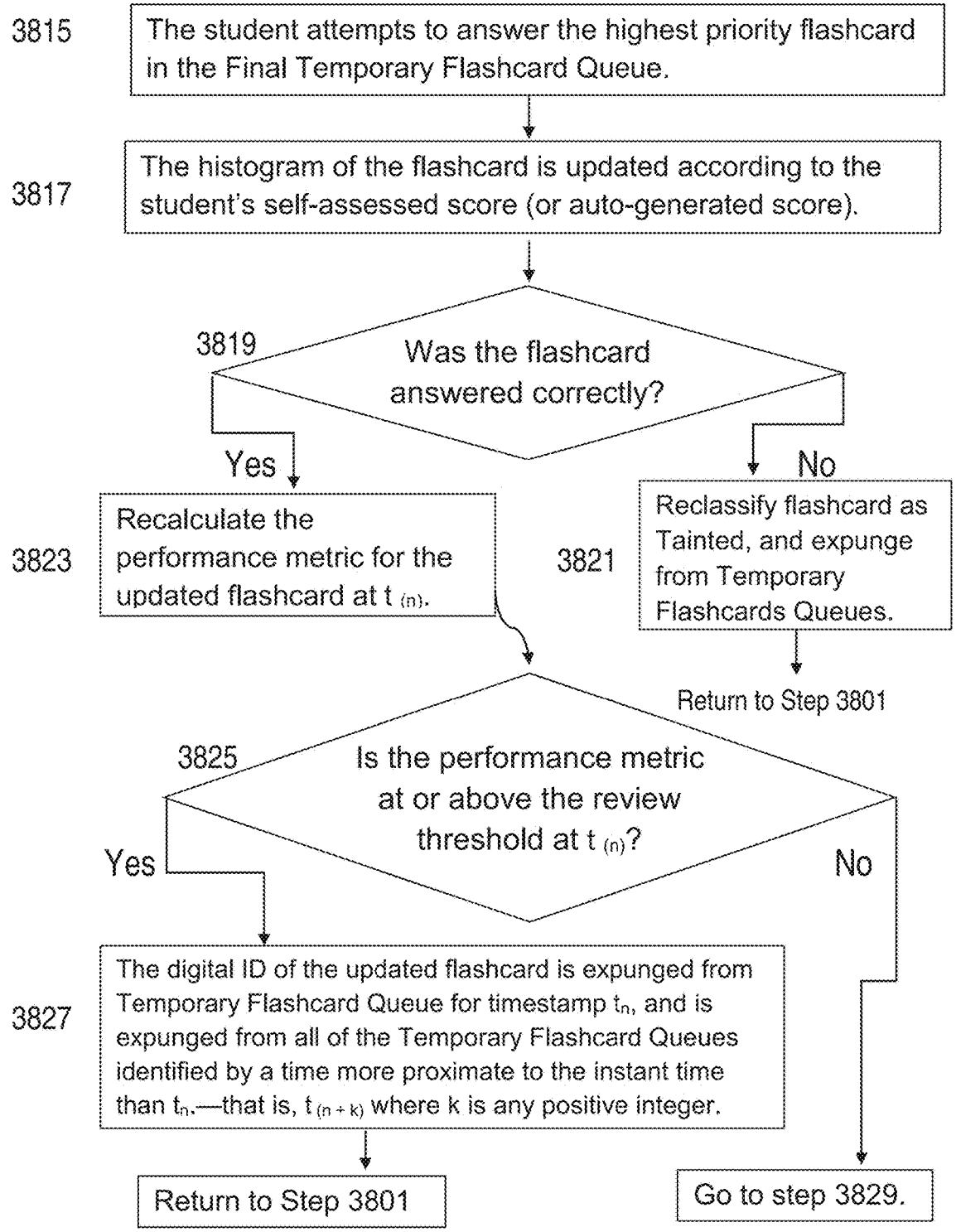
Figure 38:
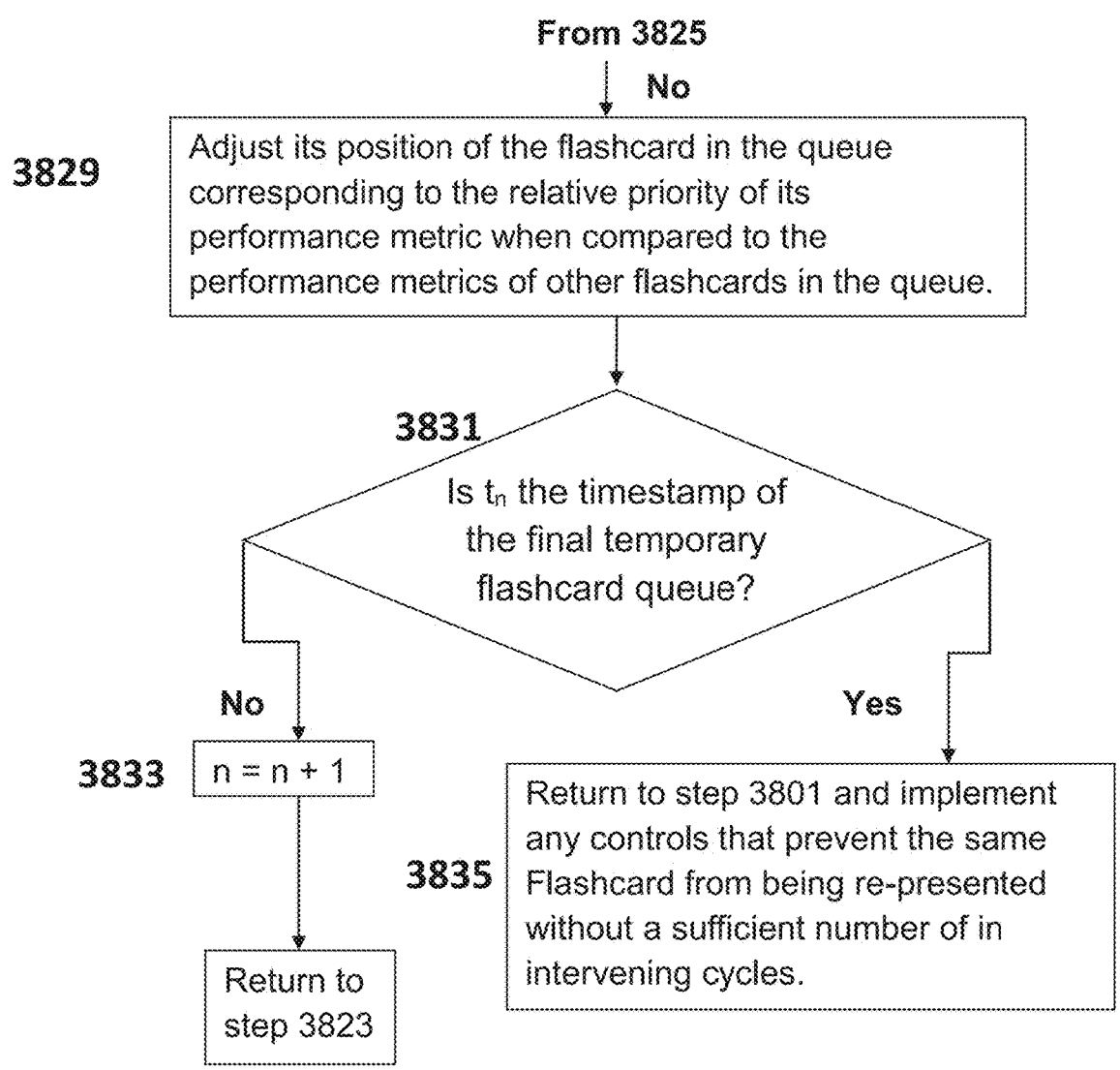

In the example of FIGS. 36, 37, and 38, it is assumed, for simplicity of illustration, that the calculations are being done at 7:00 a.m. while a student is eating breakfast preparing for the day. The process in FIGS. 36 and 37 will identify the flashcards that have gone stale during the night, or will go stale during the day. As discussed above, the "strength of learning" or other performance metrics are calculated by a review of the histogram associated with the flashcard, and the application of various equations and/or decision trees, tables, or other paradigms. The flashcards due for review, and the relative priority of those flashcards, can only be determined after their respective performance metric(s) are calculated. After this, the digital identities of those that are below the review threshold are stored in a temporary queue, and organized according to their relative priority. The highest priority is the flashcard in most urgent need of review (the one with the lowest performance metric).

Because a deck may contain three-thousand or more active flashcards, it can readily be appreciated that it may take a minute, or several minutes, to calculate the performance metric of every flashcard, and then arrange them in terms of their relative priority. In the simplest embodiment, this process is repeated after every flashcard cycle, thereby identifying the flashcard in most urgent need of review at any given time. However, the intensive overhead and CPU bandwidth consumed in this process may make this embodiment impractical.

FIGS. 36, 37 and 38 disclose a method that retains the benefits of recalculating the performance metrics of every flashcards after every cycle, and reselecting the flashcard in most urgent need of review after every cycle, while eliminating the bandwidth consumption necessary to achieve this. For purposes of FIG. 36, it will be assumed that the student will be done studying by 11:00 p.m. or earlier every night, and prepare for bed, and rises at about 7:00 a.m.

Referring to FIG. 1, FIG. 36 and FIG. 37, in step 3601, the student 113 (or the Application 120) selects a most temporally remote time of the forthcoming day, after which time, the student does not expect to study any further. Assuming that the student will curtail studying by 11:00 p.m. (2300 hrs.), this time is selected and designated as $t_1$.

In step 3603, the student 113 (or the Application 120) selects a time as the proximate temporal limit for the exercise. In an embodiment, the most proximate timestamp is the next hour that is at least one hour away. In the present example, the student arose at 7:00 a.m. and began the process of FIG. 36 at 7:10 a.m. The next hour is 8:00 a.m., but this is not a full hour away. Therefore, 9:00 a.m. is selected as the most proximal temporal limit, designated as $t_{final}$.

In step 3605, the Application 120 generates a First Temporary Flashcard Queue 3703, including a first timestamp field 3709.

In step 3607, the Application writes the predetermined timestamp, $t_1$, into the timestamp field 3709. In the present example, we have selected 11:00 p.m. (2300 hrs.) for $t_1$.

In step 3609, the Application 120 calculates the performance metrics for the entire deck of active flashcards according to the timestamp $t_1$, which was 11:00 p.m.

In step 3611, the application 120 identifies those active flashcards that will be "stale" by time $t_1$ (i.e., they will fall below the threshold of review, which was, by example, 90% probability of a correct answer), and stores the identities of those flashcards in the First Temporary Flashcard Queue 3703. According to the example, these are any flashcards whose "strength of learning" falls below 90%. In the example of FIG. 37, the here are one hundred thirty five flashcards and/or principles in the First Temporary Flashcard Queue 3703 that are projected go "stale" by 11:00 that evening. Assume, for example, that, of the 5,733 flashcards in the flashcard registry 3701, as shown in FIG. 37, 3,215 of these are "active" flashcards (currently under review). By performing the "strength of learning" calculation for all of these flashcards at time $t_1$, the application has identified every flashcard that went stale through the night, or that will go stale during the day prior to 11:00 p.m. At no time in the day will the application 120 need to re-calculate the performance metrics for more than 135 flashcards identified in the First Temporary Flashcard Queue. And through an iterative process, this number is progressively reduced.

In step 3613, n=1.

In step 3615, n=n+1.

In step 3617, the Application 120 generates an $n^{th}$ Temporary Flashcard Queue, including a timestamp field for timestamp $t_n$. In the first iteration, wherein n=2, the means that the Second Temporary Flashcard Queue 3705 is generated including the timestamp field 3711 for timestamp $t_2$, as depicted in FIG. 37. As "n" iteratively increases, the process will generate a sequence of temporary flashcard queues, moving back in time one hour per iteration, until the Final Temporary Flashcard Queue 3707 is generated and filled.

In step 3619, the Application 120 subtracts one hour from the timestamp in the prior timestamp field, and writes it as timestamp, $t_n$ in the $n^{th}$ timestamp field.

This can be understood by concrete example in the event 3704 of FIG. 37. One hour is subtracted from timestamp $t_1$ (11:00 p.m.), generating the value 10:00 p.m., which is written into the second timestamp field 3711 as timestamp $t_2$.

In step 3621, the Application 120 calculates the performance metrics for the flashcards identified in the previous Temporary Flashcard Queue using timestamp $t_n$ (of the current temporary queue), and identifies which of these flashcards will be stale by time $t_n$.

For example, in the event 3704 of FIG. 37, the performance metrics of the one-hundred thirty five flashcards in the First Temporary Flashcard Queue 3703 (the previous temporary flashcard queue) are recalculated using timestamp $t_2$, (field 3711), which is 10:00 p.m.

In step 3623, the Application 120 stores the identifies those flashcards identified as falling beneath the review threshold in step 3621, and writes their identities into the $n^{th}$ temporary queue.

This can be illustrated by the example in FIG. 37, wherein, when the performance metrics of Flashcards F-001 through F-0135 are recalculated using 10:00 p.m., ninety-eight of them are "stale" or "beneath the review threshold of 90%. Their identities are written into the Second Temporary Flashcard Queue 3705.

In step 3625, if $t=t_n=t_{final}$, the operation is terminated. That is to say, if $t_n=t_{final}$, the process has been iteratively repeated until the Final Temporary Flashcard Queue 3707 has been filled.

In step 3625, if $t_n$ is not equal to $t_{final}$, (which is equivalent to saying that the timestamp in the field for $t_n$ is not the same as the timestamp for t) return to step 3615.

The process of FIG. 36 is thereby repeated iteratively, working backward from some future time in the distant future (e.g., 10:00 p.m., seventeen hours in the future) to a time in the near future (e.g. 9:00 a.m., one hour in the future). Each step reduces the number of flashcards for which performance metrics must be calculated. By reducing the number of flashcards for which performance metrics must be conducted, the process of FIG. 36 is able to significantly reduce the calculation time needed in selecting the "next" flashcard as the student reviews the flashcards. The illustration of working backwards by one hour at a time is also for example. Fewer increments, or more increments, are envisioned. Additionally, increments of different lengths are envisioned. For example, in the time most proximate to the instant (real) time, multiple temporary flashcard queues may be generated, each queue representing, for example, five minutes rather than one hour.

FIG. 37, referenced above, depicts a flashcard registry 3701 containing 3,215 flashcards (or digital identifiers of flashcards). Event 3702 illustrates the recordation of select flashcards from the registry to the First Temporary Flashcard Queue 3703. Specifically, one hundred thirty five flashcards were calculated to be degraded below the permissible threshold by 11:00 p.m. that evening. These have been stored in the First Temporary Flashcard Queue 3703, along with the timestamp in field 3709 of the queue.

Event 3704 shows those flashcards from the First Temporary Flashcard Queue which were calculated to grow stale or degraded (below the permissible threshold) by 10:00 p.m., stored in the Second Temporary Flashcard Queue 3705, along with the timestamp in field 3711.

Event 3706 represents the iterative process repeating the foregoing events 3702, 3704, which were also described in FIG. 36. The Final Temporary Flashcard Queue 3707 is identified by the time stamp 3713, which, when compared to the other time stamps 3709, 3711, is nearest the instant time (i.e., the time the calculations and storing of flashcard identities in the Temporary Flashcard Queues.) Timestamp 3713 is hypothetically set for 9:00 a.m. This would allow the student to review flashcards on the school bus, or in homeroom, prior to 9:00 a.m., while identifying the smallest pool of flashcards possible for this timeframe, thereby limiting that processing time necessary to calculate the performance metrics of the flashcards under consideration, minimizing the update time consumed in calculating the performance metrics of the active flashcards.

Cycling Through Flashcards in the Most Temporally Proximal Queue

FIG. 38 depicts a process which can be used in conjunction with the embodiments of FIGS. 36 and 37 to further limit the number of flashcards being evaluated for the "next" flashcard. This process thereby further reduces overhead and CPU bandwidth consumption, allowing more complex equations, if necessary, to calculate the "strength of learning" or other performance metrics of active flashcards. Because the "Final Temporary Flashcard Queue" is deleted as soon as the timestamp of the queue transitions from a future time to a past time, a student will always be answering questions from the "Final Temporary Flashcard Queue. FIG. 38 presumes that the student 113 is studying the flashcards of the Final Temporary Flashcard Queue 3707 as discussed in FIGS. 36 and 37, and that there are initially forty five flashcards in the Final Flashcard Queue 3707.

Referring to both FIGS. 37 and 38, in step 3801, when flashcards presented to the student 113 (FIG. 1) are selected from among a plurality of Temporary Flashcard Queues 3701, 3703, 3705, 3703, the flashcards will normally be drawn from the Final Temporary Flashcard Queue 3707. This is because the time stamp $t_{final}$ 3713 in the Final Temporary Flashcard Queue 3707 is, by definition, the queue most temporally proximate to the actual time. Additional flashcards in the other temporary flashcard queues may go stale at some future time, but they are not stale yet, nor as near to being stale yet. The flashcards in the Final Temporary Flashcard Queue are therefore in most urgent need of review. In the process described in FIG. 38, the application 120 operates on flashcards whose performance metric was calculated using a time-stamp as much as an hour in the future. Ideally, the performance metrics should be real time. An architecture comprising sequential Temporary Flashcard Queues is conceived to reduce real-time calculations. However, depending on the consumption of CPU bandwidth, the priority or "order" of flashcards in the Final Temporary Flashcard Queue 3707 may be updated regularly (even, if possible, an update following each flashcard cycle), so that it the order of priority is more accurate.

The first steps of the process of FIG. 38 are to ensure that the Final Temporary Flashcard Queue does not go from a "future" time to a recent past, to a distant past. Old priorities must eventually be purged, and replaced by new priorities.

In step 3801, the application 120 will compare the time stamp $t_{final}$ 3713 in the Final Temporary Flashcard Queue 3707 to the actual time (real time, instant time) to ensure that the queue from which flashcards are being drawn is not obsolete through time decay. As a general rule, if the timestamp $t_{final}$ 3713 is in the past by more than a predetermined amount (such as one second, one minute, five minutes, or one hour), the queue is obsolete.

If, in step 3803, the time stamp in field 3713 has decayed beyond the allowable limits, then, In step 3805, the application deletes the Final Temporary Queue 3707 of FIG. 37, and designates the Temporary Flashcard Queue most proximate to the actual time as the (new) "Final Temporary Flashcard Queue." In the alternative, the application can simply copy the data in the most temporally proximate future Temporary Flashcard Queue (the next one in time), and paste that data, including the timestamp, into file 3707, overwriting the old data in the Final Temporary Flashcard Queue. These steps ensure that we are working within a predetermined time frame in the automatic cycling of the flashcard deck.

If, in step 3803, the timestamp has decayed beyond allowable limits, then, in step 3805, the final temporary queue 3707 of FIG. 37 is deleted, and the process advances to step 3809.

In step 3809, if there are any remaining temporary flashcard queues, then, in step 3811, the Application 120 designates the Temporary Flashcard Queue having a timestamp that is most proximate to the actual time as the (new) "Final Temporary Flashcard Queue," and the process returns to step 3801.

If, in step 3809, there are no remaining temporary flashcard queues, then, in step 3813, the Application 120 generates a plurality of temporary flashcard queues defined by a plurality of future timestamps $t_1$ through $t_{(1+k)}$, wherein k is a positive integer, and $t_1$ is the most temporally remote timestamp among the newly generated temporary flashcard queues. This step thereby generates a sequence of new flashcard queues defined by timestamps, $t_1$, $t_2$, $t_3$, etc. wherein $t_1$ is the most temporally remote time, and wherein the timestamps grow progressively more proximate to the instant (real) time as the subscript increases. This architecture is illustrated in FIG. 37. Following the generation of new temporary flashcard queues, the process returns to step 3601 of FIG. 36 to fill the temporary flashcard queues with flashcards that will be growing stale in some future timeframe. A future timeframe of twenty four hours is used as an example of such a timeframe for the plurality of new temporary flashcard queues.

Referring now to step 3815, the student 113 attempts to answer the highest priority flashcard. The flashcards are preferably arranged in the queue according to their strength of learning metric, starting with the weakest "on top," and increasing in strength of learning as moving downward in the queue. It is functionally similar to a FIFO stack. The weakest flashcard is therefore always the "first" flashcard in the queue.

In step 3811, the histogram of the flashcard, (and the histogram(s) of any principles inherent in the flashcard), are updated according to the answer by the student. The "updated flashcard" hereinafter refers to the flashcard most recently updated in step 3811).

In step 3813, if the answer was incorrect, then in step 3815, the flashcard may be reclassified as "tainted" and expunged from all of the Temporary Flashcards Queues. The process then returns to step 3801.

If, in Returning to step 3803, if the time stamp in field 3713 (the final temporary queue) has not decayed beyond the allowable limits, then, in step 3807, n is set to equal 1. This will be appreciated in that, in FIG. 37, the most temporally future temporary flashcard queue was related to timestamp $t_1$, with timestamp numbers incrementally increasing as time moves closer to the "instant" moment. This architecture will be retained to illustrate the iterations and incrementalism of the process of FIG. 38. After n is set to 1, advance to step 3815.

In step 3815, the student attempts to answer the highest priority flashcard in the Final Temporary Flashcard Queue, depicted in FIG. 37 as queue 3707.

In step 3817, the histogram of the flashcard is updated according to the student's self-assessed score (or an auto-generated score).

In step 3819, if the flashcard was not answered correctly, then, in step 3821, the digital ID of the updated flashcard is expunged from Temporary Flashcard Queue for timestamp $t_n$, and from all of the Temporary Flashcard Queues identified by a timestamp that is more proximate to the instant time than $t_n$, (that is, any Temporary Flashcard Queues having a timestamp identified by $t_{(n+k)}$, where k is any positive integer). For example, if $t_n$ is 5:00 p.m., and the program determines that the flashcard need not be reviewed anytime before 5:00 p.m., it necessarily follows that it need not be reviewed earlier than 4:00 p.m., 3:00 p.m., etc. It is therefore expunged from the queues identified by these earlier timestamps. Following step 3821 the process returns to step 3801. (As discussed below, a "tainted" flashcard operates according to a different paradigm than those processes disclose in FIGS. 34, 36, 37 and 38. The reader will appreciate that, if alternative classifications are not utilized, steps 3819 and 3821 are not necessary, and the process may advance from step 3817 to step 3823.)

If, in step 3819, the flashcard was answered correctly, then, in step 3823, the Application 120 of FIG. 1 recalculates the performance metric for the updated flashcard at $t_n$ (the temporary flashcard queue identified by the most temporally remote future timestamp, depicted as queue 3703 in FIG. 37. The process advanced to step 3825.

In step 3825, if the performance metric for the updated flashcard is at or above the review threshold at time $t_n$, it will not need review prior to time $t_n$. It necessarily follows, therefore, that it will be "above the threshold" in any flashcard queues identified by a timestamp earlier than that time. Therefore, in step 3827, the digital ID of the flashcard is expunged from the temporary flashcard queue identified by timestamp $t_n$, and all queues more proximate in time to the instant time, thereby reducing the need to recalculate the strength of learning of this flashcard for the rest of the day. As illustrated in FIG. 37, when a temporary flashcard queue is identified by a timestamps $t_{(n+k)}$, where k=0 (zero), or any whole number greater than zero. That is to say, if the flashcard will not be degraded by 11:00 p.m., it necessarily will not be degraded at any time prior to that either. So the flashcard is removed from all queues corresponding to timestamp $t_n$ or earlier. Following step 3827, the process returns to step 3801.

If, in step 3825, the performance metric is not at or above the review threshold at time $t_n$, then, in step 3829, the position of the flashcard is adjusted within the queue according to the relative priority of its performance metric when compared to the performance metrics of other flashcards in the queue. (The term "position" is understood in term such as a FIFO stack, with the weakest flashcard is given the highest priority, and therefore placed at the top of the stack.) The process advances to step 3831.

If the flashcard has fallen below the threshold triggering review at the timestamp $t_n$, it is possible that the flashcard will also fall below the review threshold in "earlier" flashcard review queues (queues defined by a timestamp more temporally proximate to the instant (real) time than $t_n$. To determine this, if, in step 3831, $t_n$ is not the time stamp in the Final Temporary Flashcard Queue 3707, then, the process advances to step 3833, incrementing the value of "n" by the formula: n=n+1, after which the process returns to step 3823 to determine if the performance metric for the flashcard is above or below the review threshold for the updated timestamp.

If, in step 3831, the flashcard review queue identified by timestamp $t_n$ is the timestamp of the final review queue (the queue most proximate in time to the present time), then there is no need to calculate the performance metric for the flashcard at an earlier time and adjust the relative priorities in other flashcard review queues. In this circumstance, according to step 3835, the process simply returns to step 3801.

Because it is possible that the flashcard will still be the "highest priority" in the Final Temporary Flashcard Queue 3707, triggering consecutive reviews inimical to the process of learning, various paradigms or controls (not shown) are preferably implemented during step 3833 to prevent the flashcard from being re-presented again in the very next cycle (or otherwise re-presented to the user before a sufficient number of intervening flashcards have been considered, or sufficient time has elapsed.)

By the process disclosed in FIG. 36, the Application 120 can limit a complete recalculation of the performance metrics for all of the flashcards to once a day, or even less, and thereby limit the number of calculations of performance metrics at timestamps more proximate to the instant time by limiting the calculations to those flashcards in the most temporally proximate subsequent temporary flashcard queue.

By the process disclosed in FIG. 38, the Application can limit the number of recalculations of performance metrics that must be performed every cycle by simply updating the performance metrics of the most recently answered flashcard for as many temporary flashcard queues as necessary. In many circumstances, this will only be the most temporally remote flashcard queue, after which, the flashcard will either be expunged from the temporary queues, or reclassified as "tainted." In a preferred embodiment, the same flashcard will not be presented two consecutive times. Therefore, the performance metrics can be calculated for the most recently reviewed flashcard concurrent with the user's 113 review of the "next" flashcard. Because of the time-multiplexing capacity of microprocessors (which appear, to the human user, to be performing these tasks concurrently), the foregoing processes can virtually eliminate any perception of any delay imposed on the user in the recalculation of the performance metrics.

Clauses for Establishing Temporary Queues at Multiple Future Times

Clause 1: A method for reducing the overhead time spent in prioritizing flashcards awaiting review, the method comprising:

generating a first temporary flashcard queue corresponding to a first future time;

identifying, from a flashcard registry, any flashcards that will have degraded below a preset threshold by the first future time; and storing, within a first temporary queue, the identities of those flashcards that will have degraded by the first future time.

Clause 2: The method of clause 1, further comprising:

generating a second temporary flashcard queue corresponding to a second future time;

identifying, from the first temporary flashcard queue, any flashcards that will have degraded below the preset threshold by the second future time; and storing, within the second temporary queue, the identities of those flashcards that will have degraded by said second future time.

Clause 3: The method of clause 2, wherein the second future time is nearer to a present time than the first future time.

Clause 4: A method for selecting a digital flashcard for review on a digital computing device, comprising:

a) generating a first time stamp of a first future time;

b) generating a second times stamp of a second future time, wherein the first future time is further in the future than the second future time;

c) calculating, on a digital computing device, a first plurality of probabilities of a first student accurately answering a corresponding first plurality of digital flashcards, each of the first plurality of probabilities being derived, from one or more mathematical operations that incorporate the first future time;

d) identifying, from among the first plurality of probabilities, a first subset consisting of those probabilities that fall beneath a predetermined threshold, and further identifying a first subset of flashcards corresponding to the first subset of probabilities;

e) calculating, on a digital computing device, a second plurality of probabilities of a first student accurately answering a respective flashcard from among the first subset of flashcards, each of the second plurality of probabilities being derived, from one or more mathematical operations that incorporate the second future time that is closer to a present time than the first future time.

Additional Clauses Relating the Order of Presentation of Flashcards using Future Time Stamps:

Clause 1: a method for re-organizing a relative priority of a plurality of flashcards identified in a flashcard review queue, including first and second flashcards, each of the flashcards having a performance metric for determining its relative priority; the method comprising:

reviewing a first flashcard by a user;

updating a histogram of the first flashcard, said updating being based, at least in part, upon a quality of an answer advanced during the step of reviewing;

recalculating the performance metric of the first flashcard, a performance metric being derived, at least in part, from data in the histogram of the first flashcard; and, comparing the performance metric of the first flashcard to the performance metric of the second flashcard.

Clause 2: a method of using at least one temporary flashcard queue to reduce overhead time needed to identify a next flashcard for presentation; the method comprising:

reviewing a first flashcard; and recalculating a performance metric for the first flashcard according to a first future time corresponding to a first flashcard queue, wherein a review of a flashcard is indicated when the performance metric falls below a review threshold.

Clause 3: The method according to clause 2, further comprising the steps of determining that the performance metric of the first flashcard is not below a review threshold according to the first future time; and deleting a digital identifier of the first flashcard from a first flashcard queue.

Clause 4: The method of clause 3, further comprising the step of deleting the digital identifier of the first flashcard from at a second flashcard queue, the second flashcard queue corresponding to a second future time, wherein the second future time is closer to the present time than the first future time.

Clause 5: The method according to clause 4, wherein the deletion of the first flashcard identifier from the second flashcard queue is conducted without calculating a performance metric of the first flashcard, calculated according to a second future time.

Clause 6: The method according to clause 4, wherein the deletion of the first flashcard identifier from the second flashcard queue is subsequent to a calculation of a performance metric of the second flashcards according to a second future time.

Determining the Optimal Rate of Advancement

The optimal rate of advancement should consider two factors: i) which is the fastest path to a target accuracy (e.g. 99%); and, ii) what has the lowest "drop out" rate?

The Fastest Path to Target Proficiency

Consider a thousand students divided into four groups for a course such as Algebra I. The "threshold accuracy" for the first group of students is 80%. That is, if their probability of success for all "active" flashcards is greater than 80%, the application advances to a new flashcard. They complete the course in ten weeks. The "threshold accuracy" for the second group of students is 90% accuracy rate. They complete the course in twelve weeks. The threshold accuracy for the third group of students is 95% accuracy. They complete the course in sixteen weeks. The threshold accuracy for the fourth group of students is 99% accuracy. They require twenty weeks to complete the course.

It is impossible to compare the effectiveness of the teaching at this rate. To compare the effectiveness of the different rates of advancement, two other questions must be asked. First, how long—in total—does each group require to achieve a common level of accuracy (such as 99%) . . . the accuracy required to prepare for testing. After twenty weeks, the fourth group of students is ready for testing. But the other three groups are unknown.

Assume that, after they reach the "end" of Algebra I or French II, the student begin reviewing, striving for a 99% accuracy. Group one reaches 99% accuracy in a total of seventeen weeks. Group two reaches 99% accuracy in a total of fifteen weeks. Group three reaches 99% accuracy in a total of nineteen weeks. By requiring students to meet a fixed performance metric (such as 99%) as a "final exam," the different rates of advancement can be compared, and the optimal rate of advancement can be ascertained. In the foregoing setting, the students who truly advanced the fastest to the 99% accuracy level were those who learned the course at a 90% accuracy, and then studied for a final proficiency exam. Referring briefly to FIG. 1, the transaction administrator 127 advantageously keeps track of these comparative rates of advancement from data in the central database 128.

A second factor must be considered. For example, perhaps a student from the fourth group (who learns at 99% probability of accuracy before advancing through the deck) will have a more durable memory than the student who learned at 90% accuracy and then "crammed" for the final exam. Long term statistics of student retention may therefore be considered in selecting the optimal "accuracy rate" for advancing through a deck of flashcards.

A third factor to consider is retention rate, the reciprocal of which is drop-out rate. A student may be shown, in theory, to advance most optimally when new flash cards are presented when the student displays an 80% accuracy on active flashcards. However, statistics may suggest that such students are more frequently unsatisfied with the learning experience, and more likely to drop-out, or at least to curtail their study time to a point of being counter-productive. The "optimal" advancement rate must statistically minimize the drop-out rate and maximize the hours per day spent studying. Statistics on any such variations in learning or course presentation must be analyzed for short term, and long term.

Demographics, Statistical Analysis, and Artificial Intelligence

It is fully possible that students from one demographic profile will reach the 99% metric fastest through a course geared at 80% proficiency before advancement to new flashcards, and another demographic profile will reach the 99% metric fastest if they advance only when they have achieved a 90% proficiency. Consider two students of comparable intelligence. The first speaks only one language, and may be uncomfortable advancing in language classes without a high degree of accuracy (e.g. 95%). A second student may be from a multilingual family that has moved during his youth, leaving him exposed to three or four languages by age ten. This student has been "in over his head" in languages all of his life, and is comfortable advancing to new material when he is only at a 80% proficiency of active flashcards in a new language. And, because children age seven through ten are accustomed to listening to adults and only understanding a percent of adult vocabulary and grammar, it is conceivable that the average young person of this age group will be more comfortable advancing at a lower proficiency rate (e.g. 70%), whereas a forty year old foreign language student, or one who has not grown up in a multi-lingual family will need a higher proficiency rate (e.g. 93%) to maintain his participation in the program.

In view of these possibilities, it is optimal that each student provide extensive demographic data which will become part of a massive statistical database to optimize the Application 120 as it is applied to each different student. In an embodiment, the demographic data is stored on a data base that is not accessible to hackers, thereby securing this vast array of demographic data. Student performance can be updated daily, and transferred to the proprietary database to analyze student performance as a function of various demographic variables.

The most optimal application control parameters are selected, and then gradually refined by the AI module, which gradually makes smaller and smaller incremental changes in the application control parameters as it generates the most optimal control parameters for a particular flashcard and a particular user.

Demographics and Control Parameters

Optimal control parameters generated through statistical analysis for a broad base of users are then used for subsequent individual users. However, demographic statistical data may dictate that the control parameters used for one demographic group are distinct from control parameters for a different demographic group. For example, a native Italian speaker may find learning Spanish rather easy, both being Latin languages. A native Chinese speaker may find Spanish rather difficult. Accordingly, after statistical data is collected, the control parameters used to teach a course on Spanish may be different for a native Italian than for a native Chinese speaker. Statistical data may similarly dictate that control parameters used in teaching first semester calculus are different for an engineering major than for a biology major.

History of Flashcards Already Presented

Equation 11, discussed earlier, considered not only the intervening time, but the number of intervening flashcards since a specific flashcard was last reviewed.

$$P_{successful\ answer} = 0.7*(\text{Strength of Knowledge} \div \text{Time}) + 0.3*(\text{Strength of}$$

Knowledge÷Number of Intervening Flashcards
since the last attempted answer)     Equation 11

The number of intervening flashcards can efficiently be calculated by maintaining a data table with all active flashcards and principles listed thereon in a "FIFO" type stack. The data table includes a digital field that increments every cycle (every time another flashcard is displayed for that particular course). A thirty-two bit field will record over four billion cycles before overflowing. Independent cycles may also be incremented on each histogram so that it can be readily calculated how many cycles have elapsed since a last time a particular principle was reviewed.

Alternatively, rather than recording increments on individual histograms, the data table may include separate entries for each active flashcard and each active principle, and records the cycle number, and the amount of time, since a particular flashcard (or principle) was last reviewed. This can be simplified by applying a time-stamp and a cycle-number to each answer of a flashcard or principle. This value can be incorporated into equations such as Equation 11 as needed.

Categories of Proficiency

Different Categories of Flashcards Trigger Different Review Criteria.

If a paradigm, flow chart, equation, performance metric, or other factor governing frequency of flashcard presentation, ceases to be effective in certain circumstances, an alternative paradigm is advantageously employed. The purpose of categorizing flashcards into different groups is necessary only if the metrics, equations, logical paradigms and flow charts are not effectively applied in all circumstances.

A "pending" flashcard (or pending principle) is one for which review has not yet commenced.

An "active" flashcard (or active principle) is a flashcard or principle which the student has already reviewed. This may be broken down into multiple sub-categories of proficiency.

A stable flashcard or principle is active, and not slated for review because its probability of an accurate answer is above a certain predetermined threshold. The paradigm for review of a stable flashcard is the standard against which other review paradigms deviate.

An introductory flashcard or principle is one for which review has commenced, but for which he or she has not yet attained the minimum proficiency necessary for "stable" status. For example, it is possible that a student might learn a new flashcard, answer it correctly several times, and secure an artificially high "strength of learning" score, thereby curtailing frequent review too quickly. To ensure that there is sufficient review to achieve a measure of long term mastery of a new flashcard, control metrics, flow charts, mathematical expressions, or logical constraints ("application control parameters") governing review of an "introductory" flashcard may need to be distinct from the control parameters governing review of a "stable" flashcard. An introductory flashcard may have to be reviewed a minimum number of times over a minimum number of days or weeks to establish some permanency of learning, before operating under the review criteria for active flashcards generally.

A "new" flashcard or principle is a pending flashcard being introduced for the first time. Once a new card is reviewed once, it becomes a "introductory" flashcard. For a foreign language or an algebraic principle, it may be useful to review an introductory flashcard according to a different paradigm than stable flashcards. For example, after introducing a new flashcard in a foreign language or mathematical study, the card may be repeated every second card for three cycles, every third card for three cycles, every fifth card for three cycles, every seventh card for three cycles, and every tenth card for three cycles. This paradigm is only hypothesized, and may be refined by statistical analysis and/or an AI program. Alternatively, it is possible that, at least for certain subjects or flashcards, statistics may enable fairly reliable prediction of accuracy of an answer after only one or two reviews of a card. In such a circumstance, a flashcard need not be designated "introductory" for any extensive period of review, but can be designated as "stable," fairly quickly after review has begun. Like other "stable" flashcards, it will be reviewed whenever it falls beneath some minimum threshold probability of accuracy (e.g. 90%). It is recalled, however, that the "strength of learning" (or equivalent metrics) degrades over time, and the more recently the review of a flashcard had begun, the more quickly it will degrade, thereby more quickly falling beneath the minimum threshold than a card that has been under review for three months.

Stale Flashcards or Principles:

The likelihood that a user will correctly answer a flashcard will degrade over time. Therefore, a "stable" flashcard wherein the probability of a correct answer falls above some minimum threshold (e.g. 90% probability of a correct answer), will, over time, eventually degrade and fall below that threshold, altering the designation of the flashcard or principle to "stale." Because degradation is a continuing effect of time, performance metrics are advantageously recalculated after every cycle to identify which (if any) flashcards or principles, if any, flashcards have fallen below the minimum performance threshold since the last answer. When a flashcard becomes "stale," it is scheduled for review.

A "tainted" flashcard or principle is a stale flashcard, which, on subsequent review, was answered incorrectly by a student before it was restored to "stable" status. A tainted flashcard is restored to "stable status" when it passes certain criteria. However, the fact that a student got it wrong may be in indicator that the "strength of learning" was overrated, and more review is necessary. Therefore, it may be useful to schedule review of a tainted flashcard according to different control metrics and/or logic flow charts from that of a "stale" flashcard. In a simple embodiment, if the student correctly answers the tainted flashcard, it is restored to active status, and if a student incorrectly answers a stale flashcard, it is flagged as "tainted" and reviewed again with in a predetermined number of cycles. This process is repeated until it is answered correctly, and returned to "active" status (e.g., through a digital status flag). In more complex circumstances, alternative paradigms, logic charts, equations or tables may be used to organize the review of such a flashcard. Degrees of staleness are also envisioned. If a certain flashcard repeatedly falls from stable, into the stale category, the AI program of the Application 120 will advantageously modify certain control constants or control parameters to more quickly degrade the flashcard from stable to stale, thereby increasing the frequency of review. In one embodiment, the control parameters may be adjusted on an individual scale. In an alternative embodiment, the transaction administrator 127 monitors the central database 128, and identifies specific flashcards or principles that have a higher tendency to slip into the "tainted" mode. The parameters governing frequency of review of that flashcard or principle are then adjusted on a universal level. Mixed embodiments are envisioned, wherein control parameters for individual flashcards or principles are updated based on database analysis, but wherein the Application 120 of a student's computer further refines the control parameters according to the performance of an individual student. The rate of review is thereby optimized for each flashcard or principle for a particular student.

In an embodiment, review(s) of a tainted flashcard distinguishes from review of an active flashcard in that they are "compressed." That is to say, review(s) of a tainted flashcard are more closely spaced (in terms of intervening time, or intervening flashcards) than the intervening time (or number of intervening cycles) for an active flashcard to degrade and become stale.

In an embodiment of an alternative paradigm of review, a tainted flashcard is reviewed a fixed number of times (e.g., four times) at predetermined compressed intervals. After successfully answering all four reviews, a tainted flashcard is restored to "active" (stable) status. The foregoing hypothetical "four review" process of restoration of a tainted card is hypothetical. In a preferred embodiment, the process of restoration of a tainted card is advantageously honed by statistical analysis and an AI program to be the most mathematically efficient and reliable process for restoring user competence.

In this manner, if the regular paradigm for "stable" flashcards does not accurately predict the probability of accuracy of review in certain circumstances, a flashcard is re-designated (reflagged) among the different categories according to user proficiency. When no flashcard is designated for review, a new card is added, thereby advancing through a course of study.

Different Review Paradigms for Different Categories of Proficiency

The need for different categories of proficiency only exists if different paradigms of review are necessary for the optimal review of different categories. For example, plainly, some trigger must act to select a "new" flashcard from among the pending flashcards for review. It cannot simply be whether a pending flashcard is below a threshold probability of accuracy. Whether or not the basic paradigm of a stable flashcard will work with stale and tainted flashcards can only be determined through trial and observation. If the review paradigm governing stable flashcards are equally efficient in "stale" or "tainted" circumstances, these additional categories are unnecessary.

The proposed foregoing categories of proficiency are hypothetical. More or fewer categories are possible, and criteria other than that described below may be used to define new categories. A paradigm for review of a specific category is crafted to maximize the learning, and to normalize, with greatest efficiency, the re-categorization of a flashcard within the "stable" category.

Prioritization of Categories of Proficiency

As noted earlier, in the basic paradigm for stable flashcards (the "stable" category), when a flashcard falls below a minimum threshold (such as a 90% probability of accuracy) it is slated for review. However, it is possible that, in the space of one cycle, multiple flashcards become stale, or otherwise ripen for review. Eventually, almost every cared will go stale as a function of time. Additionally, if the user answered a "stale" flashcard incorrectly, it becomes a "tainted" flashcard, and may ripen for review in three more cycles. And an "introductory" flashcard may ripen for review every five cycles. All of these flashcards could become ripe for review during the same cycle. If more than one flashcard becomes slated for review during the same review cycle, a paradigm will establish priorities for selecting one flashcard over another. For example, when flashcards or principles from multiple categories ripen in the same cycle, one category may be preferred over another.

Development of Mathematics Flashcards

FIG. 15 depicts an embodiment of an algebraic data table 1500, comprising a partial list of general algebraic principles "AP-001" (element 1501 through "AP-0029" (element 1529) which are foundational to the development of courseware in algebra according to the embodiments described herein.

FIG. 16 depicts a table 1600 with a plurality of digital flashcard numbers (F-0315-F-0337) disposed in an array of digital fields 1607. The flashcard numbers are preferably sequential. A column of "question fields" 1609 comprises a list of integers for prime factoring, the mathematical operation identified by algebraic principle AP-0021 in digital field 1513 of FIG. 15. Each integer corresponds to a respective flashcard number. Column 1611 contains a plurality of digital fields, each field containing an "answer," (the prime factoring) of the corresponding integer in the question column. Column 1613 depicts a corresponding array of digital fields for storing the "strength of learning" value of each of the respective flashcards. These fields are generated during preparation of courseware, but are not filled until operation by a student.

Figure 18:
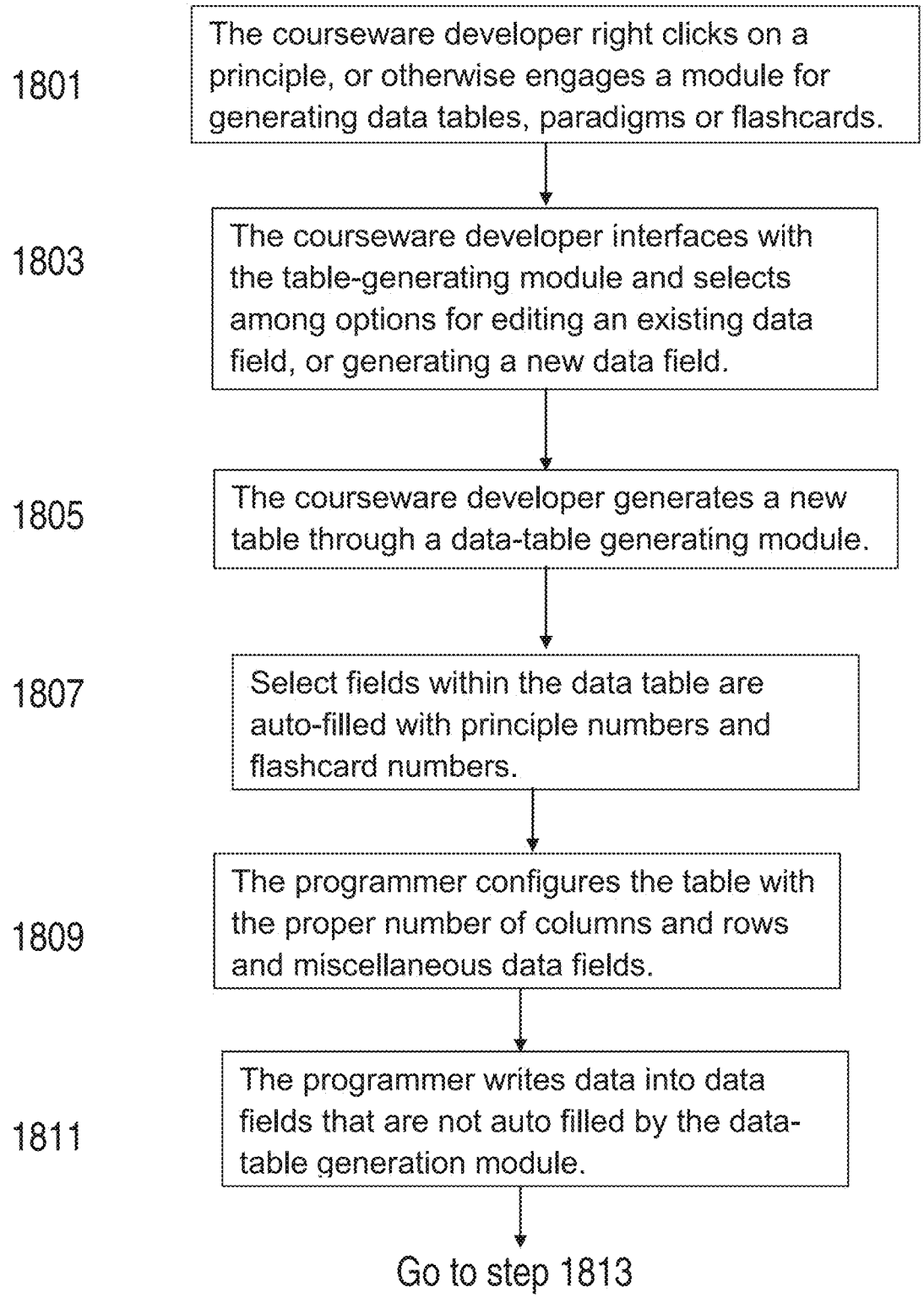
FIG. 18 depicts a method for developing flashcards and data tables in the development of flashcards for use with the system depicted in FIGS. 1-17.
Figure 18:
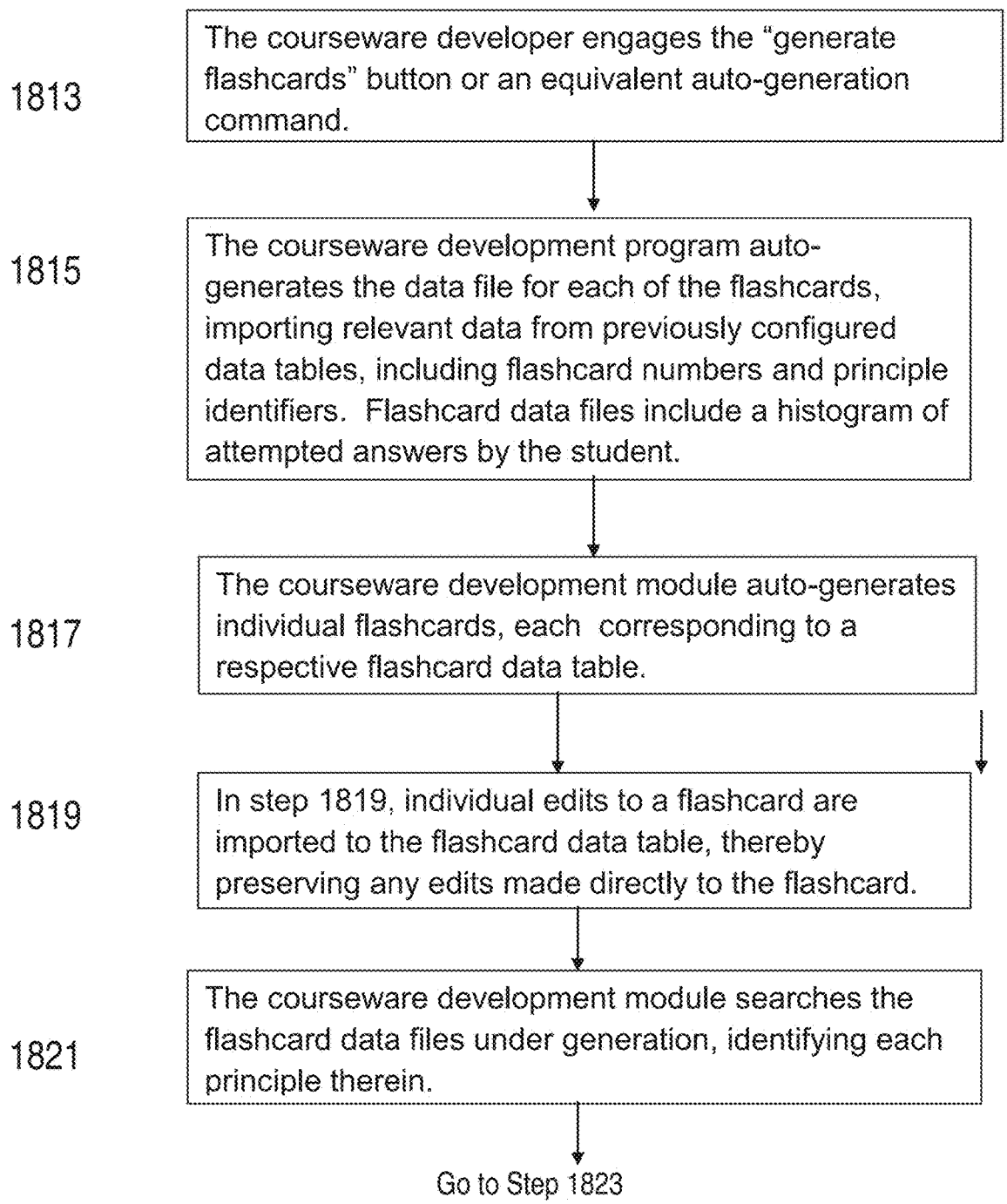
Figure 18:
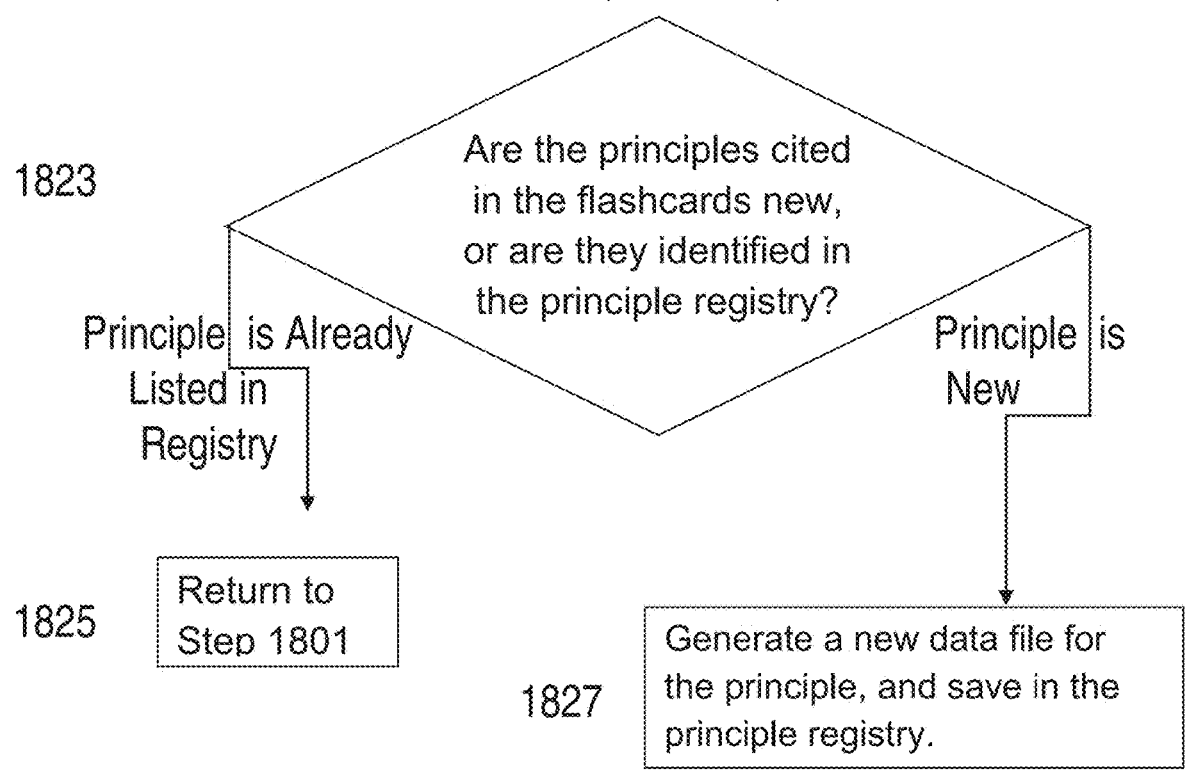

FIG. 18 (below) describes a process by which the table of FIG. 16 can be auto-generated from a specific principle such as AP-0021, element 1513 of FIG. 15.

Referring to both the "table builder interface page" in FIG. 17, and the process of FIG. 18, in Step 1801, the courseware developer right clicks on (or otherwise activates) a principle from FIG. 15. Assuming, for example, that the developer clicks on principle AP-0021, element 1513, activating the table builder module, the interface for which is depicted in the "menu" 1701 of FIG. 17.

Menu 1700 is includes a menu selection to edit or build tables for generating flashcards. Element 1703 allows the courseware developer to an existing table, and comprises a sub-menu 1703-a for identifying and selecting the table to be edited. A menu selection 1705 allows the courseware developer to generate a new table from an existing template (e.g. reproducing an identical table for use with another principle). Menu selection 1709 creates a new table, and offers the sub-menu that the new table will include pre-assigned flashcard numbers 1709-a, pre-assigned principle numbers 1709-b, or no preassigned numbers at all 1709-c. Other options include menu selection 1711, to edit an existing flashcard, and menu selection 1713, to create a new flashcard.

In step 1803, the developer selects one of the options of step 1801. In the instant example, the developer activates field 1709 and drop down menu 1709-a (pre-assigned Flashcard Numbers), electing to create a new table, In step 1805, the auto-generator 1701 of FIG. 17 generates table 1600 of FIG. 16. The reader will appreciate that the developer may need to give additional instructions, such as the number of columns to generate, or which columns hold which consecutive Flashcard numbers or principle identifiers.

Referring now to both FIGS. 16 and 18, in step 1807, certain digital fields are auto-filled. The digital field 1601 of FIG. 16 is auto-filled with the number of the principle on which the courseware developer clicked in FIG. 15, in the present example, AP-0021 from Field 1513 of FIG. 15. Column 1607 is advantageously auto-filled with sequential flashcard numbers, beginning with the next sequentially available flashcard number as assigned in the Flashcard registry of the courseware (not shown). However, in certain embodiments, the courseware developer may have to instruct the courseware development program that the field is dedicated to flashcard numbers. The size of the table 1600 (and therefore, the number of flashcards) can be increased or reduced as the courseware developer prepares the table. During course development, the deletion of flashcard numbers from a chart (such as FIG. 16) removes them from the flashcard registry as well, so that, when the next set of flashcards for a course are developed, the numbering will sequentially follow the last flashcard number in the registry.

A "search" function will advantageously allow the programmer to correct any "dead links" which cross reference to deleted flashcards as the courseware develops, correcting such errant links.

In certain embodiments, the courseware developer will advantageously designate which columns are for flashcard numbers.

In step 1809, the programmer determines the number of rows, limiting the size of table 1600, and otherwise generates and labels any other miscellaneous data fields. Because auto-fill and the generation of columns are inter-related, the order of steps 1807 and 1809 is not fixed, and may be iteratively repeated in any order.

In step 1811, the programmer writes data into digital fields that were not auto-filled by the data-table generating module. Digital field 1603 of FIG. 16 is filled with one or more characters or images that will appear on the "question" page of every flashcard, such as depicted in FIG. 21. Specifically, in the example of FIG. 16, field 1603 includes the question or prompt to "Prime factor the value displayed below." The programmer (used interchangeably herein with the "courseware developer") also fills Field 1605 with one or more characters or images that will appear on the "answer" page of every flashcard, such as depicted in FIG. 22. In the example FIG. 16, field 1605 includes an "equal" sign. The programmer also fills in a sequence of "questions" in column 1609. In the example of FIG. 16, the questions of column 1607 are integers to be prime factored. When the flashcards are generated from this column, each integer will be written as a "question" on a different flashcard.

In the same step 1811, the courseware developer fills in the third column 1611 of FIG. 16 with a sequence of answers which will be displayed on the "answer pages" of the respective flashcards, such as depicted in FIG. 22. In the example of FIG. 16, each of the "answers" in column 1611 is the prime factoring of the corresponding integer of column 1607.

In step 1813, the courseware developer engages the "Generate Flashcards" button 1621.

Referring now to the process of FIG. 18 in conjunction with the data file of FIG. 19, in step 1815, the courseware development program auto-generates a data file 1900 for each of the flashcards that was identified in FIG. 16. The respective flashcards, as depicted in FIGS. 20 and 21 may be generated at this time as well. The flashcards are linked to the respective data tables.

The specific example of FIG. 19 depicts an embodiment of a data file 1900 associated with Flashcard F-0038. In the generation of table 1900, a digital identifier of a flashcard (in this case, "F-0332") is imported from field 1615 of FIG. 16 and stored within field 1901 of the flashcard data table.

Field 1903 includes a digital representation of the principle to which the flashcard is directed, which, in this case, is "AP-0021," Prime factoring, imported from field 1601 of FIG. 16.

Field 1905 includes the "Instructions" that have been imported from field 1603 of FIG. 16, and which will be exported to the "front page" or "question page," FIG. 21 of a flashcard generated from data file 1900.

Field 1907 depicts the "question" or prompt that will be displayed on the "front page" (question page, FIG. 21) of a flashcard generated from a data file. In the case of data file 1900, this value is the integer "18" imported from field 1611 of FIG. 16. This is the value that the student is instructed to prime factor.

Field 1909 holds characters and/or images that were imported from field 1605 of FIG. 16, and will be exported into the answer page FIG. 21 of the flashcard derived from a corresponding data table 1900. In FIG. 19, that character is an "equals" sign.

Field 1911 includes the "answer" that has been imported from field 1613 of FIG. 16, and which will be exported to the "rear page" or "answer page," FIG. 22 of a flashcard generated from data file 1900.

Field 1913 depicts the status of the flashcard associated with a particular data file 1900. In the example of FIG. 19, the status is "stale." At the actual time in which the data table 1900 is generated, the status of all flashcards is "inactive" or "unused" or some equivalent status indicator. This status will be updated as the student attempts to answer the flashcard. In the example of FIG. 19, the "strength of learning" is 86.21% in field 1921. In an embodiment in which a status is modified to "stale" when the strength of learning falls beneath 90%, this constitutes a "stale" status, which is confirmed by the updated status in field 1913.

As noted, the selection of some flashcards may not be according to a simple "strength of learning" metric. Some statuses may be governed by review paradigms that count how many cycles have transpired since a flashcard was last reviewed. To facilitate such review paradigms, field 1915 contains the count on which the flashcard was last reviewed, field 1917 contains the current flashcard count, and field 1919 contains the difference between these two digital values.

Data table 1900 includes a histogram 1923 comprising a sequence of digital fields logically arranged in "columns" and "rows," including a column of time stamp fields 1925, and a corresponding column of accuracy fields 1927. When a student attempts to answer a flashcard, the date and time of that attempt are written in a time stamp field, and the accuracy of the attempt in the corresponding "accuracy" field. As noted in the equations referenced herein, the "strength of learning" or some other progress metric is derived from the histogram entries, and the strength of learning value in field 1921 is used to determine when, and how often to review the flashcard associated with that data file 1900.

In step 1817, the courseware development module auto-generates individual flashcards. Because it is only possible to apprehend what a flashcard looks like after it is generated, some flashcards may need to be edited directly by the courseware developer.

In step 1819, individual edits to each flashcard are saved to the corresponding data file. In image based interface, this may be relevant. However, in code driven programming, the editing of the flashcard and the editing of the flashcard's data file may be conceptually indistinguishable.

In step 1821, the courseware development module searches the relevant fields of the flashcard data files it has generated, and identifying the various principles therein.

In step 1823, the courseware development module searches the data-file registry to determine which of the principles are new, and which principles already have a data file relating thereto.

If, in step 1823, a data-file already exists for a specific principle listed in the new flashcards, then, in step 1825, the courseware development process simply returns to step 1801.

If, in step 1823, a principle listed among the new flashcards is not found in the principle registry, then in step 1827, the program generates a new data file for that principle. The generation of a data file includes importing the principle number into a predesignated field, and the preparation of other fields, examples of which are shown below in FIG. 21.

FIG. 20 is an embodiment of a data file 2000 for a principle. Field 2001 stores a digital value of the principle, which, in the example, is "AP-0021," the digital value of a principle for prime factoring as shown in field 1513 of FIG. 15. Alternative, are envisioned wherein indirect addressing or links refer to another address field in which the principle number is stored.

The data file includes a status field 2003, a field showing the count of the last review (field 2005), a field showing the current count of the courseware (field 2007), a field 2009 disclosing the difference between the values in fields 2005 and 2007, and a strength of learning field 2011. Each data file 2000 for a principle advantageously includes a histogram 2013, which, according to the example of FIG. 20, includes a column of time stamps 2015 corresponding to the date and time of the students' various answers, a column depicting the accuracy 2017 of the respective answers, a column cross referencing the flashcard 2019 corresponding to a specific answer, and a column disclosing the strength of learning 2021 of the corresponding flashcard. The generation of data file 2000 is substantially identical to the generation of data file 1900 in FIG. 19, as described in FIG. 18.

In an embodiment, a principle may be held to a different standard of review than the flashcards. For example, review of a flashcard may be triggered at anything below a 75% strength of learning, whereas review of a principle may be triggered if it's strength of learning value (in field 2011) falls below 95%. In such an instance, none of the flashcards 2019 of Histogram 2013 would be ripe for review, but the principle itself (AP-0021 in field 2001) is in need of review. In such an instance, the Application 120 (FIG. 1) will advantageously search and compare the strength of learning values in column 2021, and select, for review, the weakest flashcard, whether or not that flashcard is itself in need of review. Although columns 2019 and 2021 are optional, their presence in a column of a data file of a principle makes it more efficient for the Application 120 of FIG. 1 to identify the weakest flashcard among a principle.

FIG. 21 depicts an embodiment of the "question page" or "front page" 2100 of flashcard F-0332. FIG. 22 depicts an embodiment of the "rear page" 2200 or "answer page" of flashcard F-0332, Both "pages" depict digital screen displays of flashcard F-0332, and are advantageously generated from data file 1900 of FIG. 19.

The flashcard of FIGS. 21 and 22 may be generated as permanent image files, such as a "jpeg" file, or may be assembled for display at the time of viewing by the user, much like a "php" file is "assembled" for a web site screen display at the time of viewing, even though the image itself never existed before that time, and may never again exist after that moment. The question "Prime Factor the value displayed below" is imported from field 1601 of FIG. 16, and displayed in field 2101, and the value to be prime factored (that is, "18") is imported from field 1617, and displayed in field 2103.

On the answer page FIG. 22, the value to be prime factored also appears in field 2201, imported from field 1617, and the answer "2·3·3" is imported from field 1613 of FIG. 16, and written into field 2203. The flashcard number "F-332" is imported from field 1609 and written into field 2205. The principle number "AP-0021" is imported from field 1513 and written into field 2207. The answer page (FIG. 22) includes a field 2209 that contains a digital field in which the student's score is written. The "score" may be auto-generated by the Application 120 (FIG. 1), or entered by the student. In either event, it is exported to histogram 1923, and recorded, along with the time stamp corresponding to the date and time the answer was given.

Development of Language Flashcards

FIG. 23 depicts an embodiment of a table 2300 depicting select principles of Russian Grammar, from general principle "GP-0015" (element 2301) through general principle "GP-0133 (element 2341), which are foundational to the development of courseware for the Russian language according to the embodiments described herein. The language embodiment of FIGS. 23-31 differ from the mathematical embodiment of FIGS. 15-22 principally in that languages have paradigms that are more easily represented as "derivative principles." However, the concepts described herein may be used in any discipline.

Development of Linguistic Flashcards"

FIG. 23 depicts an embodiment of a data table of general linguistic principles of Russian 2300, comprising a partial list of individual linguistic principles "GP-0015" (element 2301 through "GP-0133" (element 2341) which are foundational to the development of courseware in Russian according to the embodiments described herein. The reader will appreciate the comprehensive nature of this file by considering fields 2323 through 2337. There are six endings for Russian verbs: ать (pronounced "aht's), ять (pronounced "yat's"), сть (pronounced "yet's"), овать (pronounced "ovat's"), нуть (pronounced "noot's"), and ить (pronounced "eet's"). However, there are fourteen verb-stem endings (last letter or last letters of a verb stem): д, з, т, ст, ск, с, х, к, т, б, в, м, п, , which may affect the spelling of the foregoing verb endings, as well as a fifteenth "ending" for all other stems. This produces as many as ninety combinations and permutations of verb "types" which will follow unique paradigms for spelling. By depicting each one of these as a separate "general principle" in FIG. 23, and generating respective paradigms for each of them, as illustrated below in FIG. 24, the courseware will be able to effectively monitor the student's progress in every different grammatical "principle" with pinpoint accuracy. The adaptive learning and/or statistical analysis module will allow the Application 120 of FIG. 1 to focus on any "general principle" or grammatical nuance with great specificity, thereby ensuring that the course does not "rush ahead" and leave the student ill equipped in certain facets of the Russian language.

Paradigm for a General Principle

FIG. 24 depicts a paradigm derived from general principle GP-0015 of field 2301 in FIG. 23. This digital value has been written or imported into field 2401 of FIG. 24, and represents masculine Russian nouns ending in a consonant in their nominative form. The table 2400 comprises columns and rows, the intersection of which identify digital fields for storing digital values.

The first column 2403 comprises a plurality of digital fields in which different cases for nouns are identified, including $1^{st}$ and $2^{nd}$ prepositional forms. Although a general "noun" paradigm may be used to initialize specific declensions and forms of nouns (such as masculine nouns ending in a consonant), in a common embodiment, the first column must be filled in by the course developer. The development of auto-paradigm generators for nouns may be too time consuming to justify creation for perhaps ten different declensions of nouns. However, column 2403 may be "cut and pasted" from a previous noun paradigms to save time.

The second, fourth and sixth columns 2405, 2409, 2413 and 2417 are respectively dedicated to singular noun forms, standard plural nouns, plural noun forms for quantities of 2-4), and plural noun forms for five or more. Each of these columns comprises a plurality of digital fields. The intersection of each column and row represents a distinct data field which stores a digital value for a distinct principle number representing a distinct principle of Russian grammar. Singular noun forms are numbered from P-0076 to P-0083. Standard plural noun forms are numbered from P-0084 to P-0091. Plural noun forms numbering two-to-four are identified by principle numbers P-0092 to P-0099. Plural noun forms for five or more in number are identified by P-0100 through P-0107. These principles are subsets of the general principle GP-0015, masculine nouns ending in a consonant. This General principle had been imported or copied to field 2401 from data field 2301 of FIG. 23.

For example, principle number "P-0083" is stored in field 2425 at the intersection of the "instrumental" row and the "singular" column. P-0083 thereby identifies the instrumental form of all singular masculine nouns that end in a consonant. As described below, this principle identifier will be listed in the data file of every flashcard that includes a review of a masculine singular noun declinable according to general principle GP-0015, which is in the instrumental form.

Continuing with FIG. 24, the third column 2407 comprises an array of fields for storing "strength of learning" values (or some equivalent performance metric) corresponding to a respective principles listed in column 2405. The fifth column 2411 comprises an array of fields for storing "strength of learning" values corresponding to a respective principles listed in column 2409. The seventh column 2415 comprises an array of fields for storing "strength of learning" values corresponding to a respective principles listed in column 2413. The ninth column 2419 comprises an array of fields for storing "strength of learning" values corresponding to a respective principles listed in column 2417.

In an embodiment, the generation of paradigm table 2400 of FIG. 24 is commenced by clicking on a general principle from among the list of general principles of FIG. 23. The method and apparatus described in FIGS. 17 and 18 may be utilized in great part, but may have to be modified slightly, as the paradigm table 2400 is not identical to the table of FIG. 16, which listed algebraic principles. In a preferred embodiment, after the programmer designates columns 2405, 2409, 2413 and 2417 as containing "principle identifiers." If there are multiple kinds of principles (e.g. designated by different prefixes—AP, P, W, etc.) the programmer will advantageously access a drop-down menu selecting the particular kind of principle. After these fields have been designated, in a preferred embodiment, these fields are auto filled, commencing with the next available principle number, as identified in a principle registry.

After a table or paradigm is built, the program developer may generate multiple tables (paradigms) for nouns after the manner of that table.

Auto Generation of a Paradigm for a Root Word

Figure 26:
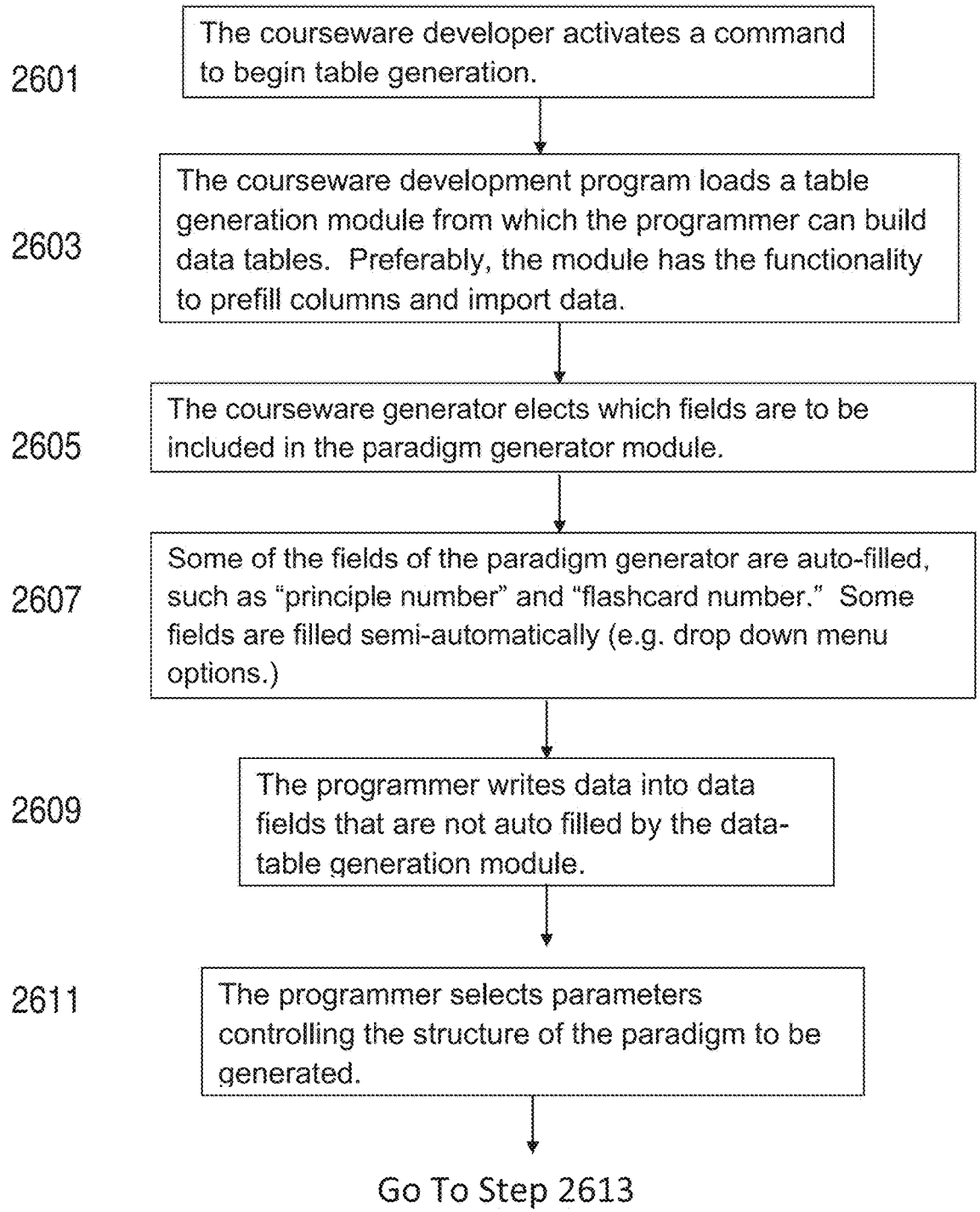
FIG. 26 depicts a method for generating a paradigm with the paradigm generation module such as depicted in FIG. 25.
Figure 26:
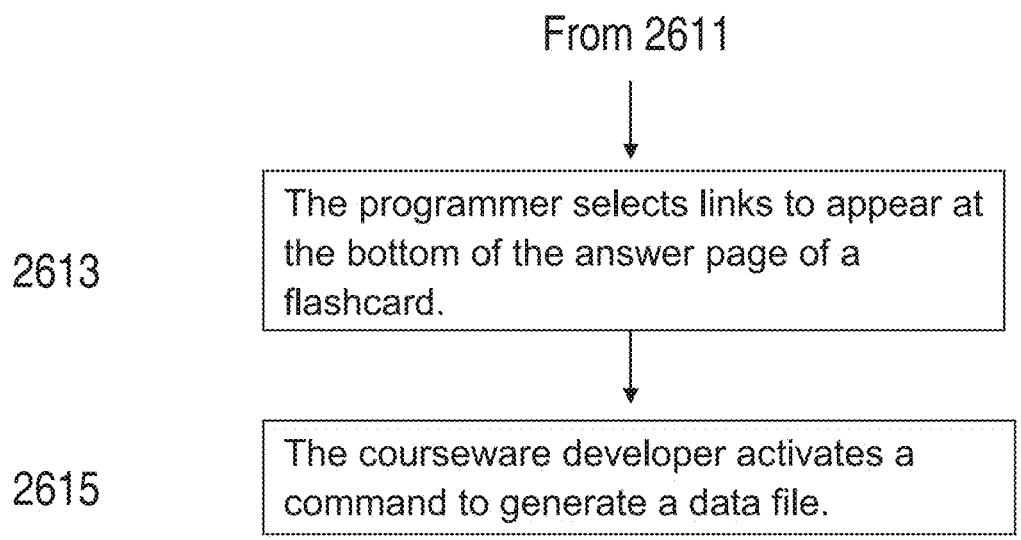

FIG. 26 discloses a process for generating a paradigm of a Russian noun, such as table 2700, according to the paradigm of a Russian noun defined by General Principle GP-0015 of digital field 2401. This commences the process of generating a paradigm for a particular noun (or other part of speech) that will derive from the paradigm of FIG. 24. As discussed below, specific paradigms can deviate from the master paradigm.

In step 2601, the programmer engages the "Begin Table Generation" button 2427, which, in an embodiment, initializes the loading of a module such as Table 2500 of FIG. 25.

In step 2603, paradigm generation module 2500 is loaded on the programmers computer screen. In an embodiment, the size, and component fields of FIG. 25 are determined by the general principle number, such as GP-0015 (shown in FIG. 23, field 2301). This may be imported to field 2501 of FIG. 2500 by right clicking on the general principle in FIG. 23.

In step 2605, the courseware developer elects which fields are to be included in the paradigm generator. In this embodiment, the paradigm generator of FIG. 25 is not "fixed," but adjustable. This adjustment may be done by clicking on menus that allow for the selection of various options. The fields 2501-2509 and the "variable parameters" menu 2511 are examples of the finished product. For example, if the flashcards were directed to verbs, the options for "second prepositional forms" and "animate" vs. "inanimate" accusative forms would be irrelevant (except, possibly for participial forms). Accordingly, the fields available in paradigm generator module 2500 are selectable, to an extent, by the courseware developer.

In step 2607, some of the fields (e.g. 2501, 2503) of the paradigm generation module are auto-filled. These may be filled entirely by automatic process, or assisted by input from the courseware developer. In a semi-automatic mode, the developer may click on options and select one. In the embodiment of FIG. 25, auto-filled fields include field 2501 (filled with the General Principle identifier imported from field 2401), and "word" field 2503, filled with word identifier W-3475. In this case, the value written in field 2501 is "GP-0015." The next available word number, shown as "W-3475" is automatically written into field 2503. However, instead of a "word," field 2503 might be filled with a principle number such as "P-0083". The courseware developer would select the option of the prefix, "W" or "P," and the auto-fill would select the next available word or principle number. Thus, step 2607 can be a multi-process step, which requires interaction by the program developer, such as electing what fields to include in the paradigm generator module.

Word Lists by Frequency of Use

In the development of flashcards for a foreign language, the courseware developer will advantageously secure a word list of the most frequently used words in the subject language. Alternatively, a computer analysis can be run on a sample text, such as the New Testament or a popular novel, deriving word frequency from that text. In this manner, the foreign language flashcards can be generated (and displayed to a student) according to their frequency of usage in a language. Such word lists can be generated, or obtained. The course developer will apply a "filter" to the word list, limiting the filtered portion to words according to the general principle under examination (e.g., masculine nouns ending in a consonant). From this sub-list of words, the next flashcard may be constructed from the most frequently used word limited to that specific category. This word is written into field 2505, preferably automatically, or "semi-automatically." That is, the course may be focusing on nouns at one point, and may select, for consecutive development (and presentation to the student) four or five consecutive masculine nouns ending in a consonant. To achieve this selection, the courseware developer might have to scroll down the list of the most commonly occurring words in Russian, and select, from among that list, masculine nouns ending in a consonant. In this way, the student is learning the language according to the most commonly used terms that he or she is likely to use the most often.

Although the order of flashcards is advantageously set, originally, by the courseware developer, certain parameters and instructions are advantageously given to the AI program. For example, in discussing a new principle, such as verbs having a certain stem, the courseware developer may feel it is appropriate to devote only three consecutive "new" flashcards to that verb stem before going on to a different grammatical category or principle. The AI program will preferably experiment with the flashcard order, with present parameters on the number of flashcards devoted to a new principle, and/or the "next" principle to explore.

In step 2609, the programmer keystrokes, into the fields of FIG. 25, those words which are not filled in automatically or semi-automatically. In the instant case, principle GP-0015 requires that it is a masculine noun ending in a consonant. In the example of FIG. 25, the word written into field 2505 is "глаз." The transliteration (pronouncation according to the western alphabet) is "glaz," which is entered into field 2507. The translation "eye" is entered into field 2509. As noted, these entries may be automatically entered, manually keystroked, or entered semi-automatically as directed by the programmer from previously established word lists.

If "глаз" (glaz) has already been assigned a different word number, a warning appears to the programmer, and various options are presented to the programmer. For example, the programmer may elect to edit the word, or create a separate file for an unrelated words of identical spelling, differentiating it from the first by a numerical suffix or some other identifier.

In step 2611, the programmer selects parameters 2511 for the generation of the paradigm for the word identified in field 2505. In the example of FIG. 25, the options are variant forms of Russian nouns. The programmer is given the option to omit the second prepositional form for words that do not have this form, to omit the "plural two-to-four" form for words that do not have this plural structure, and to select between animate and inanimate forms for the accusative. (Although the paradigm will have only one accusative form, there may be links to explanatory lessons, which may be influenced by whether the accusative is animate or inanimate. Additionally, a default note such as "animate form" may appear in some embodiments, so further reminding the student of this grammatical option every time the accusative form is used.)

In step 2613, the programmer selects links to appear at the bottom of the answer page of a flashcard. Referring, for example, to FIGS. 4 and 30a, various links 405, 407, 409, 411, 413, 415, 417, 419 are depicted at the bottom of the "page" which may be useful to the student 113 (of FIG. 1) in view of a particular flashcard. However, the method of FIG. 26 is best used to generate a paradigm such as paradigm 2713 of FIGS. 27-a & 27-b. Accordingly, the process described in step 2613 may performed at a different point in courseware preparation. For example, any of the links 405-417 which are relevant to all flashcards derived from table 2713 can be added during step 2613, whereas links specific to an individual flashcard maybe embedded in specific flashcards later in the courseware development process.

In step 2615, the programmer engages the "create data file" icon 2015 of FIG. 25, generating a partial paradigm for the word "glaz," and other fields depicted in FIGS. 27-a, b. The reader will appreciate that the structures and tables generated on FIGS. 27-a, b may be built from scratch, imported from other tables and structures, or a combination of these actions.

Paradigm of Actual Word

FIGS. 27-a and 27-b collectively comprise an embodiment of data file 2700, which includes the basic identifiers 2701 of the data file, which preferably have been imported from FIG. 25. The data file also includes a paradigm 2713 of case endings for the Russian word "глаз" ("glaz," or eye); a command prompt 2735 to "generate flashcards/data files"; a plurality of "control fields" 2737 for storing data essential for controlling the frequency and/or urgency of review of the underlying principle (word W-3475), and a histogram 2749 for calculating the "strength of learning" value written in field 2751. In various embodiments, the strength of learning value is used to determine the frequency with which a word, principle, or flashcard is reviewed.

As noted above, many of the table structures are generated in step 2613. The basic identifiers 2701 advantageously are imported from the paradigm generation module of FIG. 25. In the example, general principle GP-0015 has been imported from 2501 to field 2703. Word W-3475 has been imported from field 2503 to field 2705. The foreign word "глаз" has been imported from field 2505 to field 2707. The transliterated pronunciation "glaz" has been imported from field 2507 to field 2709. The translation, "eye" has been iported from field 2509 to field 2711.

The structure of table 2713 includes the paradigmatic structure of table 2400 of FIG. 24 (masculine nouns ending in a consonant). According to the instruction 2511 of FIG. 25 the second propositional form (row 2421 of FIG. 24) and the accusative animate row 2423 of FIG. 24 have also been omitted in the generation of table 2713.

In a similar manner, per instructions 2511 of FIG. 25, column 2413 (plural, two through four) and column 2417 (plural 5 or more) of FIG. 24 are not copied into table 2713, as the word "glaz" does not have alternate plural forms.

Referring still to FIGS. 27-a, b, the first column 2715 lists the various case endings (e.g. "Nominative, Accusative, etc.) and is auto-filled, copying the case types from column 2403 of the parent table 2400.

Columns 2717 and 2723 are auto-filled with a sequence of flashcard numbers, commencing sequentially from the last flashcard number in use in the flashcard registry.

Columns 2721 and 2727 are auto-filled by importing the principle numbers from columns 2405 and 2409 of FIG. 24 (derivative principles P-0076 through P-0083 and P-0084 through 0091 (omitting accusative animate principles P-0077 and P-0085, and omitting second prepositional forms P-0082 and P-0090, per instructions 2511 of FIG. 25). Any auto-filled field may be overwritten by a programmer.

The digital fields in columns 2719 and 2725 store the different forms of the word "glaz." In an embodiment, the programmer keystrokes the proper spelling into each of these fields to ensure the spelling is correct for the various cases and numbers. However, automated embodiments are envisioned, which may construct the paradigm of each word from its root, and rules of spelling that govern different cases and case endings.

Still referring to FIGS. 27-a, b, after paradigm table 2713 is completely filled-in, the courseware developer activates the "generate flashcards" icon 2735. In response to this command, a module similar in functionality to that described in FIG. 17 generates a digital data file for each of the respective flashcards identified in columns 2717 and 2723 of FIG. 27, and digitally writes the relevant information into the respective data files. It will be remembered, however, that FIGS. 27-*a*, *b* is one continuous data file 2700 for the root word "glaz," including the paradigm table 2713, control fields 2737, and the histogram 2749, are part of a data file of a word W-3475.

Still referring to FIGS. 27-*a*, *b*, field 2739 contains the strength of learning value (or some similar performance metric) of the referenced principle (e.g. the root word for "glaz"). This value is derived from the histogram 2749 applying an equation such as Equations 9, 10 and 11, or a table such as Table 3 above.

Data field 2741 contains the status of the word. In an embodiment, the threshold for triggering a review of a principle may be different than the threshold for triggering the review of a flashcard. As noted above, a root word constitutes a "principle" if multiple forms are derived therefrom, as is the case for "glaz," word W-3475 of field 2705.

Data field 2743 contains the count on which the principle was last reviewed. Data field 2745 contains the current count of flashcard review. The "count" refers to the total number of flashcard cycles through which a user had cycled in review of a specific course. Data field 2747 contains the difference between fields 2743 and 2741.

Table 2749 is a histogram of the root word "glaz." It is filled with new data any time any form of the word is used. The reader will appreciate that the histogram is not pre-filled at its generation, but rather, is filled gradually through the course exercise. At the time it is generated, the digital fields thereto are preferably filled with default values, and a present "pointer" which in indicates the next row to fill.

Column 2751 of the histogram discloses an array of time stamps reflecting the times in which various flashcards incorporating the referenced principle were reviewed. Column 2753 depicts an array of digital fields of the accuracy of the answers given at those respective times. Column 2755, depicts an array of fields for storing respective flashcard numbers relating to the corresponding time stamps. Column 2757 depicts an array of fields for storing strength of learning values related to the respective flashcards. Each flashcard cycle that incorporates any form of the word "glaz" will trigger an update of the histogram of FIG. 27, recording the time and date of that answer, and other specific histogram information disclosed in histogram 2749. Although many of the flashcard numbers are listed in the paradigm table 2713, it is also possible that other flashcards incorporate the root word "glaz," such as a sentence of a book that has been assigned a flashcard number. Any form of "glaz" listed in paradigm 2713, and any form in a sentence or other flashcard, is listed by "flashcard number" in col. 2755, including the strength of learning for that flashcard in field 2757. If the Application 120 of FIG. 1 determines that a student is weak in a certain principle (such as the word "glaz," the Application can go to the histogram for that principle, and identify the specific flashcards where the student is the weakest, so focusing teaching where it is needed.

The enumeration of certain digital fields and data types within data files depicted herein shall not be construed so as to disparage other types of data that may be contained therein.

Generation of Flashcards, En Masse, or One at a Time

Referring principally to FIGS. 27-*a*, 27-*b* and 28, when the "generate flashcard" icon 2735 of FIG. 27-*a* is activated, the courseware development program automatically generates data file 2800 of FIG. 28 for each flashcard listed in FIG. 27-*a*.

In an alternative embodiment, data files can be generated one at a time. For example, before clicking on the "generate flashcard" icon 2735, the courseware developer selects a flashcard, such as F-3483 of field 2729 of FIG. 27-*a*, or simply right-clicks on the flashcard number to be generated—in the present example, F-3483 of digital field 2729 of FIG. 27-*a*.

If data files are generated en masse, the developer will still have the option of accessing them one at a time to fill in further details.

Auto-Filled Fields in Flashcard Data Files

In either process, a row comprising a "flashcard number" 2717, "Word" 2719 and "Principle" 2721 are logically linked. Referring therefore to flashcard "F-3483," 2729 of FIG. 27-*a*, this flashcard number is exported from field 2729 of FIG. 27-*a* to field 2801 of FIG. 28. The word "глáзом" (glazom) is exported from field 2731 to field 2811 of FIG. 28. The Principle number P-0083 is exported from field 2733 to field 2805. The instrumental singular form "глáзом" (glazom) or "с с глáзом" is exported from field 2731 to field 2811.

Manually Filled Fields in Flashcard Data File

The courseware developer is required to fill in field 2809 with the instruction or phrase that will be exported to the first page (the "question" page) of the flashcard. In this case, the "question" is the phrase "Instrumental Case, Singular." Field 2810 will also be exported to the question page. In the present example, the contents of field 2810 is a sample phrase using the word "eye" in a manner that would translate to the instrumental form in Russian, "signaled with an eye."

Field 2810 depicts a manually filled field. In the example before us, the courseware developer has written the sample phrase "signaled with the eye," as an example of the usage of the term "with an eye" which is to be translated by the student. Field 2813 is manually filled with the phrase, "сигнализировал с глáзом," the translation of "signaled with an eye." The contents of field 2810 is to be exported to field 2903 of the question page of the flashcard (FIG. 29), and the contents of field 2813 is to be exported to field 3005 of the answer page of the flashcard (FIGS. 30*a*, 30*b*).

Data Fields in Data File that are Auto Filled in Operation

Field 2815 contains the "strength of learning" metric, or some equivalent metric that, in certain embodiments, substantially controls the order of presentation of flashcards to the user. At the formation of the data table, the strength of learning field is filled with a "dummy value" indicating that it has never been calculated. Various equations and tables are depicted herein as alternative vehicles for calculating the strength of learning metric. As discussed herein, each time a flashcard is attempted and answered by a user, the strength of learning value of the flashcard, and any principles associated therewith, are updated.

Field 2817 depicts the status of the flashcard derived from data file 2800. In the example of FIG. 28, the status is "active," consistent with the hypothetical paradigm in which a flashcard is designated as "active" when it has a 90% or better probability of being answered correctly by the use. In the example of FIG. 28, the "strength of learning" is 94.21% in field 2817, resulting in an "active" status according to this benchmark. At the actual time in which the data table 2800 is generated, the status of all flashcards is "inactive" or "unused" or some equivalent status indicator. This status is updated as the student attempts to answer the flashcard.

As noted, different flashcard classifications may be used, not all of which are governed according to the same performance metric or "strength of learning" metric. Since some metrics may count the number of cycles between flashcard presentations, field 2819 contains the count on which the flashcard was last reviewed, field 2821 contains the current flashcard count, and field 2823 contains the difference between these two digital values.

Histogram Within Data File

Data table 2800 includes a histogram 2825 comprising a sequence of digital fields logically arranged in "columns" and "rows," including a column of time stamp fields 2827, and a corresponding column of accuracy fields 2829. When a student attempts to answer a flashcard, the date and time of that attempt are written in a time stamp field, and the accuracy of the attempt in the corresponding "accuracy" field. As noted in the equations referenced herein, including, but not limited to equations 9, 10 and 11, certain strength of learning metrics are derived from the histogram entries.

Because flashcards such as FIG. 30*a* are generated from a data file 2800, the "links" 405-419 depicted at the bottom of the FIG. 30*a* are digitally embedded in the data file 2800. They have not been depicted in FIG. 28 due to space limitations. Links such as 405-419 may be added or deleted by the courseware developer from the data file 2800.

Front Side of Flashcard

FIG. 29 depicts an image 2900 of the front side of the flashcard derived from Data File 2800. The flashcard image includes the "question" 2901, specifically, the word "eye" in the native language of the student and designated for translation into the foreign language. Question 2901 is imported from field 2807 of FIG. 28. Instructions 2903 "In the Instrumental Case, Singular" and "as in 'signaled with an eye,'" are automatically imported from fields 2809 and 2810 of FIG. 28.

Rear Side of Flashcard

FIGS. 30*a* and 30*b* depict an image of the rear side of the flashcard derived from Data File 2800. The two figures are at different stages of self assessment, as discussed further below. The flashcard image includes an "answer" 3001, which, in the example, is the word (or phrase) "с с глáзом ," which has been imported from field 2811 of FIG. 28. Below this answer is the English translation "with the eye," 3003, imported from field 2807, or some other source data field with this phrase. Data field 3005 discloses the phrase "he signaled with an eye" which was imported from field 2810 of the data file.

Pre-Generated Flashcards and Real-Time Generation of Flashcards

In an embodiment, flashcard images of FIGS. 29, 30*a*, 30*b* are generated upon completion of the Data file 2800 through activation of the "generate flashcard" icon 2831. However, embodiments are envisioned wherein the flashcard is generated at the time of display in an actual flashcard cycle, much like a "php" file on the internet comprises a collection and arrangement of data for display on the users monitor. An advantage to generation of a flashcard at the time of presentation to a user is that corrections and improvements to the data file 2800 will be reflected when the flashcard is examined by the user. However, alternative embodiments are envisioned wherein any corrections or improvements in the data file, will, upon the command to "save changes," generate a new flashcard images as well as saving changes to the data file. Virtual button 2831 "generate flashcards" can thereby function as a "save changes" (to data file) and "generate flashcard" simultaneously.

Editable Flashcard

In editing a flashcard, the programmer selects icons that will appear at the bottom of the answer page of the flashcard. Referring briefly to FIG. 30-*a*, these links may include paradigms 405, charts 407, audio pronunciation guides 409, audio or video lectures 411, 413, 415, text lessons 417, etc. In an embodiment, when the courseware developer edits a data file linked to a flashcard, an "editable version" of the flashcard appears to the programmer, thereby allowing the programmer to more intuitively assign links and embed icons, such as 411, 413 and 415.

Data File for Underlying Root Word

The flashcard represented by FIGS. 29, 30*a* and 30*b* are directed to the instrumental singular form of the word "glaz." Underlying this flashcard are the root word "glaz" itself, and the instrumental singular usage of masculine nouns in general. Even if there exists no flashcard to test a student's competence with an underlying word, or an underlying grammatical principle, the student's progress is advantageously tracked with a data file and histogram generally for the word "glaz." The student's progress is also tracked in a data file with histogram for any occurrence of a singular instrumental form of a masculine noun which ends in a consonant. The student's strength in one underlying word can be compared with other underlying words, and review can be conducted for the weakest words, as needed. Similarly, the student's progress can be tracked with grammatical principles, and the weaker principles can be identified for review.

It can therefore be appreciated that, when flashcard F-3483 ("glazom") is reviewed, as depicted in FIGS. 29, 30*a* and 30*b*, the specific histogram 2825 for "glazom" itself is updated (FIG. 28) as well as a histogram 2749 for the underlying root word "glaz," (FIG. 27-*b*). Moreover, as shown below, the grammatical principle "instrumental singular masculine" has its own histogram, which is also updated when flashcard F-3483 is answered.

Data File for a Grammatical Principle

FIG. 31 depicts a data file for principle P-0083. This principle number represents the instrumental singular form of masculine nouns ending in a consonant, and is referenced FIG. 24 (paradigm for masculine nouns ending in a consonant)—field 2425), and FIG. 27-*a*, 27-*b* (data file for "glaz," including a complete paradigm), with field 2733 specifically referencing principle P-0083. A histogram for a principle will have many flashcards referenced therein. The data file for the principle is preferably generated automatically the first time a flashcard references that principle. After that, confirmation that the data file already exists means it need not be generated. Only the histogram must be updated on each new cycle of a flashcard incorporating the referenced principle.

By way of example, assume that the generation of data file of FIG. 28, and flashcards of FIGS. 29, 30*a* and 30*b* constitute the first reference to principle P-0083 (the instrumental singular form of masculine nouns ending in a consonant). When the courseware developer engages the "generate flashcards" prompt 2831 of FIG. 28, the courseware development program checks the principle registry. When the courseware fails to detect a principle (e.g. P-0083) in the principle registry, the course preparation software generates a data file for that principle. An example of a data file for a principle is depicted in FIG. 31. The search of the principle registry and generation of the data files for these respective principles may be initialized by the "virtual button" 2735 at the bottom of FIG. 27-*a*.

Referring to FIG. 31, field 3105 contains the strength of learning value of the subject principle. This value is derived from the histogram 3115 discussed below.

Data field 3107 contains the status of the principle. In an embodiment, the threshold for triggering a review of a principle may be different than the threshold for triggering the review of a flashcard.

Data field 3109 contains the count on which the principle was last reviewed. Data field 3111 contains the current count of flashcard review. The "count" refers to the total number of flashcard cycles through which a user had cycled in review of a specific course. Data field 3113 contains the difference between fields 3111 and 3109.

Histograms of Grammatical Principles

Still referring to FIG. 31, data file 3100 includes a histogram 3115 for the underlying grammatical principle P-0083 (instrumental singular case and number) stored in data field 3101, and derived from general principle GP-0015. The histogram 3115 includes array of time stamps in column 3117. The time stamps reflect the times in which various flashcards incorporating the referenced principle were reviewed. Column 3119 depicts an array of digital fields of the accuracy of the answers given at those respective times. Column 3121, depicts an array of fields for storing respective flashcard numbers relating to the corresponding time stamps. Column 3123 depicts an array of fields for storing learning values related to the respective flashcards. Column 3125 depicts an array of fields which disclose the word, or phrase on the corresponding flashcard that relates to the principle.

When a student answers a flashcard as depicted in FIGS. 30*a*, 30*b*, the Application 120 of FIG. 1 advantageously records the accuracy of the answer on multiple histograms . . . the histogram for the flashcard itself (FIG. 28, histogram 2825 for flashcard F-3483), as well as the histogram of every principle identified in the data file of the flashcard. Referring again briefly to FIG. 28, data file 2800 for flashcard F-3483 cross references word W-4375 in field 2803, and grammatical principle P-0083 (singular instrumental form) in field 2805, thereby enabling the Application 120 to update all relevant histograms.

Any principle related to a flashcard should be listed in its data file. This may be in the form of the actual principle number or word number, digital addresses, links, redirects or other embedded digital information. When a student attempts to answer flashcard F-3483, every histogram linked to the data file of F-3483 is updated.

Self Assessment in Scoring Compound Flashcards

FIGS. 30*a* and 30*b* depict the "answer" pages of a flashcard with an example of a self-assessment option for flashcard F-3483, also referenced in FIGS. 28, 29. FIG. 32 describes a process for self-assessment (scoring) one's performance on a flashcard.

In step 3201, the student attempts answer a compound flashcard (a flashcard that teaches more than one principle). FIGS. 29 and 30*a* depict an example of a compound flashcard requiring the translation of "with the eye" into the instrumental case of the Russian language. The question therefore requires knowledge of the root word "eye," and knowledge of the proper ending for a masculine singular noun in the instrumental case.

In step 3203, the student reviews the answer page, as depicted in FIG. 30*a*.

In step 3205, if the student's answer was correct, then,

In step 3207, the student selects "correct" and hits "enter."

If, in step 3205, the student's answer was incorrect in some measure, then,

In step 3209, the student answers "incorrect," and the "answer page" expands and presents to the student an option of separately grading the student's performance on multiple distinct principles within the compound flashcard. FIG. 30*b* depicts an expanded screen display of answer screen of FIG. 30*a*. In the example of FIG. 30*b*, the student has selected "correct" for the root, and "incorrect" for the instrumental ending "_____ om." Because there are often more than one way to translate a word of phrase, and more than one way of solving certain algebra problems, it is possible that a student has taken a path that is neither "correct" nor "incorrect." To allow for this possibility, the principles presented for grading include the grading option "N/A" (not applicable). This provides an alternative if the student feels that none of the available scoring options accurately reflect the student's performance in the question.

In step 3211, the student grades as "correct" those principles within the compound flashcard which were answered correctly, and grades as "incorrect" those portions which were answered incorrectly. In an embodiment, grading options also include scaled answers, such as "one to five" or "one to one hundred." These grading options are depicted in FIG. 30*b*, elements 3009 and 3011. After completing all scoring, the student strikes the "enter" icon 3013 of FIG. 30*b*, or finalizes the recordation of the scores by some equivalent step or process.

In step 3213, all relevant histograms are updated. If all answers were correct, as depicted in FIG. 30*a* and step 3305, three histograms—for the flashcard (FIG. 28, histogram 2825), word W-3475 (FIG. 27 histogram 2749), and the principle (FIG. 31, histogram 3115) are updated with a "correct" entry.

As discussed in part above, FIG. 30*b* depicts an example of an answer page of a flashcard in which a student answered one principle of the flashcard correctly (the root word "glaz," 3009), and one incorrectly (the instrumental singular ending), 3011. According to the example depicted in FIG. 30*b*, in step 3313, the Application would record a correct answer on histogram 2749 of FIG. 27 for the word "glaz," an incorrect answer on histogram 2825 of FIG. 28 for flashcard F-3483, and an "incorrect" answer on histogram FIG. 3115 for principle P-0083.

FIG. 30*b* depicts a single nested drop-down sub-menu, consisting of options 3009 and 3011 which dropped down from answer 3007 when it was marked as "incorrect." However, if multiple intricacies are involved in a compound flashcard, multiple nested "drop down" sub-menus are envisioned.

Different Standards of Review for Principles and Flashcards

The performance metric for a principle may be different than that for a specific flashcard. For example, the review threshold for a flashcard may be 70%, while the review threshold for a principle may be 90%. As a result, ten flashcards of different words in the instrumental singular form may range from 73% to 92%, therefore, being above the review threshold for a specific flashcard. However, the processing of the histogram for the principle (masculine singular nouns in the instrumental form) may result in a performance metric of 79%. While this does not trigger review of any specific flashcard, it does trigger review of principle P-0083, "masculine singular, instrumental form." (See FIG. 24, element 2425). FIG. 32 and FIG. 34 depict a process of reviewing a flashcard.

Review of a Principle

In this section, review of a "principle" refers to a principle which does not have a specific flashcard assigned thereto, but has multiple derivative flashcards deriving therefrom. Because the performance metrics of various flashcards decay over time, they are continually recalculated. The performance metric of a principle may be calculated differently than that of its component flashcards, creating the possibility that the principle needs review even if none of the component flashcards are "stale." The performance metric of a principle (including a root word) may be adduced in the same manner, or differently than that of the performance metrics of its component flashcards. In an embodiment, the performance metric of a principle is simply the average of its component performance metrics.

When a principle is determined to be stale, the Application selects for review the weakest flashcard from among those flashcards that incorporate that principle. This is accomplished through comparing the performance metrics of those respective flashcards. In FIG. 31, the histogram 3115 of principle P-0083 (field 3101) includes a listing of the component flashcards, and there instantaneous strength of learning values to facilitate this comparison.

Recalculating Performance Metrics of Flashcards

Because most of the performance metric degrades with time, according to a preferred embodiment, the strength of learning value of every flashcard and principle is recalculated regularly. However, if this requires significant "overhead" or calculation time, embodiments are envisioned wherein the computing power devoted to calculating the strength of learning is limited so as to not consume undue processing "bandwidth."

In one embodiment, the program continually reevaluates the performance metrics with a fixed upper limit on the CPU, thereby limiting the consumption of processing power. Depending on the processing power consumed, this may result in a recalculation of every flashcard one a cycle, or may result in the recalculation of every active flashcard every five minutes.

In an embodiment, the flashcards or principles closest to falling below their respective "thresholds" (e.g. 90% probability of accuracy) are reviewed as soon as they fall below the threshold. Assume, for example, that flashcards are reviewed when the principle performance metric (e.g. "strength of learning") falls beneath 90%. Any flashcards below 90.01% probability of accuracy are more likely to degrade below this horizon far sooner than another flashcard at 97% probability of accuracy. Similarly, a flashcard that has been reviewed only sixteen times is likely to degrade more quickly than a flashcard that has been reviewed one hundred times.

Based on these assumptions, flashcards that are either below a certain threshold (e.g. 90.1% accuracy) or below a certain number of reviews (e.g. fifteen reviews or less) are stored in a temporary queue flagging them for re-calculation of their strength of learning or performance metric more frequently (e.g. once per cycle), whereas the other flashcards are re-calculated at a slower pace to control CPU usage. By these and other methods, the frequency of recalculation of flashcards may be reduced, consuming less CPU power on the user's computer.

Review of a Book Through Flashcards

A flashcard may be limited to a single sentence, or may include a "page" of text, such as one might see on a digital "tablet" used to read books. Regardless of the length of a flashcard translating a book or piece of literature, as a student reviews a flashcard, the student may "click" or otherwise select a specific word. A "help box" 3901, 3903 (FIG. 40) will appear, including the definition(s) and parsing or conjugation of the word. When reviewing a word via a pop-up box, the student has the option of grading the word at that time, or simply closing the pop-up and waiting to grade the entire sentence.

When a student elects to read a book in a foreign language, the Application 120 of FIG. 1 will advantageously inform the student whether or not he or she is "ready." For example, if a student has never studied participles in the foreign language, this is a major principle, probably entailing a number of sub-principles (e.g. different genders, tenses, cases and number of the participle). The Application 120 will advise the student that he or she is, as of yet, unfamiliar with "participles, interrogatory pronouns, etc." The Application will also advise the student of how long to gain some fluency in these principles (e.g. "six-and-a-half weeks if the student studies one hour a day at the current level of proficiency"). This measure will advantageously be developed through statistical analysis of the database/adaptive learning/AI modules at the Application 120 level of the student's data base (e.g. "how fast does this student learn?") as well as statistical data within the central data base 128 (e.g. "how long does a study of participles take compared to a study of the present tense verbs?") The transaction administrator 127 of FIG. 1 reviews the central data base 128 and informs the Application 120 of any relevant statistical information. The Application informs the student of how soon they will be reasonably qualified to attempt a translation.

Before a student begins translation of a piece of literature, the program will advantageously identify any flashcards (or principles) within a chapter which a student does not know, or for which he is below the threshold level. After identifying those flashcards and principles, the program will drill the student in the weakest words and grammatical principles to ensure the best translation experience.

FIGS. 33 and 39 disclose a method and screen depiction for preparing interactive interlinear texts in a foreign language for use by a student. They can be used in conjunction with the principles taught herein. In the preferred embodiment, a piece of literature is preferably reduced to a sequence of flashcards, such as depicted in FIG. 40, which present the book, story or piece of literature (hereinafter the "book" or "story) in a fragmentary format, such as a sentence-by-sentence basis.

FIG. 39, depicts an embodiment of the courseware that the courseware developer might use in preparing an interlinear book, such as St. Paul's First Epistle to the Corinthians in the original Greek language. The upper line 3915 depicts $1^{st}$ Corinthians 12:31 in Greek. Below it, the interlinear version of the same verse 3917 appears in the native language of the speaker—in this case, English.

Before a "flashcard" for a sentence or line of literature can be completed, each word in the story must exist in the flashcard registry within the application 120. In step 3301, the courseware developer loads a digital file of a book, short story, or other piece of literature (hereinafter "story" or "book") into a courseware development program. For example, since theology students are required to do translations from Greek, FIG. 39 is directed to the development of an interlinear interactive depiction of St. Paul's First Epistle to the Corinthians.

Referring now to FIG. 33, in step 3301, therefore, an interlinear text of $1^{st}$ Corinthians in Greek and the student's native language are uploaded into the programmer's computer for processing according to the method and depictions described below. The reader will appreciate that the term "interlinear" is used comprehensively to represent any book in a foreign language, including foreign language pieces of literature with, or without an interlinear text in the student's native language. The program comprises a comparator/parsing program.

In step 3303, n=1.

In step 3305, the courseware development software advances to the n$^{th}$ word. In the example of FIG. 39, a cursor 3911 appears over the "n$^{th}$" 3913, which, in the example of FIG. 39, is the Greek word ζηλοντε (zealoute). The n$^{th}$ word may be selected manually (by moving the computer cursor over it), or automatically. The example herein is generally described in terms of an automatic selection, n=0 and n=n+1, as the cursor moves down the sentence.

In step 3307, the courseware development software searches the flashcard registry to find any matching words.

In step 3309, if the exact word is found in the flashcard registry, then, in step 3311, the courseware development software displays, on the screen of the courseware developer, every paradigm containing the matching word. The example of FIG. 39 depicts two different Greek paradigms that contain the Greek word ζηλοντε (zealoute). Word 3905 is highlighted in paradigm 3901 (Present Active Indicative) and word 3907 is highlighted in paradigm 3903 (Present Active Imperative). The other words within these paradigms (word that are not under consideration) are in grayscale, or otherwise de-emphasized. Below each paradigm is the translation 3909 of the word according to the grammatical nuance of the respective paradigms 3901, 3903.

In step 3309, if a word is not found in the flashcard registry, or, if the courseware developer believes the paradigms on display are incomplete, then, in step 3313, the courseware developer prepares a new flashcard for the word, including any related data files and paradigms that must be generated in relation thereto. FIGS. 25, 26, 27 and 28 depict embodiments of processes and data files related to the generating of new flashcards and paradigms for a new word.

Referring again briefly to the example of FIG. 39, every place in Scripture in which a particular morphology appears is displayed within the paradigm. For example, the particular word (and morphological structure) under consideration, ζηλοντε, occurs twice, once in 1 Corinthians 12:31, and once in the apocryphal book, Wisdom 1:12. Although such cross referencing of all usages may be far too exhaustive for most languages or books, because the Old and New Testaments (and Apocryphal writings) are a limited body, and because exegesis and grammatical studies by theological students relies very heavily on such cross referencing, this cross referencing may be useful in Koine Greek and biblical Hebrew, whereas it might be considered superfluous for Tolstoy's "War and Peace."

In some cases, multiple alternative meanings will be tenable. The example of FIG. 39 was selected for this reason. To help the courseware developer make this decision, beneath the paradigms are translations of the word in the different grammatical applications 3909. In the example of FIG. 39, the King James Version translates the word ζηλοντε ("zealoute") as "Covet earnestly" 3917, translating the verse as a command to seek the greater gifts (the imperative mood 3907 in Greek). But an alternative grammatical options is that the verse represents a statement of the problem at Corinth, that certain persons were, in fact seeking the greater gifts (indicative mood). Hence the translation "But you are seeking the greater gifts" (present active indicative 3901, 3905) forms a tenable alternative.

In step 3315, the courseware developer selects the correct option (or options). In the example of FIG. 39, if the courseware developer determined that there were two viable alternative readings of the word ζηλοντε (zealoute), the courseware developer could select both alternative grammatical nuances 3905, 3907, for example, by holding the "control" key and clicking on multiple grammatical options. In the embodiment of FIG. 39, this linking can be achieved by selecting the "Done" button 3919. The process links the selected paradigms 3901, 3903, as well as the specific words 3905, 3907 highlighted therein, and the definitions 3909 of these alternative grammatical nuances, to the n$^{th}$ word 3913 in the interlinear text.

In an embodiment in which multiple grammatical reviewers are being used, the course development software will advantageously change the color of the link (or some other feature) to indicate that the selection has been confirmed by the first grammarian. Multiple successive grammarians may be slated to review the text, wherein the color of the link changes each time, reflecting the number of reviews, or designating the individuals who have reviewed the grammatical selection.

In step 3317, the process increments to the next word, n=n+1, and the process returns to step 3305. The process continues until every word in the book is cross referenced.

FIG. 40 depicts an embodiment of a flashcard presented to a student who is translating a sentence from a foreign language text. The embodiment of FIG. 40 is largely identical to the embodiment of FIG. 39 which appeared to the courseware developer. However, the paradigms 3901, 3903 that appear to the student are only those selected by the courseware developer as relevant. The reader will appreciate that the definitions 3909 are abbreviated. In an embodiment, a longer list of potential meanings could be offered. In an embodiment in which a wide range of potential definitions are possible, the more relevant definitions may be presented in bold face, and the less relevant in grayscale, similar to the presentation of words in paradigms 3901 and 3903. In many languages, a word is translated differently when it is an object of different prepositions. If this, or some other a grammatical rule accounts for the preferred translation, the rule is preferably stated in the flashcard of FIG. 40 when the cursor is over a particular word in the flashcard.

In FIG. 40, the cursor 3911 is over the word ζηλοντε (zealoute). In an embodiment, it is moved manually by the student. In an alternative embodiment, it advances after the student enters a self-assessed grade, or elects to practice the reading exercise without grading 4003.

If a student elects to grade their translation of a word, a self-assessment page such as FIG. 30a or 30b will appear. Because the nature of reading a foreign language book in a digital flashcard environment is different from reviewing a single foreign word, in an embodiment, a student may select certain words which need not be graded. The words "δε ("but"/"now"/"and"), and τα ("the") 3915 (FIGS. 39, 40) are such common words that it may become an annoyance to a student to offer a self-assessed grade each time they appear. The cursor could simply move over the words at a preset rate, allowing the student to translate "on the fly," entering self-assessed grades only for the more difficult words, such as χαρισματα ("charismata,"—gifts) or μειζονα ("meizona"—greater), for which there is a reasonable possibility that the student may mistranslate the word.

FIG. 40 offers the student a toggle option 4001 for displaying or concealing the interlinear translation in the student's native language.

In an embodiment, before a student begins translation of a chapter of a book, the application 120 may calculate the probability of accurately answering every word in the chapter. The student may elect to review these words individually before beginning the chapter according to the method of FIG. 34, or may elect to read the chapter, and face difficult translations as they appear.

Multiple Principles on One Flashcard, Algebra

As discussed above in conjunction with a language flashcard comprising both a root meaning, and a grammatical principle for the morphological structure of the word, flashcards for algebra, physics, economics and other disciplines may also comprise multiple principles.

Consider multiple principles in a flashcard for algebra. Solving simultaneous equations, prime factoring is often used to calculate values by which two equations can be multiplied by the minimum value such that, when one equation is subtracted from the other, a variable drops out to zero. Consider the following equations:

$$4x+3y-2z=13$$

$$-3x-9y+4z=-26$$

$$8x-6y+8z=50$$

To solve these simultaneously, the student may first elect to reduce "x" to zero in one of the three equations. Prime factoring the first equation, $4x=2\cdot2\cdot x$. Prime factoring the third equation, $8x=2\cdot2\cdot2\cdot x$. This prime factoring informs the student that multiplying the first equation by ($-2$) and adding it to the third equation will produce a value of zero for x.

Learning, however, involves three aspects: understanding, memorization, and integration. After hearing a lecture on prime factoring, and seeing one example, a student may "understand" the principle. However, the average student is unlikely to be able to "prime factor" a number next week or next month if the process is not reviewed and practiced in that span of time, thereby "memorizing" the principle.

Integration is the final step of learning, and even fewer students would be able to integrate the process of prime factoring in the outworking of new mathematical problems, such as solving simultaneous equations, without a minimal level of practice and review of the principle of prime factoring.

Multiple distinct algebraic principles were described above: 1) the principle of electing two candidate equations to "cancel out" at least one variable, 2) the principle of prime factoring to identify what they have in common, 3) the principle of multiplying the selected variable by the factors that are not in common to create equal (or negatively equal) variable expressions, 4) the principle of adding the two equations together, thereby canceling out one variable, etc. There are surely other principles, intuitive to one schooled in algebra, but which are best identified for systematic review in a flashcard set teaching algebra. Relevant principles are identified for every flashcard, and the histograms of those principles are updated when a student answers a flashcard. Because there is more than one way to solve most algebra problems, the "self-assessment" portion for an algebra flashcard may be more "interactive" than the self-assessment for languages as shown in FIGS. 30*a* and 30*b*.

Cross-Referencing Flashcard Sets in Multiple File Folders

Not all courses will be "start to finish" like algebra or French. Many persons make a lifetime study of the Bible. Consider, for example, a theology student memorizing Bible verses on various theological subjects. Unlike a "start to finish" approach one might use with algebra, theology can be broken up into many discrete subjects. Bible verses relating to the bema are relevant to the doctrines of soteriology, eschatology, and the spiritual life. A file (or sub-folder) entitled "The Bema" can be crafted with links to flashcards of Bible verses on the bema, such as 1 Cor. 3:9-15, 1 Cor. 4:1-5, 2 Cor. 5:9-11. A link to the sub-folder "the Bema" is stored in all three file folders referencing Bible verses on The Bema.

In an embodiment, a subfolder does not contain flashcards (i.e., the text, data, pictures, etc. necessary to make the flash card). Rather, a folder or sub-folder may simply contain links to the relevant cards in the flashcard Registry.

It is foreseeable that circular references could arise. For example, a file folder on "Eschatology" could reference "The Bema," which, directly, or indirectly, makes a circular reference back to the file folder on Eschatology. Safeguards are envisioned to prevent circular references or infinite loops. In an embodiment, folders (or lists, or groupings) are advantageously divided between two different types. A user-accessible folder might be a file folder on Eschatology. A user may select this folder for review. A reference folder would be a file folder (or list) entitled The Bema, which included links to flashcards for various Bible verses on The Bema. A user could not open a reference folder as an exercise, nor could a reference folder reference another folder. This prevents infinite looping.

Cross Linking File Folders

File folders may be cross linked to expand the scope of study. Assume, for example, an engineering student is preparing for the EIT exam (the "engineer in training" exam, the first session of the professional engineer exam) during her final semester in undergraduate engineering studies. She may want to link file folders for all previous classes in physics, chemistry, calculus, statics, dynamics and electricity. By reviewing these completed classes for fifteen minutes a day, the student is still fresh in studies completed two or even three years earlier in college. In this way, the student need not prepare for the EIT exam, they have been preparing all along. By linking the file folders, the statistical analysis of the application treats the linked folders as one large course. So the "stale" flashcards are reviewed most often, as in other courses using the statistical modeling and AI application.

The same principle of linking file folders can be used for accumulating "certificate courses" or other subjects. Consider a student memorizing Bible verses as a daily exercise. There is no start or finish to the course of study. But the student may want some direction in the subject matter under study. She may have already completed memorization of thirty-five verses or passages in a file folder entitled "Eschatology," and another file folder of three-hundred verses on soteriology and the doctrine of grace. As she begins a new study (e.g., on anthropology and the doctrines of Augustine, Calvin and Arminius), she links the file folders on eschatology and soteriology to the file folder on anthropology. The application treats these three folders as it were a single self-contained course. The memory verses under eschatology and soteriology are "active" flashcards, generally falling under the categories of "stable," "stale", and "tainted" flashcards discussed above. Flashcards from the earlier studies on eschatology and soteriology are thereby reviewed as often as necessary to maintain fluency. New flashcards on anthropology are equivalent to "pending" flashcards (or, after first reviewed, "introductory" flashcards). The digital application ensures that the student remains fluent in the verses he or she has already memorized, while gradually introducing new Bible verses on the subject of anthropology.

Regression Analysis, Statistical Analysis and Artificial Intelligence

Application control parameters govern the order and frequency of the display of flash cards, whether a deck comprises a sub-folder of only twelve flash cards, or a single file folder containing a complete course of 3,751 flash cards. The Application 120 of FIG. 1 runs on a user's computing device, such as a mobile computing device 137 of FIG. 1. With each answer, histogram data of a user's progress on a specific flash card is continually updated and stored in a user's computer. The histogram data, including metrics, reciprocal data, and derivatives, samples of which were described in Equations 1-8 above. Collectively referred to as metadata, they are uploaded to a central data base. In an embodiment, at least some of the histogram data is analyzed and processed on the user's computer to generate at least some before uploading the metadata to a central database. This reduces the calculating burden imposed on the transaction administrator 127 in crunching numbers in the central database 128 of FIG. 1. The database records the metadata generated by the user. This data is used in statistical analysis, an AI program and/or or adaptive learning program to optimize the application control parameters. Because performance metrics and control parameters are derived, in part, from the histogram data, references to any of these three (performance metrics, control parameters, or histogram data) may be understood to comprehend the other two. Similarly, "statistical analysis," AI and "adaptive learning" may be understood interchangeably.

As the statistical analysis program compares the results of multiple alternative control parameters, regression analysis is advantageously applied "holding all other things equal ("ceteris paribus"). Control parameters may thus be compared while all but one variable is held constant, serving to isolate the effect of changing a single application control factor. But with hundreds of users, hundreds of variations are possible.

The statistical modeling is not limited to selecting flashcards. Revisiting FIG. 12, an "ideal gas law" interactive illustrator (or any other lesson), statistical records will compare how often the card or lesson is reviewed (including the duration between reviews, etc.) to the student's performance on flashcards and exams. By these broad statistical models, the transaction administrator 127 (FIG. 1) determines the optimal frequency of review of animations, videos and other lessons, as well as flashcards.

Local AI Programs and Local Number Crunching

In a preferred embodiment, histogram data is processed by a user's computer 137 to generate various performance metrics. The collection of data is then transmitted to the central data base 128 accessible by the Central AI program (part of the transaction administrator 127), saving time in the processing of vast numbers of histogram data. However, embodiments are envisioned wherein some number crunching is performed in a central (remote) device such as the transaction administrator 127.

Although iterations of an AI program can produce a generally optimal application control values, and while certain general principles of pedagogy are universally true, everyone has their own idiosyncratic learning style. Someone who suffers sleep apnea may not be getting adequate slow wave sleep at night, during which short-term memories of hippocampus are consolidated into long-term memories in the prefrontal lobe. As a consequence, that individual may take longer to translate short-term success into long-term proficiency than other users on the database, and may require more repetition over a long period of time than the average person. However, that same individual may excel in higher cognitive skills such as "$G_f$" (fluid reasoning), math, logic, and verbal skills. To adjust for these idiosyncratic differences among users, according to a preferred embodiment, the application 120 loaded into a user's computing device 137 includes a local AI program or module. The central database 128 and Central AI program (transaction administrator 127) of FIG. 1 establish a generally optimal set of application control parameters. However, the local AI program in a user's computer can make variations or modifications in these parameters or values to determine if the learning program can be optimized for a particular user.

In an embodiment, the application requests demographic data about the user (location, age, sex, race, education, etc.) and uploads this data to the Central database. The Central AI program analyzes this data to determine if there are distinguishable performance characteristics optimized by distinguishable control variables for certain demographic groups. If any distinguishable performance characteristics identified, the "general" application control variables discovered by the AI program can be modified according to statistical predictions based on demographic data, tailoring the application control data for a specific user. Although user idiosyncrasies may command an application on a user's computer to further refine the control values, such demographically driven adjustments in the central AI program can nevertheless improve the quality of the control values downloaded to a user.

Memory Prompts or Triggers Accompanying Flashcards

The process of recollection by the human brain is complex. Memories are fragmented. For example, an image of a red Ferrari has a "form" (a profile of the vehicle), a color, a perception associated with the brand Ferrari, and many other qualities. These may be stored in separate portions of the brain, and drawn together to conjure up an image of a red Ferrari. It is believed that accessing one part of a memory may act as a trigger to the recall process.

To facilitate memorization of facts or principles in flashcard driven courseware, triggers may be incorporated within the flashcards. A simple example would be the word "meet." In English, we use this word both for the initial introduction, "My husband and I met [for the first time] at a Christmas party," and may use the same word when we "run into" someone we already know. "I met Adam while we were at the shopping mall today." In many other languages, however, different words are used for a first time meeting, as opposed to running into a friend. In an embodiment, a memory device may include different pictures associated with different flashcards. A first time meeting (or introduction) may include a background of three persons: first and second persons facing each other, but separated by a third person who is facing one while gesturing toward the other. When "meet" is to be translated as "running in to someone the subject already knows," the background picture might advantageously show two people facing each other, with a facial expression of recognition and delight, and other gestures of forthcoming embrace or a kiss on the cheek which would not be expected when two strangers met each other.

In a preferred embodiment, multiple alternative pictures, animations, colors, background textures, and other memory prompts may be utilized among different students, with statistics maintained to determine which memory prompt(s) is/are the most effective. For example, a certain word in a foreign language may be displayed on a hemp background.

This texture or background may have nothing to do with the word itself, but may nevertheless become a useful memory trigger.

The well-known major league baseball symbol is an abstract, and yet, evokes the image of someone hitting a baseball. It is conceivable that, in an economics class, an equation or principle may have a complex form which can be reduced into an abstract image evocative of the longer equation, or a large and complex illustration of economic forces.

The statistics must "cut both ways" however. On the one hand, a goal is to produce the most rapid retention of, recollection of, and fluency with, the principle taught on the flashcard. On the other hand, the picture, background color, texture, or other memory prompt should not become a permanent crutch. In the end, the student must be fluent in the principle being taught without being prompted. (In cases such as multiple meaning for the word "meet," however, it is readily appreciated that some prompt is necessary to ensure that the student knows what is being asked.) The optimal use of memory aids can only be determined by statistical analysis of multiple alternative uses of memory prompts, or lack thereof. Embodiments are therefore envisioned for statistically tracking student performance over a long period of time, to determine if short-term memory enhancements are long-term assets, or liabilities.

Melodies, Songs, Movie Lines, Smells, and Other Memory Triggers

Memory aids can also utilize tunes or "jingles," well known lines from movies, mnemonics, acrostics, anagrams and other word games, and even smells. In an embodiment, certain scents may be released in conjunction with certain principles being taught, acting as a trigger to the hippocampus or other memory area of the brain. The scents may be released again at night while the student is sleeping to further reinforce learning and memory. In more advanced embodiments, a student may wear an "E.E.G." while sleeping, similar to that worn during studies for sleep apnea—or some other monitor. The application, or a related application, releases scents at an optimal time, such as during the onset of slow wave sleep when the hippocampus engages in a conversation with the cerebral cortex to organize the storage of long term memories. Releasing a related scent at the optimal time will enhance long term memorization and retention of information.

Statistical and Demographic Optimization of Memory Aids

In an embodiment, the central data base is linked with (or functionally a part of) the transaction administrator. It records student performance against various memory devices to statistically identify the most useful memory aid. Demographic data is advantageously used to further refine the quality of memory devices. For example, a student memorizing new words for the SAT or some other college entrance exam may be required to learn the word "terpsichorean,"—relating to dancing, or the dance arts. For someone who lives in New Orleans near Terpsichore Street, a short video showing the street sign "Terpsichore," and a brief sequence showing a couple dancing down Terpsichore Street in a tail suit and ballroom dress may be a useful memory tool. The word "Terpsichore" is already in their vocabulary of local residents, even if they did not know the meaning of the street name. However, for someone who did not live near Terpsichore Street, such a memory device may, or may not, be quite as useful. Only statistical data could reveal this. If statistical data disclosed the memory device was useful only for persons living in New Orleans, the demographic data relating to the student would determine if this, or some other memory aid, would be employed to help a student remember the meaning of the word "terpsichorean." This illustrates that any demographic data . . . even zip codes and even street addresses, may therefore be useful in optimizing a course presentation for a particular student.

Cartoons, pop-culture and the like are continually changing. This cultural framework provides a rich source of expressions, "famous lines," tunes, or other events that may trigger memory of something. However, a memory device drawn from an afternoon cartoon show in the year 2015 geared to high-school age students may not be as effective as a memory device for a thirty-five year old, whose demographic age group hardly ever watched the subject cartoon show, or a high school student twenty-five years later, who never even heard of the show. An example of a "pop-culture memory aid" might be drawn from a hypothetical student memorizing the meaning of the term "myocardial infarction" (or a medical student studying this or a related subject). The student may benefit from the background music of Jon Bon Jovi's 1986 song line, "Shot through the heart, and you're to blame. You give love a bad name." Again, because the line is so memorable, it may even serve as an effective memory aid to someone who had never listened to Bon Jovi. Alternatively, a satirical lampoon could sing the same line to the tune of Bon Jovi, but end with the words "you give me a myocardial infarction."

Statistical analysis may disclose that it is a useless memory aid to persons who never listened to Bon Jovi. In an embodiment, the database records a statistical record of specific demographic factors and their correlation to leaning or remembering certain facts or principles. The statistical database is demographically driven to ensure that the most effective memory aids are presented to students. Statistical review, and "double blind" use vs. non-use of various memory aids ensures they do not become a counter productive crutch, but are effective for true long term learning.

To effectively utilize the potential contributions of pop-culture to the generation of memory aids, students and participants will advantageously be able to propose their own memory devices, which can be prepared to the standards of the educational review system, and uploaded to the central database or transaction administrator. "Rippers," and editing software may advantageously be integrated with the basic application in an integrated software package that enables users to cut out a scene from a movie in various video formats, or a segment of a song. System filters (or review by a human agent) may be used to prevent scandalous or offensive material to be uploaded as a "memory aid." Similarly, users may also have the ability to establish filters that limit the download or access alternative memory devices. Because of licensing concerns, the system will advantageously engage in licensing rights with ASCAP, or various studios or licensing co-ops to ensure that copyright violations are avoided or minimized.

Statistical analysis of records will not only identify optimum memory aids, but will parse them according to demographic data, optimizing the memory aids even further for specific users.

See One, Do One, Teach One

Medical students often refer to the process of learning a medical procedure by the expression "see one, do one, teach one." There are two benefits to teaching. First, the teacher is forced to grapple with the material better and organize it in their own mind to teach it. Psychotherapy has long recognized that talking out-loud helps us to ferret out our thoughts more sensibly and clearly. In an embodiment, therefore, a learning application can rate a student, or tell a student if they are ready to "teach one," or what they need to do to reach the "teaching" status. E.g. a screen presentation may say, "you need to watch video XYZ one more time to be ready to teach." After a student has reached a certain proficiency, a video session may be established with another student. The more seasoned student functions as the "teacher," and the less seasoned student the "student" for the review of a particular principle. This presents two benefits. First, the teacher is forced to express it, reinforcing their own learning. Secondly, the student is "hearing it from another voice." Learning is relationship driven, and one teacher may resonate with a student better than another teacher. The information being taught over the internet session, however, may be pre-packaged by the content provider, so that the "teacher" has some guidance on the direction of the session.

A student may simply request that he or she be able to tutor, and then receive an online notification when they have met the threshold requirements. In an application akin to "instant messaging," an online menu displays the ID's of students (tutors) who are ready to teach a particular principle, and who are online at any particular moment. A student need not participate as a teacher/tutor, but may, at their own option, elect to have their name (or screen identity) listed. They may elect to tutor the subject once, or many times . . . or not at all. The application will advantageously allow a student to indicate that they are "available" to teach at certain times. A student who intends to go offline soon, or does not want to be bothered with a tutoring session at a particular time may simply disable the function, or click on "temporarily unavailable" to remove themselves from the active tutor list.

When a second student is ready for a tutoring session, he or she will access a list of available "student-tutors" online, and begin an Internet session. In a preferred embodiment, tutoring sessions are very short, limited to an isolated principle. This increases the likelihood that the tutor will be able to master the subject, and know "exactly where they are going." That is to say, if the subject that one must teach is too expansive, it is more likely that the teacher will need greater preparation time to organize the presentation, and address diverse concepts. Although longer tutoring sessions are envisioned, the primary session is intended to be short, and focused on a single principle. This focus of the tutoring session for a brief, highly focused session, allowing the student-tutor to focus on explaining the principle, while not tasking them with organizing the arrangement of diverse thoughts.

In an embodiment, "teaching aids," such as interactive charts and graphs are developed, and available for online tutoring sessions. These aids may be presented in "screen sharing" sessions, and accessed through icons such as those illustrated in conjunction with FIG. 4. As with other aspects of the embodiments presented herein, statistical records are kept of the various teaching aids, and they are rated, or recommended based on their effectiveness. In this way, rather than recommending a "best" text book, the "best" lessons are selected on a case-by-case basis, including memory aids and teaching aids.

Correlation of Performance Data to Medical Conditions.

Society loses tremendous resources by failing to recognize medical conditions, learning disabilities, and other frailties of the human condition. It has long been recognized, for example, that persons suffering from fibromyalgia perform poorly on a "Stroop Test." Alzheimer's, dyslexia, autism, attention deficit disorder, PTSD and Asperger's each have their own markers. Moreover, there are probably many undiscovered cognitive behavioral markers for these, and other human frailties and disorders. Using the histogram data and performance metrics uploaded from millions of users, ongoing "number crunching" with massive databases may go further than simply optimizing control parameters for participants—it may help identify persons with physical conditions, learning disabilities, or other human frailties, leading to diagnosis, the development of cognitive training techniques, and a more effective utilization of human resources. In an embodiment, if data suggests that a user has a medical condition about which the user may be unaware, the transaction administrator 127 or some other entity will preferably contact the user. Because of confidentiality laws, in an embodiment, such messages will not disclose confidential medical data, but will alert the user to contact the transaction administrator or other appropriate entity. Biometrics, personal identification, or other appropriate safeguards are employed to ensure user confidentiality and compliance with appropriate laws.

Demographic Offsets of Control Parameters

Although the optimum order and rate of repetition of flashcards may differ among different subjects, such as Algebra and Russian, any subject for which a large amount of data has been crunched can be applied to other learning programs. Assume, for example, that massive databases have been developed on Algebra I, optimizing control parameters. Assume, further, that the control parameters have been refined for different demographic sets, such as age. These control parameters may not be perfect for learning Trigonometry, or the Urdu language. Nevertheless, they can provide a "starting point" from which to optimize study programs in Trigonometry or Urdu. Refinements can then be made from this starting point. And if a user is in a demographic group that consistently benefits by a certain "offset" of some numerical value, this offset may be applied to a new course being studied by the user User Idiosyncratic Offsets of Control Parameters If a user's behavior is consistently "offset" from the "standard" application control parameters by a predictable offset (which may be a different value of a control metric, a different logic flow chart, etc.), then, at the beginning of any new course, this offset is advantageously applied to the control metrics governing the student's review of a new course. Statistical data collected will advantageously determine whether an "offset" may be applied to a user across any courses, or for certain types of courses (such as math courses.) Offsets may be extrapolated. For example, assume a certain offset from the baseline control parameters is show to consistently optimize a student's review of mathematical courses, but no offset for verbal skills. The study of economics is a combination of verbal skills, and mathematical skills. A control parameter offset for economics may optimally be set at 65% of the "offset distance" between language and mathematics. The "offset" might be, for example, one of the constants in Equation 11.

Programming with a View Toward Conflicting Objectives

The programmers developing AI programs, and/or proposing certain application control data to regulate flash cards, must be mindful that improvement in accuracy may be at odds with increasing the scope of knowledge. If a subject (e.g. Russian) has three thousand flash cards for learning or reviewing Russian vocabulary, and another twelve hundred for learning and reviewing Russian grammar, frequent review of the first hundred-fifty flashcards will improve the user's accuracy with those cards, but is performed at the expense of progress in a remaining course in Russian. And AI program can only "optimize" application control variables if it has a model of what is "optimal." In this specification, it has been hypnotized that a 90% probability of accuracy is optimal for advancing through a course, and a 99% accuracy is a target for review and preparation for a final exam or standardized exam, or to "maintain" proficiency with the least effort in review in subsequent years. Courseware developers may learn that such assumptions about "optimal" were unfounded, necessitating a revised (or more mathematically rigid) definition of "optimal." Additionally, some things cannot be known immediately. For example, after one week of user interaction with the application, the central AI program and the central database may have a pretty good idea of how the frequency and order of presentation of flashcards may be optimized after one week. Control variables can be downloaded to achieve this. However, after one achieved a specific level of competence in a subject, how often does that subject still need to be reviewed in order to maximize user performance a year from now? This cannot be answered until data has been collected over course of an entire year. System administrators will advantageously refine the goals and objectives of the application, and enter any revised limits, parameters, variables, flowcharts logic diagrams into the AI module to optimize student performance in view of those refined goals and objectives.

Lessons Interspersed with Flashcards

As illustrated by the links 405, 407, 411, 413, 415, 417 and 419 of FIG. 4, "non-graded" lessons may be accessed from links on flashcards. Similarly, non-graded lessons may be automatically interspersed with flashcards. Embodiments are envisioned wherein "points" are awarded for students viewing, reading, or listening to non-graded lessons. Incentives may thereby be distributed after a certain level of competence is achieved in a sequence of flashcards, after a certain number of points are accumulated in the review of non-graded lessons, or combinations thereof.

Measure of Progress

A unique problem confronting programmers is how to blend, at the optimal rate, the introduction of new material with the review and reinforcement of old material. A student whose accuracy is progressively increasing for a body of flashcards is plainly "progressing." A student is also progressing when new questions and/or new lessons are being presented student. The goal of optimizing a user's progress can only be realized by an application or program (such as an artificial intelligence program) if there is some objective measure of "progress." However, the introduction of new material is conceptually different than the review and improved proficiency of an existing body of flashcards. To determine when the program focuses on review, and when the program focuses on new material, a logical paradigm, equation, or mathematical expression must hold these two distinct concept in a relationship to each other.

In an embodiment, a logical paradigm or flowchart asks "is the students scoring below 90% on any flashcards?" If the answer is "no," the paradigm instruct the program to introduce new material inasmuch as the student has developed a certain proficiency with the existing body of knowledge. If the answer is "yes," this does not automatically mean that the application will re-present the "weaker" flashcards to the user. For example, a student may fall below 90% accuracy on one or two questions. However, the application may calculate that these last cards would optimally be reviewed in another eight to twelve cycles. The application may further indicate that none of the other flashcards are "ripe" for review either. Accordingly, the logic flowchart will direct the application to introduce new material.

None of the foregoing equations, paradigms, flowcharts, or other descriptions are intended to limit the various embodiments described herein. Rather, they are intended to illustrate, by concrete expression, specific examples which will enable the reader to apprehend the principles generally described herein. Those principles comprehend alternative embodiments which are consistent with the spirit and scope of the embodiments described herein.

Additional Clauses Illustrating the Selection of Flashcards

Clause 1: A method for optimizing an order of presentation of a plurality of flash cards, each flash card comprising a question and a flashcard answer, the method comprising:

i. providing, for a first flash card, a plurality of user-generated answers which are advanced by a user over a corresponding to a plurality of cycles of the first flash card;

ii. recording, in a histogram of the first flashcard, a plurality of digital values corresponding to respective accuracies of the plurality of user generated answers, the histogram further recording a timestamp corresponding to a time of each answer.

Clause 2: The method according to clause 1, further comprising generating a first performance metric, derived, at least in part, from at least some of the digital values corresponding to the accuracies of user generated answers.

Clause 3: The method according to clause 2, further comprising the step of comparing a user's accuracy, over a plurality of cycles, to an accuracy predicted by a first equation over the same plurality of cycles.

Clause 4: The method according to clause 3, further comprising the step of comparing a user's accuracy, over the plurality of cycles, to an accuracy predicted by a second equation over the plurality of cycles.

Clause 5: The method according to clause 4, further comprising comparing a predictive accuracy predicted of the first equation to a predictive accuracy predicted of the second equation.

Clause 6: The method according to clause 5, wherein the predictive accuracy is calculated, at least in part, according to a standard deviation between a plurality of predictions and a plurality of measurements.

Clause 7: The method according to clause 5, wherein the predictive accuracy is calculated, at least in part, according to a linearity of a graph.

Clause 8: The method according to clause 7, wherein the linearity of the graph is derived, at least in part, from a plurality of predictions over a range of predicted accuracies.

Clause 9: A method for optimizing an order of presentation of a plurality of flash cards, each flash card comprising a question and a flashcard answer, the method comprising:

i. providing, for a first flash card, a plurality of user-generated answers which are advanced by a user over a corresponding to a plurality of cycles of the first flash card, wherein the question of the first flashcard is configured to measure a first skill of the user;

ii. assigning a first plurality of numerical grades to the respective plurality of user-generated answers;

iii. assigning a plurality of time-stamps to the respective plurality of user-generated answers, each date-stamp corresponding to a numerical grade was entered for a corresponding user-generated answer;

iv. deriving a plurality of time-values from the respective plurality of date-stamp s;

v. performing a first mathematical operation for each cycle, the first mathematical operation incorporating the time-value of a cycle with the corresponding numerical grade of a first cycle, wherein a sequence of the first mathematical operations for each cycle generates a first plurality of incremental metrics for a flashcard; and vi. generating, at least from the first plurality of incremental metrics, a first general performance metric corresponding to the first flash card.

Clause 10: The method according to clause 9, wherein a date stamp consists of information selected from among date, a time, and combinations thereof.

Clause 11: The method according to clause 9, wherein a time value of a cycle is derived, at least in part, from a length of time that has elapsed since a time stamp was generated for the user-generated answer for the cycle.

Clause 12: The method according to clause 9, wherein a time value of a cycle is derived, at least in part, from a length of time between two consecutive cycles of a flash card.

Clause 13: The method according to clause 12, wherein the two consecutive cycles comprise an earlier cycle and a later cycle, and wherein the later cycle comprised a correct user-generated answer.

Clause 14: The method according to clause 9, wherein the plurality of numerical grades are selected from among a first grade representing a correct answer, and a second grade representing an incorrect answer.

Clause 15: The method according to clause 9, wherein the plurality of numerical grades are selected from among at least three possible grades respectively representing at least three levels of accuracy.

Clause 16: The method according to clause 9, wherein the first general performance metric corresponds to a first skill, and wherein the first flash card is further configured to measure a second skill of the user, the method further comprising the step of assigning a second plurality of numerical grades to respective user generated answers of the first flash card, the second plurality of numerical grades corresponding to the second skill.

Clause 17: The method according to clause 16, wherein the first skill is directed to a recognition of a root of a noun in a foreign language, and a second skill is directed to a recognition of a case of the noun in the foreign language.

Clause 18. The method according to clause 16, further comprising the step of displaying, on a computer driven video display screen, a plurality of links configured to activate a plurality of training exercises relating to a plurality of principles, including first and second principles respectively reflected in the first and second skill of the user.

Clause 19. The method according to clause 18, wherein the plurality of training exercises are selected from among a groups of training exercises consisting of a short written summary of a principle, a long written explanation of the principle, a video illustrating the principle, an audio narration explaining the principle, a chart summarizing the principle in relation to related principles, and combinations thereof.

Clause 20: The method according to clause 9, wherein the step of generating a first plurality of incremental metrics includes the step of multiplying the time-value of a cycle by the numerical grade of the cycle.

Clause 21: The method according to clause 20, wherein the first mathematical operation further includes multiplying a product of the time-value of a cycle and the numerical grade of a cycle by a negative coefficient for each cycle in which the user-generated answer was incorrect.

Clause 22: The method according to clause 21, wherein the negative coefficient is less than one.

Clause 23. The method according to clause 20, wherein the time-value is a weighted coefficient which is progressively smaller for events the longer ago that they occurred.

Clause 24. The method according to clause 21, wherein the time-value is a weighted coefficient which is progressively smaller for events the longer ago that they occurred.

Clause 25. The method according to clause 20, wherein the step of generating the first general performance metric comprises the step of aggregating the incremental metrics that correspond to user-generated answers which were, at least in part, answered correctly.

Clause 26. The method according to clause 21, wherein the step of generating the first general performance metric comprises the step of aggregating the incremental metrics that correspond to user-generated answers which were, at least in part, answered correctly, as well as user-generated answers that were incorrect.

Clause 27. The method according to clause 20 or 21, further comprising the step of calculating a first general performance metric for the plurality of flashcards.

Clause 28. The method according to clause 27, further comprising the step of organizing an order of review of said plurality of flashcards based, at least in part, on the general performance metrics of said flashcards.

Clause 29. The method according to clause 27, wherein the plurality of flashcards comprises a plurality of active flashcards that have been reviewed at least once by the user, and one or more new flashcards that are not identified as active flashcards, the method further comprising the steps:

i. determining if any active flashcard is in need of review; and, ii. if no active flashcard is in need of review, selecting a new flashcard for review.

Clause 30: A method of determining an order of review of digital flashcards presented on a digital computing device, said digital flashcards including active flashcards that have been reviewed at least once by a student, and new flashcards that are not designated as active flashcards, the method comprising the steps:

i) identifying a first active flashcard;

ii) calculating a probability of a student correctly answering the first active flashcard.

Clause 31: The method according to clause 30, further comprising:

i) determining that the probability of the student correctly answering the first active flashcard falls below a preset threshold probability;

ii) categorizing the first active flashcard as being in need of review; and, iii) reviewing the first active flashcard.

Clause 32: The method of clause 30, further comprising:

i) determining that a probability of the student correctly answering a flashcard does not fall below the preset threshold probability for any active flashcard; and, ii) selecting a new flashcard for review.

Clause 33. The method according to clause 30, further comprising:

i) recording, on a digital histogram of the first active flashcard, a plurality of values, each value corresponding to an accuracy of a respective student-answer to the first active flashcard, the accuracy of each student-answer having a corresponding date/time stamp;

ii) wherein the probability of the student correctly answering the first active flashcard is determined, at least in part, by a performance metric that takes into account the plurality of values corresponding to the accuracy of student-answers for the first active flashcard.

Clause 34: The method of Clause 30, wherein the probability is normed to a scale of 0 to 100.

Clause 35: The method of Clause 30, wherein the probability is normed to a scale of 0 to 1.

Clause 36: The method of Clause 30, wherein the probability is measured on a scale of at least three gradations.

Clause 37: The method of Clause 30, wherein the probability is measured on a scale of at least four gradations.

Clause 38: The method of Clause 30, wherein the probability is measured on a scale of at least five gradations.

Clause 39: A digital flashcard comprising a prompt screen (a question) for prompting a user answer, wherein a user answer must address first and second principles.

Clause 40: The digital flashcard of clause 39, wherein a score for an answer for the first principle is linked to a first histogram, and a score for an answer for the second principle is linked to a second histogram.

Clause 41: The digital flashcard of clause 39 or 40, wherein the first and second principles are grammatical principles related to a study of a foreign language.

Clause 42: A method of reviewing educational material on a digital computing device, the method comprising: displaying a prompt screen for prompting a user answer; answering the prompt, wherein the step of answering is performed by a user, thereby generating a user answer; assigning a first score to the user answer, the first score corresponding to an accuracy of the user with respect to a first principle; writing, on a first digital histogram, a value corresponding to the first score; assigning a second score to the user answer, the second score corresponding to an accuracy of the user with respect to a second principle; writing, on a second digital histogram, a value corresponding to the second score.

Clause 43: The method of clause 42, further comprising selecting a next digital flashcard for user review, the step of selecting comprising: evaluating a plurality of strength-of-learning values corresponding to a plurality of principles; prioritizing the respective principles according to their respective strength-of-learning values; selecting third and fourth principles for review; identifying a plurality of digital flashcards that incorporate the third and fourth principles; and selecting, from among the plurality of digital flashcards that incorporate the third and fourth principles, a next flashcard for review by the user.

Clause 44: The method according to clause 43, wherein the step of selecting, from among the plurality of digital flashcards that incorporate the third and fourth principles, a next flashcard for review by the user, further comprises the steps of calculating a probability of user error of one or more of the plurality of flashcards; determining that at least one additional principle optimally should be added to the next flashcard; identifying a fifth principle according to a comparison of strength of learning values; and identifying, from among the plurality of digital flashcards that incorporate the third and fourth principles, those digital flashcards that incorporate the fifth principle.

Content Ripper

The incentivization embodiments, statistical modeling, artificial intelligence and/or flash card concepts and embodiments taught herein are generally referred to, in the following example, as the "Incentive System." In an embodiment, the Incentive System may be used in conjunction with a preexisting digital flashcard system, or an "after-market" digital flashcard system (digital flashcard courses from third-party courseware providers). Consider the example wherein "Aardvark Courseware" is a third party courseware provider which has developed a digital flashcard course for preparing students for college entrance exams. The Aardvark courseware includes their own proprietary software for flipping flashcards, selecting the "next" flashcards. Aardvark agrees to allow their content to be used in conjunction with one or more features of the Incentivization System.

In step 3501, a technician examines the digital code of a third party courseware provider.

In step 3503, the technician distinguishes courseware content (e.g. algebraic equations, vocabulary words and definitions, audio files, etc.) from the program code of the third party courseware. For example, the third party courseware may have a JPEG image of an Aardvark on every flashcard. This is a trademark, not course content. On the other hand, a mathematics flashcard may have a JPEG image of a graph of a trigonometric function, such as a sine wave, tangent, etc. By analyzing the courseware, the technician may discover that the JPEG files for the Aardvark image are a "thumbnail" size, and that JPEGs of actual content are identified by a different file size. The process may be aided by noting a pattern to "links" to the various images, and the physical placement or arrangement of the links on the Aardvark display.

If, in step 3505, the process is to be automated, then, in step 3507, the technician develops a program that functions as a custom digital-content ripper. The custom digital-content ripper copies and pastes course content of a third-party courseware provider into files and file folders of the Incentive System. This includes any necessary or proper programming steps, such as embedding any links to the newly saved third-party files (content files) within icons used in the Incentive system.

If, in step 3505, the process is not automated, then, in step 3509, the technician, and/or a staff trained by him (a "team"), identify courseware content files (including relevant text files) in the third party courseware. The team copies and pastes the course content in appropriate files in the Incentivize system. As noted, the efficiency of this step is enhanced when a technician examines the courseware files, and identifies patterns and features distinguishing content of the third party courseware from other courseware features. For example, a "thumbnail" of the third-party trademark (e.g. a picture of an aardvark) may appear in the same place on every "page" of the third party software. These patterns make it easier for the technician to segregate courseware content from "static displays" and other courseware features.

The reader will appreciate that, in step 3507, various levels of automation are envisioned, and that the distinction between the automated process of 3507, and the "manual" process of step 3509 is really one of degree.

In step 3511, the technician develops one or more "display templates" incorporating relevant logos, trademarks, or features of both the third-party courseware provider, and the "Incentivize" logo on the same page.

In step 3513, any other steps necessary for the integration of the third-party courseware and the Incentivize System are undertaken by the technician.

In step 3515, the third-party courseware is reviewed by a student through a digital application utilizing features of the Incentivization System, and incentives are dispensed accordingly.

Integration of Incentivization System with Third Party Flashcard Application

Figure 35:
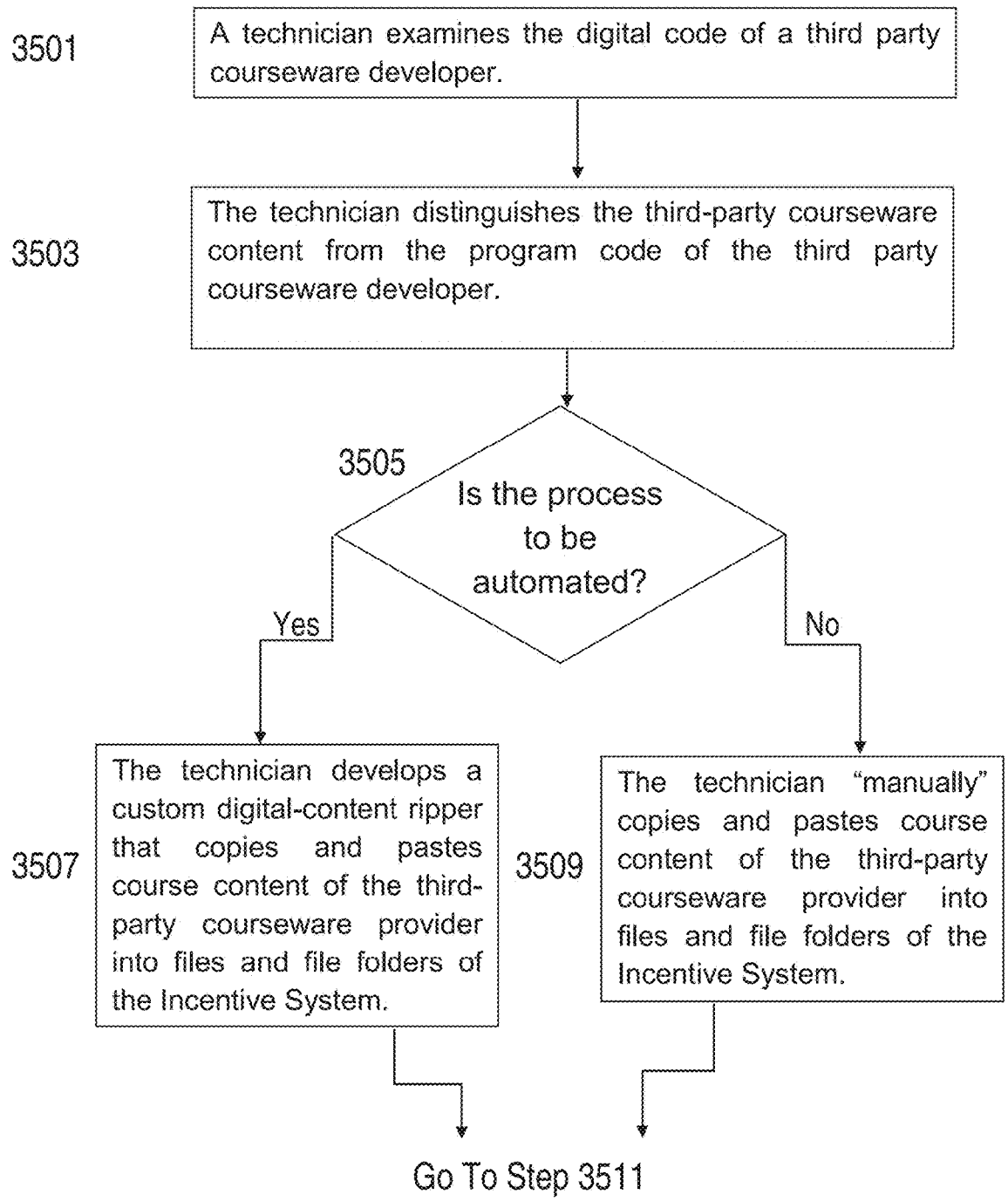
FIG. 35 depicts a method for integrating third-party courseware with an incentivization model as depicted in FIGS. 1 and 14.
Figure 35:
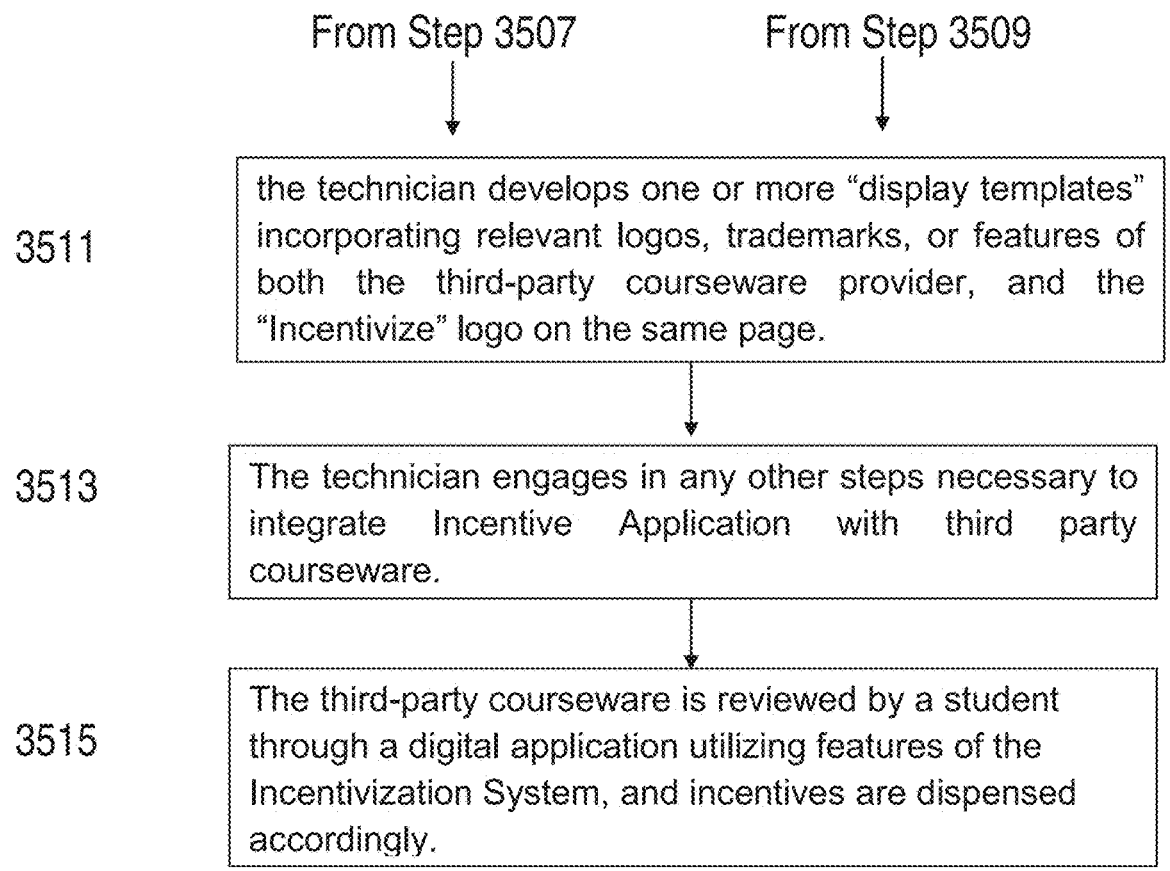

Although FIG. 35 is directed to a specific embodiment of ripping text and content files from a third-party digital flashcard application and integrating them into the Incentive digital application, this is simply a specific embodiment of a more general goal. The more general embodiment envisions, by any architecture and design, the integration of a third party digital flashcard course with the incentivization system described herein, and/or the integration of a third party digital flashcard course with the automated flashcard selection process described herein. (The automated flashcard selection process includes any of the methods taught herein incorporating performance metrics, equations, tables, decision charts and logic charts, statistical analysis, adaptive learning and artificial intelligence). Accordingly, FIG. 35 provides details of a specific embodiment for integrating the present embodiments with a third-party courseware provider. Any means of integration is envisioned. In a preferred embodiment, however, the integration will include one or more features from a third party digital flashcard course, such as course organization, course content, or both. However alternative embodiments are envisioned in which a third party content provider develops their own testing and/or confirmation process. In an embodiment, the third party content provider licenses rights to the incentivization process and/or statistical analysis processes described herein, and controls the operation. In an alternative embodiment, the third party content provider pays an incentivization entity to perform one or more services or processes described herein.

Games and Contests

It has long been recognized that man is a competitive creature, and that competition motivates performance. The national "spelling bee" in the United States is a perfect example. In view of this inclination of humankind, embodiments are envisioned in which the review of courseware can be implemented in a competitive environment. Contestants may be students, or may include parents, incentivizers, or other entities against whom students are competing. In real time competition, students may race to answer a question first. In alternative embodiment, the time to answer questions can be aggregated, with the fastest aggregate time being taken into consideration to determine a winner. In an alternative embodiment, competing students are required to answer within a fixed amount of time. Biometrics can be used to ensure that competition is fair, and not "overmatched." Incentives for competition can include, but are not limited to, cash, goods or services, or listing of one's name or identity publicly, or privately for employers or other entities.

Gamification

Flashcards may be "arranged" in a lattice of any known, game, such as checkers, "Battleship," poker, etc. so that the student is motivated by a secondary level of competition in a gaming environment.

Enhanced Viral Coefficient

A high viral coefficient corresponds to rapid growth. In an embodiment, students are incentivized for inducing another person to sign up to participate in the programs described herein. The incentive may be a free latte at a coffee shop, or a free sandwich at a deli or fast food restaurant. Great care must be taken, however, to ensure that the product is not simply "growth." A pyramid scheme can only double thirty-three times before every person on the planet is a member. This is why "pyramid" schemes and "multi-level marketing" programs that depend on growth to incentivize participants are doomed to extinction from their inception. Incentives for exponential or viral growth will not be available to persons "at the end of the chain." In the programs described herein, therefore, the incentives must be geared to motivate growth, while not forming the essence of the program. The incentives for recruiting new participants should not overshadow the incentives to participate. One way to ensure this is to offer a limited time period for such "sign-up incentives," for example, one year from inception of the program. Another limitation is to limit growth incentives to a limited number of participants, for example, the first million persons in a particular country. In an alternative, growth incentives can be advertised as extending "for a limited time," thereby ensuring that no breach of contract occurs when the growth incentive is terminated. Viral growth is helpful to go from concept formation to capital generation. But growth must be incentivized in a manner that it does not overshadow the good or service being promoted thereby.

SUMMARY

The foregoing discussion describes numerous specific details for the purpose of enabling a reader to make and use the claimed invention. These details are not intended to limit the scope of the appended claims, which comprehend alternative embodiments and details plainly envisioned within the spirit of the operation of the inventions and embodiments described herein.

What is claimed is:

1. A method for selecting from among a first plurality of digital flashcards, a first digital flashcard for review by a first student on a digital computing device, at a time calculated to optimize the first student's retention of material described in the first digital flashcard, the method comprising:
   a) recording, on a dedicated digital histogram logically related to a first digital flashcard, histogram data derived from at least five review cycles of the first digital flashcard by the first student, wherein a first review cycle includes,
      i) presenting, to the first student, the first digital flashcard;
      ii) providing, by the first student, an answer to said first digital flashcard;
      iii) recording, in a first histogram entry of the dedicated digital histogram, a digital value representing an accuracy of said answer; and,
      iv) recording, in the dedicated digital histogram, in logical relationship to the digital value representing the accuracy of said answer, a first digital timestamp corresponding to a time and date of said answer;
   b) selecting a threshold probability of the first student correctly answering the first digital flashcard;
   c) calculating, through an optimal predictive model on a digital computing device, a future time at which a probability of the first student correctly answering the first digital flashcard falls below the threshold probability, wherein said optimal predictive model analyzes input data, including, but not limited to, said histogram data; and,
   d) queueing the first digital flashcard for presentation to the first student after the probability of the first student correctly answering the first digital flashcard has fallen below the threshold probability.

2. The method according to claim 1, wherein a probability of the first student correctly answering the first digital flashcard is measured on a scale having at least one hundred gradations of accuracy.

3. The method of claim 1, wherein the optimal predictive model is part of an analytic process that utilizes digital tools selected from among a group of digital tools consisting of an equation, a data table, a logical flow chart, and combinations thereof.

4. The method of claim 1, wherein the threshold probability is a user adjustable probability.

5. The method according to claim 1 further comprising the step of modifying the optimal predictive model by an offset to compensate for a circumstance selected from among a group of circumstances consisting of a difficulty of a specific flashcard, a difficulty of a subject, a performance history of the first student, a native language of the first student, demographic features of the first student, and combinations thereof.

6. The method of claim 5 wherein the offset is selected from among a group consisting of constants, variables, weighted coefficients, mathematical operations, logical flow charts, and combinations thereof.

7. This method of claim 1, wherein a probability of the first student correctly answering the first digital flashcard degrades as a function of time.

8. The method according to claim 7, further comprising the step of multiplying at least some of the data derived from the first review cycle of the first digital flashcard, by a value inversely proportional to a length of time from a timestamp of the first review cycle "$t_1$" to a future time "$t_F$" for which a probability of the first student correctly answering the first digital flashcard is being calculated.

9. The method according to claim 8, further comprising the step of calculating a durability value $\Delta_1$ of the first student's answer during the first review cycle according to the formula:

$$\text{«}\Delta_1\text{»} \propto \text{«}t_1\text{»} - \text{«}t_2\text{»}$$

wherein "$t_1$" represents the first digital timestamp corresponding to the first review cycle, "$t_2$" represents a second digital timestamp corresponding to a second review cycle that preceded the first review cycle, and wherein the answer provided by the first student in the first review cycle was a correct answer.

10. The method according to claim 8, further comprising the step of calculating, from data from data stored in the first histogram entry of the dedicated digital histogram, a first freshness value "$F_1$" wherein:
  a) the answer provided by the student during the first review cycle was incorrect; and,
  b) the first freshness value "$F_1$" is a positive number.

11. The method according to claim 8, further comprising the step of calculating, from data stored in the first histogram entry of the dedicated digital histogram, a first accuracy value "$\Delta_1$", wherein:
  a) the answer provided by the student during the first review cycle was incorrect; and,
  b) the first accuracy value "$A_1$" is a negative number.

12. The method of claim 1, wherein the optimal predictive model is determined by a process comprising the steps:
  a) generating a plurality of predictive models;
  b) quantifying an accuracy of each of the plurality of predictive models; and
  c) selecting, as the optimal predictive model, a predictive model with a higher quantitative accuracy than other predictive models.

13. The method of claim 12, wherein the step of quantifying a predictive accuracy of each of the plurality of predictive models includes calculating a predictive accuracy for at least a portion of each of the plurality of predictive models using a statistical technique selected from among a group of statistical techniques consisting of least squares, standard deviation, line of best fit, regression analysis, quantifying a linearity of a graph, and combinations thereof.

14. The method of claim 1, further comprising the steps:
  a) recording, in a compound digital histogram that is digitally linked to at least two digital flashcards, histogram data relating to the first review cycle of the first digital flashcard by the first student; and,
  b) recording, in said compound digital histogram, histogram data relating to a review cycle of a second digital flashcard by the first student.

15. A method for presenting a digital flashcard for review by a first student on a digital computing device, at a future time calculated to optimize the first student's retention of material described in the first digital flashcard, the method comprising:
  a) recording, in a dedicated digital histogram logically related to a first digital flashcard, digital histogram data relating to at least five review cycles of said first digital flashcard by the first student, wherein each entry of digital histogram data includes a value representing an accuracy of an answer by the first student in logical relationship to a digital timestamp corresponding to a time and date of a respective review cycle, a first review cycle comprising the steps,
    i) presenting, to the first student, the first digital flashcard;
    ii) providing, by the first student, a first answer for the first flashcard;
    iii) determining an accuracy of the first answer;
    iv) determining a digital value corresponding to the accuracy of the first answer;
    v) inputting, into a first histogram entry of the dedicated digital histogram, input data relating to the first review cycle, including the value corresponding to the accuracy of the first answer, and a first digital timestamp corresponding to a date and time of the first answer;
  b) analyzing, through an optimal predictive model, input data, including but not limited to said digital histogram data;
  c) determining, through said optimal predictive model, an optimal time for presenting said first digital flashcard to said first student; and,
  d) presenting said first digital flashcard to said first student at said optimal time.

16. The method of claim 15, wherein step of determining, through said optimal predictive model, an optimal time for presenting said first digital flashcard to said first student, comprises the steps:
  a) selecting a minimum acceptable threshold probability of the first student correctly answering the first digital flashcard; and,
  b) calculating, through the optimal predictive model, a time at which a probability of the first student correctly answering the first digital flashcard falls below the minimum acceptable threshold probability.

17. The method of claim 16, wherein said optimal predictive model is determined by a process comprising the steps:
  a) generating a plurality of predictive models;
  b) quantifying an accuracy of at least some of the plurality of predictive models; and
  c) selecting, as the optimal predictive model, a predictive model with a highest quantitative accuracy in comparison with other predictive models.

18. The method of claim 17, wherein the step of quantifying an accuracy of at least some of the plurality of predictive models comprises using a statistical technique selected from among a group of statistical techniques consisting of least squares, standard deviation, line of best fit, regression analysis, quantifying a linearity of a graph, and combinations thereof.

19. The method of claim 16, wherein the threshold probability is a user adjustable probability.

20. The method of claim 16, wherein a probability of the first student correctly answering the first digital flashcard is measured on a scale having a range of at least one hundred gradations of accuracy.

21. The method of claim 16, wherein a probability of the first student correctly answering the first digital flashcard degrades as a function of time.

22. The method of claim 15, wherein the optimal predictive model utilizes digital tools selected from among a group of digital tools consisting of an equation, a data table, a logical flow chart, and combinations thereof.

23. The method according to claim 15, wherein the optimal predictive model includes an offset to compensate for a circumstance selected from among a group of circumstances consisting of a difficulty of a flashcard, a difficulty of a subject, a performance history of a student, a native language of a student, demographic features of a student, and combinations thereof.

24. The method of claim 15, further comprising the steps:
a) recording, in a compound digital histogram that is digitally linked to at least two digital flashcards, histogram data relating to a review cycle of said first digital flashcard by the first student; and,
b) recording, in the compound digital histogram, histogram data relating to a review cycle of a second digital flashcard by the first student.

25. The method according to claim 15 further comprising the step of multiplying at least some data derived, in part, from the first review cycle of the first digital flashcard, by a value inversely proportional to a length of time from a timestamp of the first review cycle «$t_1$» to a future time «$t_F$» for which a probability of the first student correctly answering the first digital flashcard is being calculated.

26. The method according to claim 25, further comprising the step of calculating a durability value $\Delta_1$ of the first student's answer during the first review cycle according to the formula:

$$«\Delta_1» \propto «t_1» - «t_2»$$

wherein «$t_1$» represents the first digital timestamp relating to the first review cycle, «$t_2$» represents a second digital timestamp relating to a second review cycle that preceded the first review cycle, and wherein the answer provided by the first student in the first review cycle was a correct answer.

27. The method according to claim 25, further comprising the step of calculating, from data from data stored in the first histogram entry of the dedicated digital histogram, a first freshness value «$F_1$» wherein:
a) the answer provided by the student during the first review cycle was incorrect; and,
b) the first freshness value «$F_1$» is a positive number.

28. The method according to claim 25, further comprising the step of calculating, from data from data stored in the first histogram entry of the dedicated digital histogram, a first accuracy value «$A_1$» wherein:
a) the answer provided by the student during the first review cycle was incorrect; and,
b) the first accuracy value «$A_1$» is a negative number.

* * * * *